US006480481B1

United States Patent
Park et al.

(10) Patent No.: US 6,480,481 B1
(45) Date of Patent: Nov. 12, 2002

(54) GATED TRANSMISSION IN CONTROL HOLD STATE IN CDMA COMMUNICATION SYSTEM

(75) Inventors: Su-Won Park, Seoul (KR); Young-Ky Kim, Seoul (KR); Jae-Min Ahn, Seoul (KR); Jae-Yoel Kim, Kunpo (KR); Hee-Won Kang, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/362,602

(22) Filed: Jul. 28, 1999

(30) Foreign Application Priority Data

| Jul. 28, 1998 | (KR) | ................................................ 98-30442 |
| Aug. 22, 1998 | (KR) | ................................................ 98-34146 |
| Sep. 3, 1998 | (KR) | ................................................ 98-36681 |

(51) Int. Cl.[7] .............................................. H04B 7/005
(52) U.S. Cl. ...................... 370/342; 455/522; 370/318; 370/326; 370/355; 370/441; 370/498
(58) Field of Search .......................... 455/522; 370/318, 370/355, 326, 342, 352–53, 441–444, 498

(56) References Cited

U.S. PATENT DOCUMENTS

| 5,485,486 A | * | 1/1996 | Gilhousen et al. .......... 375/205 |
| 5,566,165 A | * | 10/1996 | Sawahashi et al. ........... 370/18 |
| 5,604,730 A | * | 2/1997 | Tiedemann, Jr. ............ 370/252 |
| 5,852,778 A | * | 12/1998 | Labedz ....................... 455/423 |
| 5,920,551 A | * | 7/1999 | Na et al. ..................... 370/335 |
| 5,930,229 A | * | 7/1999 | Yoshida et al. ............. 370/203 |
| 5,933,781 A | * | 8/1999 | Willengger et al. ......... 455/522 |
| 5,943,331 A | * | 8/1999 | Lavean ....................... 370/335 |
| 6,058,107 A | * | 5/2000 | Love et al. ................. 370/332 |
| 6,154,659 A | * | 11/2000 | Jalali et al. ................. 455/522 |
| 6,304,563 B1 | * | 10/2001 | Blessent et al. ............. 370/355 |
| 6,310,869 B1 | * | 10/2001 | Holtzman et al. ........... 370/335 |

FOREIGN PATENT DOCUMENTS

| EP | 0827296 | 3/1998 |
| JP | 1094053 | 4/1998 |
| WO | WO9702665 | 1/1997 |

* cited by examiner

Primary Examiner—Daniel Hunter
Assistant Examiner—Stephen M. D'Agosta
(74) Attorney, Agent, or Firm—Dilworth & Barrese, LLP

(57) ABSTRACT

A base station and a mobile station for a CDMA communication system intermittently exchange data on a power control group unit or time slot unit in a control hold state to minimize interference. To this end, during channel transmission, the system intermittently transmits a reverse pilot channel signal in the control hold state; upon activation of a reverse dedicated control channel, transmits a normal pilot channel signal which is first generated after activation of the reverse dedicated control channel; and then transmits the reverse dedicated control channel.

41 Claims, 38 Drawing Sheets

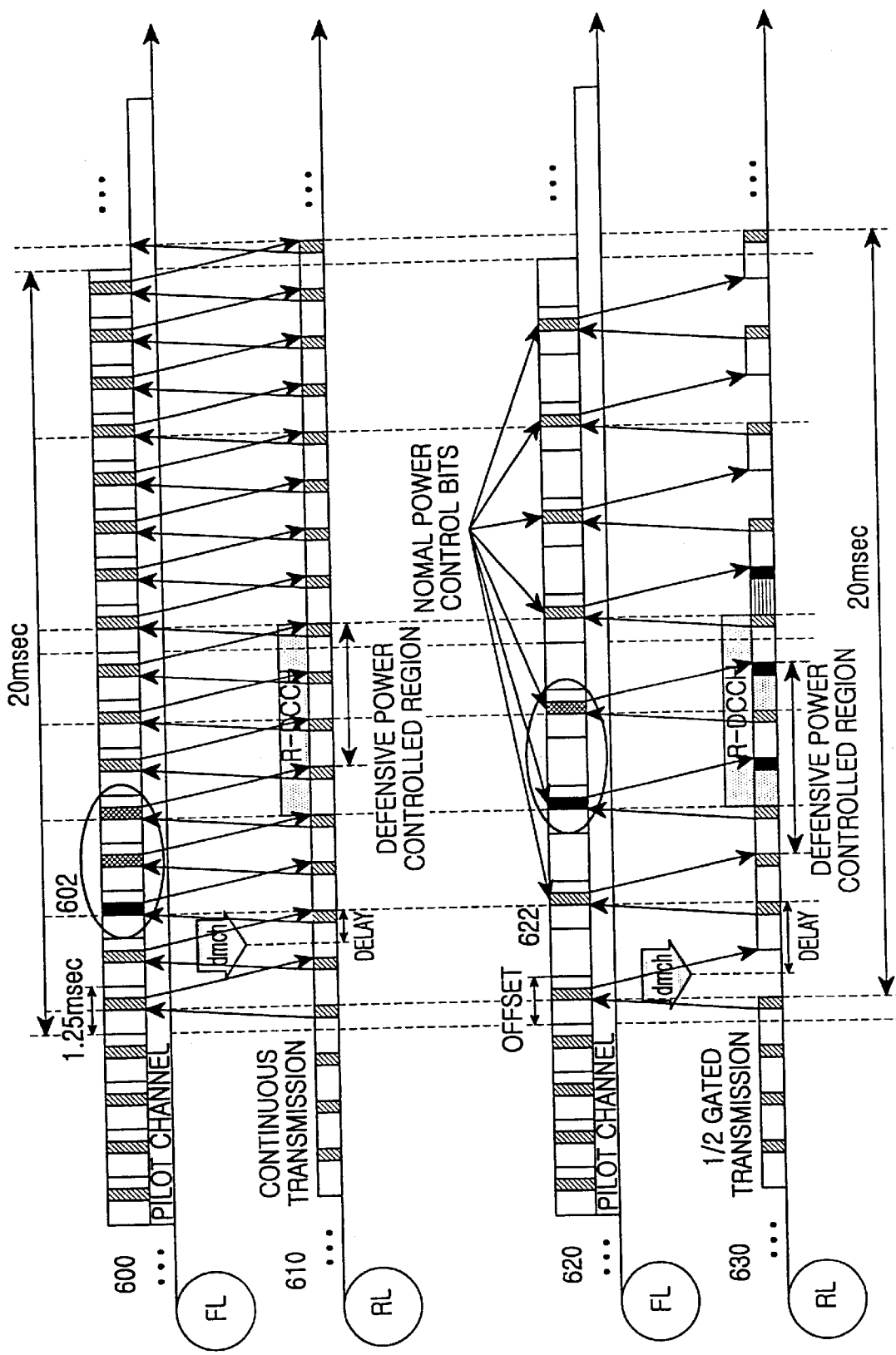

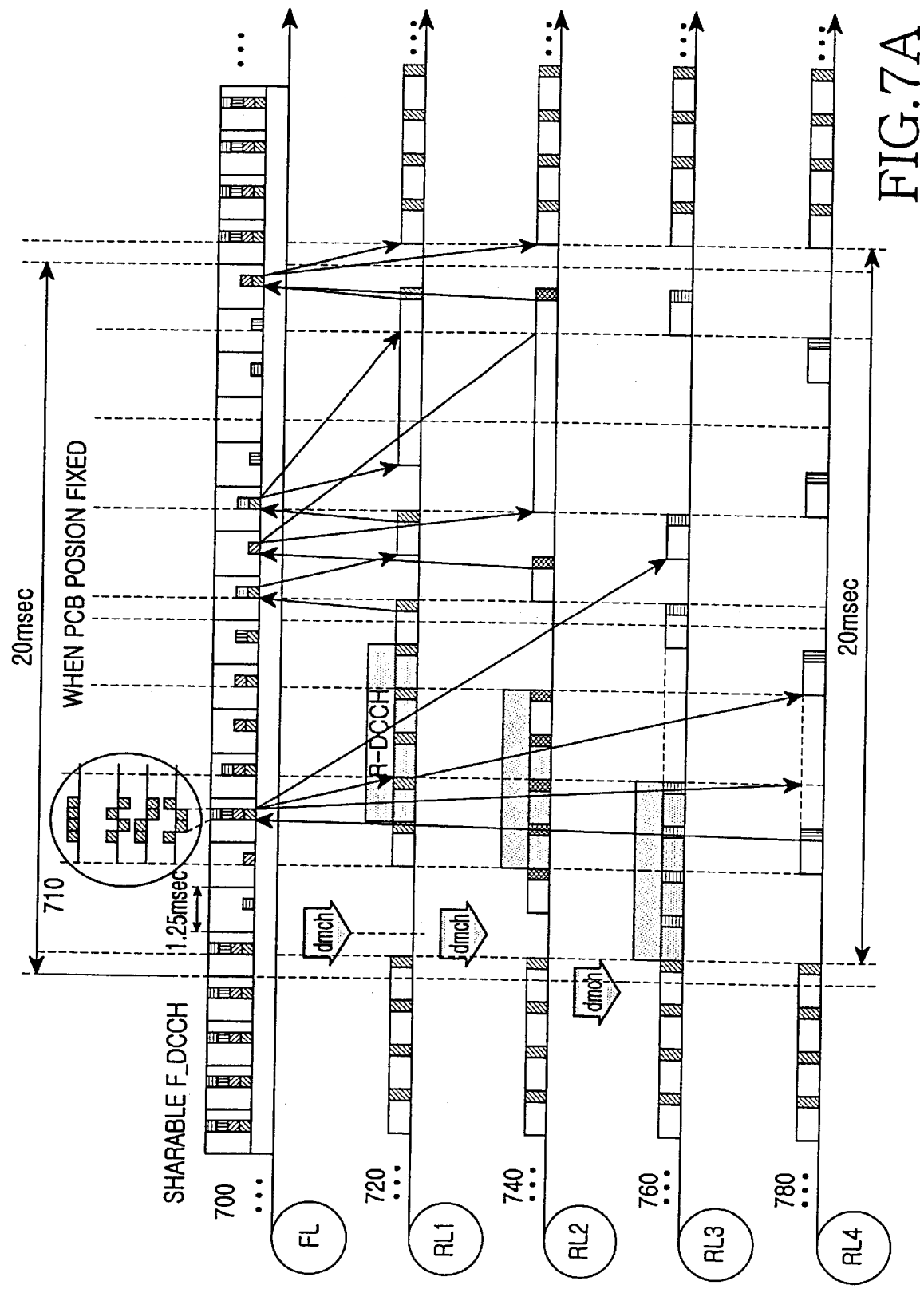

GATED TRANSMISSION IN CONTROL HOLD STATE IN CDMA COMMUNICATION SYSTEM

BACKGROUND OF THE INVENTION

1. Field of the Invention

The present invention relates generally to CDMA mobile communication systems, and in particular, to a device and method for performing gated transmission (or intermittent transmission) in a control hold state.

2. Description of the Related Art

A conventional Code Division Multiple Access (CDMA) mobile communication system based on the IS-95 standard primarily supports a voice service. However, a mobile communication system in accordance with the IMT-2000 standard will support not only the voice service, but also a high-speed data transfer service. For example, the IMT-2000 standard can support a high-quality voice service, a moving picture service, an Internet search service, etc.

In a mobile communication system, a data communication service is characterized in that transmissions of burst data alternate with long non-transmission periods. Therefore, for the data communication service, a mobile communication system employs a channel assignment method in which a dedicated channel is assigned for only the data transmission duration. That is, taking into consideration the limited radio resources, base station capacity and power consumption of a mobile station, the mobile communication system connects a traffic channel and a control channel only for an actual data transmission duration and otherwise releases the dedicated channels (i.e., the traffic channel and the control channel) when there is no data to transmit for a predetermined time. When the dedicated channels are released, communication is performed through a common channel, thus increasing utility efficiency of the radio resources.

A conventional CDMA mobile communication system which mainly supports the voice service, releases a traffic channel upon completion of data transmission and then, reconnects the traffic channel when it is required to transmit data. However, the conventional channel assignment method is not suitable for a packet data service because of a time delay for reconnection of the channel. Therefore, to provide the packet data service as well as the voice service, there is required a new channel assignment method.

In general, during the packet data service, data transmission occurs intermittently. Therefore, a transmission duration of packet data alternates with periods of non-transmission. The mobile communication system either releases or maintains a channel in use for the periods of non-transmission, However, there are drawbacks associated with both maintaining and releasing a channel, namely, release of the channel causes an increase in service time due to a time delay for reconnection of the channel, and maintaining the channel causes a waste of the channel resources.

To solve these problems, there is proposed a method in which a dedicated control channel is provided between a base station and a mobile station to exchange traffic channel-related control signals over the dedicated control channel for the data transmission duration; and release the traffic channel and maintain only the dedicated control channel for the non-transmission duration. In this manner, the mobile communication system can prevent a waste of the channel resources and rapidly reconnect the traffic channel when there is data to transmit. The operating state described above is called a control hold state.

The mobile communication system includes additional operating states according to the channel assignment. FIG. 10 illustrates a state transition diagram of a mobile communication system for the packet service.

As shown in FIG. 10, for the packet service, the state transition diagram for the packet service illustrates a packet null state, an initialization state, an active state, a control hold state, a suspended state, a dormant state and a reconnect state. In the control hold, active and suspended states, a service option is connected and in the other states, the service option is not connected.

Further, the control hold state can be divided into a normal substate and a slotted substate], as shown in FIG. 11. The normal substate refers to a state where there is no data to transmit over a traffic channel and only a control signal is exchanged over a dedicated control channel. When the normal substate continues for a predetermined time, (i.e., when only the control signal is exchanged for a predetermined time without transmission of data), a transition to the slotted substate occurs. The slotted substate refers to a state where connection of the dedicated control channel is maintained but no control signal is exchanged over the dedicated control channel to reduce power consumption of a mobile station. However, to make a transition from the slotted substate to the normal substate to restart data transmission, resynchronization should be performed between a base station and a mobile station, since no control signal is exchanged between the base station and the mobile station in the slotted substate.

A reference will now be made to a base station and a mobile station for the conventional CDMA communication system which performs the above operations. FIG. 1A illustrates a conventional base station transmitter in a CDMA communication system.

With regard to forward link channels, the base station includes a pilot channel for sync acquisition and channel estimation, a forward common control channel (F-CCH) for communicating a control message in common to all the mobile stations located in a cell (or service) area of the base station, a forward dedicated control channel (F-DCCH) for exclusively communicating a control message to a specific mobile station located in the cell area of the base station, and a forward dedicated traffic channel (F-DTCH) for exclusively communicating traffic data (i.e., voice and packet data) to a specific mobile station located in the cell area of the base station. The forward dedicated control channel includes a sharable forward dedicated control channel (sharable F-DCCH) for exclusively communicating a control message to a specific mobile station by time slot multiplexing. The forward dedicated traffic channel includes a forward fundamental channel (F-FCH) and a forward supplemental channel (F-SCH).

Demultiplexers 120, 122, 124 and 126 demultiplex corresponding channel-coded interleaved channel information to I and Q channels. Here, serial-to-parallel converters can be used for the demultiplexers 120, 122, 124 and 126. It is assumed herein that signals input to the demultiplexers 120, 122, 124 and 126 are signal-mapped signals. Mixers 110, 130, 131, 132, 133, 134, 135, 136 and 137 multiply signals output from the associated demultiplexers by orthogonal codes assigned to the corresponding channels to orthogonally spread the signals output from the associated demultiplexers. Here, each of the mixers 110 and 130–137 serves as an orthogonal modulator. The orthogonally spread signals output from the mixers 130–137 are gain controlled by associated amplifiers 140–147.

Signals output from the amplifiers 140–147 and the mixer 110 are summed by summers 150 and 152 according to the I and Q channels. Since the signals applied to the summers 150 and 152 were channel separated by the orthogonal codes, the respective channel signals are orthogonal to one another. Outputs of the summers 150 and 152 are multiplied by PN (Pseudo Noise) sequences PN#I and PN#Q assigned to the base station for base station identification in a complex multiplier 160.

I and Q channel signals output from the complex multiplier 160 are applied to filters 170 and 171, respectively, which bandpass filter the input signals to output bandwidth-suppressed signals. The outputs of the filters 170 and 171 are amplified by amplifiers 172 and 173. Mixers 174 and 175 multiply outputs of the amplifiers 172 and 173 by a carrier $\cos(2\pi f_c t)$ to up-convert the signals to radio frequency (RF) signals. A summer 180 sums the I and Q channel signals.

FIG. 1B illustrates a conventional mobile station transmitter for the conventional CDMA communication system. With regard to reverse link channels, the mobile station includes a pilot/PCB (Power Control Bit) channel for multiplexing a pilot channel for sync acquisition and channel estimation and a forward power control bit for forward power control, a reverse dedicated control channel (R-DCCH) for exclusively communicating a control message to a base station, in a cell area of which the mobile station is located, and a reverse dedicated traffic channel (R-DTCH) for exclusively communicating traffic data to the base station. Further, the reverse dedicated traffic channel includes a reverse fundamental channel (R-FCH) and a reverse supplemental channel (R-SCH).

A multiplexer 210 multiplexes a signal on the reverse pilot channel and a power control bit for controlling power of the forward link. Mixers 220, 230, 240, 250 and 260 multiply corresponding channel-coded interleaved signals received over the respective reverse channels by orthogonal codes assigned to the corresponding channels to generate orthogonally spread signals for the respective channels. Outputs of the mixers 220, 240, 250 and 260 are gain controlled by amplifiers 222, 242, 252 and 262, respectively.

A summer 224 sums outputs of the amplifiers 222 and 242 and an output of the multiplier 230, and a summer 254 sums outputs of the amplifiers 252 and 262. Since the signals applied to the summers 224 and 254 were channel separated by the orthogonal codes, the respective channel signals are orthogonal to one another. A complex spreader (or complex multiplier) 160 multiplies signals output from the summers 224 and 254 by a spreading code assigned to the mobile station to spread the signals. The spreading code assigned to the mobile station is generated by mixing a PN sequence for a base station, in the cell area of which the mobile station is located, by a unique long code for the mobile station. Filters 170 and 171 filter I and Q channel signals output from the complex spreader 160, respectively, to generate bandwidth suppressed signals. Amplifiers 172 and 173 amplify outputs of the filters 170 and 171, respectively. Mixers 174 and 175 multiply signals output from the amplifiers 172 and 173 by a carrier $\cos(2f\pi_c t)$ to up-convert the transmission signals to RF signals. A summer 180 sums the I and Q channel signals output from the mixers 174 and 175.

In the control hold state of the conventional CDMA communication system, a dedicated traffic channel is released and a control signal is communicated over a dedicated control channel. A description will be provided regarding the operation of a reverse pilot/PCB channel in the control hold state. Herein, it is assumed that the control hold state is divided into a normal substate and a slotted substate. However, even in the case where the control hold state is not divided into the normal substate and the slotted substate, the reverse pilot/PCB channel will have the same operation.

First, a mobile station constantly transmits a signal on the reverse pilot/PCB channel in order to avoid resync acquisition performed at a base station during a transition from the control hold state/normal substate (i.e., a normal substate of the control hold state) to the active state in a conventional CDMA communication system. The reverse pilot/PCB channel discontinues transmission only when a transition to the control hold state/slotted substate (i.e., a slotted substate of the control hold state) occurs. However, the signal on the reverse pilot/PCB channel is continuously transmitted until the occurrence of the transition to the slotted substate occurs, thereby increasing interference of a reverse link in the normal substate of the control hold state. The increase in interference of the reverse link inevitably decreases a capacity of the reverse link. Further, the unnecessary continuous transmission of the control signal causes an increase in power consumption.

Second, a description will be made regarding an operation for generating a reverse dedicated control channel (R-DCCH) when a reverse dedicated MAC (Medium Access Control) channel is generated in the conventional control hold state/normal substate. Logical channels for the reverse dedicated control channel include a dedicated MAC channel (dmch), a dedicated signaling channel (dsch) and a dedicated traffic channel (dtch). The dsch and dtch each have a 20 ms frame and the dmch has a 5 ms frame. Therefore, after generation of the dmch, an R-DCCH can be transmitted within 5 ms in maximum. Accordingly, the R-DCCH can be transmitted to locations which correspond to multiples of 5 ms. Therefore, when the dmch is transmitted, the base station may determine the existence of the R-DCCH only at four locations within one frame. However, after generation of the dmch, the R-DCCH is transmitted with a time delay of 5 ms in maximum. The dmch has 2.5 ms transmission delay on the average.

Third, in the case where reverse power control bits are disposed at fixed locations on a forward channel when the R-DCCH is not activated in the conventional control hold state/normal substate, both forward power control and reverse power control are performed at the same periods. Further, in the case where the reverse power control bits are disposed at variable locations within a power control group on the forward channel when the R-DCCH is not activated in the conventional control hold state/normal substate, both reverse power control and forward power control are performed at the same periods.

As stated above, the continuous transmission of the reverse pilot/PCB channel in the conventional control hold state/normal substate is advantageous in that the base station can avoid the resync acquisition procedure. However, the continuous transmission increases interference of the reverse link, causing a reduction in capacity of the reverse link. Further, continuous transmission of the reverse power control bits over the forward link causes an increase in interference of the forward link and a decrease in capacity of the forward link. In addition, the continuous transmission of the reverse power control bits may increase power consumption.

Therefore, there is a need for a method capable of suppressing unnecessary transmission of a control signal in the control hold state so as to (1) minimize resync acquisition time; (2) minimize interference due to transmission of the reverse pilot/PCB channel; and (3) minimize interference due to transmission of reverse power control bits over the forward link.

SUMMARY OF THE INVENTION

It is, therefore, an object of the present invention to provide a device and method for suppressing the unnecessary transmission of a control signal in a control hold state in a CDMA communication system.

It is another object of the present invention to provide a device and method for performing gated transmission by intermittently transmitting a control signal in a control hold state in a CDMA communication system.

It is a further object of the present invention to provide a device and method for receiving a control signal transmitted intermittently in a control hold state in a CDMA communication system.

It is a still further object of the present invention to provide a device and method for intermittently transmitting a control signal on a power control group unit basis in a control hold state in a CDMA communication system.

It is yet another object of the present invention to provide a device and method for intermittently transmitting a control signal on a time slot unit basis in a control hold state in a CDMA communication system.

It is a still further object of the present invention to provide a device and method for intermittently transmitting a control signal on a frame unit basis in a control hold state in a CDMA communication system.

It is another object of the present invention to provide a device and method for controlling transmission power in the case where reverse power control bits are disposed at fixed locations, when a reverse dedicated control channel is activated in a control hold state in a CDMA communication system which intermittently transmits a control signal.

It is a further object of the present invention to provide a device and method for controlling transmission power in the case where reverse power control bits are disposed at variable locations within a power control group, when a reverse dedicated control channel is activated in a control hold state in a CDMA communication system which intermittently transmits a control signal.

It is yet another object of the present invention to provide a device and method for transmitting a reverse power control command for multiple reverse channels in a control hold state in a CDMA communication system which intermittently transmits a control signal.

It is another object of the present invention to provide a device and method for generating a reverse transmission signal to implement a time diversity in transmitting traffic data using a reverse dedicated control channel in a control hold state in a CDMA communication system which intermittently transmits a control signal.

It is yet another object of the present invention to provide a device and method for generating a transmission signal to implement a time diversity in transmitting traffic data using a forward dedicated control channel in a control hold state in a CDMA communication system which intermittently transmits a control signal.

It is yet another object of the present invention to provide a device and method for performing gated transmission when there is no user data to transmit.

It is yet another object of the present invention to provide a device and method for intermittently transmitting a signal required to maintain a channel so as to maintain a state of the channel with a minimum signal at a duration where there is no data to exchange in a CDMA mobile communication system.

In accordance with one aspect of the present invention, a transmission device for a mobile station in a CDMA communication system includes a channel signal generator for generating a pilot channel signal for a reverse link, and a gating controller for intermittently transmitting the pilot channel signal generated from the channel signal generator according to a predetermined gating rate in a control hold state. The transmission device further includes a dedicated control channel signal generator for puncturing a control message to be transmitted and inserting power control information for controlling transmission power of a reverse link in the punctured message, and a gating controller for intermittently transmitting the power control information from the dedicated control channel generator according to a predetermined gating rate in a control hold state.

BRIEF DESCRIPTION OF THE DRAWINGS

The above and other objects, features and advantages of the present invention will become more apparent from the following detailed description when taken in conjunction with the accompanying drawings in which like reference numerals indicate like parts. In the drawings:

FIG. 6E is a diagram illustrating a power control operation for a reverse pilot/PCB upon activation of a reverse dedicated control channel in a control hold state according to an embodiment of the present invention, wherein the pilot/PCB channel is intermittently transmitted at regular intervals, offset<0, and a duty cycle is $1/1$ and $1/2$;

FIG. 7A is a diagram illustrating a reverse power control procedure for multiple reverse dedicated control channels using a sharable forward dedicated control channel in a control hold state according to an embodiment of the present invention;

DETAILED DESCRIPTION OF THE PREFERRED EMBODIMENTS

Preferred embodiments of the present invention will be described herein below with reference to the accompanying drawings. In the following description, well known functions or constructions are not described in detail since they would obscure the invention in unnecessary detail.

In an embodiment of a CDMA communication system, a control signal is intermittently transmitted when there is no user data to transmit. Here, the control signal includes a power control bit (PCB) being transmitted over a forward channel, and a pilot signal and a power control bit being transmitted over a reverse link. Therefore, in accordance with the embodiment, a control signal is intermittently transmitted in a control hold state, thereby minimizing resync acquisition time caused by intermittent transmissions, and also minimizes an increase in interference due to unnecessary transmission of a reverse pilot/PCB channel and an increase in interference due to unnecessary transmission of a reverse power control bit over a forward link.

For example, in a synchronous CDMA-2000 system to which the present invention is applied, a frame length is 20 ms and each frame includes 16 power control groups. Thus, each power control group is 1.25 ms and a frame length for a dedicated control channel is 5 ms. It should be noted that the present invention can also be applied to a case where there is no user data to transmit in a UMTS system, which is a asynchronous IMT-2000 system. In the UMTS system, it is possible to transmit not only a power control bit for a dedicated physical common control channel (DPCCCH) for transmitting the control signal but also a pilot signal and a transport format combination indicator (TFCI).

Although the present invention will be described with reference to an embodiment which intermittently transmits a control signal in a control hold state in a CDMA mobile communication system, the present invention can also be applied to a case where information is intermittently transmitted to prevent an increase in interference to radio links which may be caused by unnecessary transmission of a control signal and thus, to reduce power consumption.

Figure 2A:
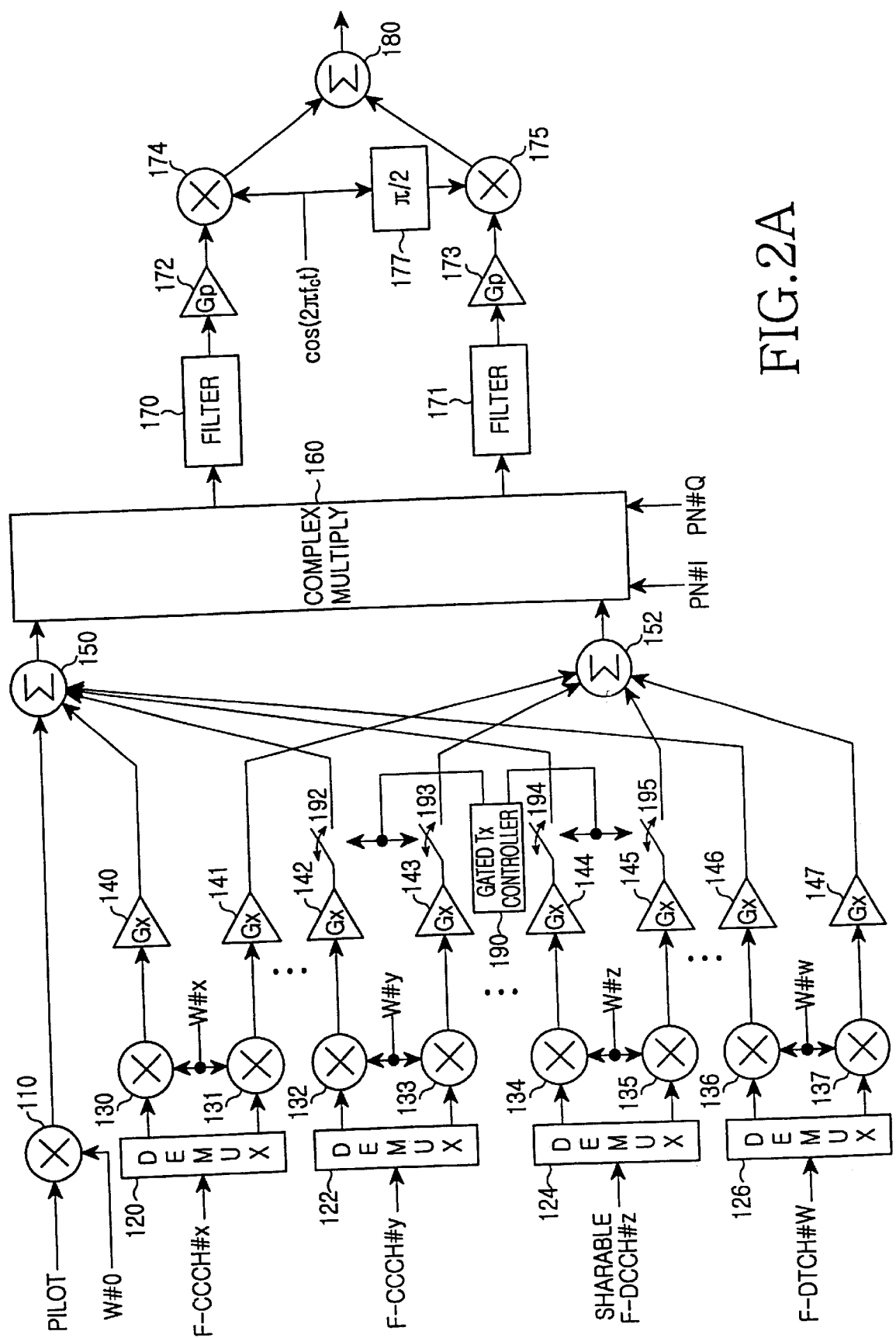
FIG. 2A is a diagram illustrating a base station transmitter for a CDMA communication system according to an embodiment of the present invention.

A reference will now be made to a base station transmitter and a mobile station transmitter, which intermittently transmit control signals in a control hold state according to an embodiment of the present invention. FIG. 2A illustrates a base station transmitter according to an embodiment of the present invention. For simplicity, FIG. 2A does not illustrate channel coding and interleaving stages of respective channel transmitters for F-CCCH, F-DCCH and F-DTCH.

Figure 1A:
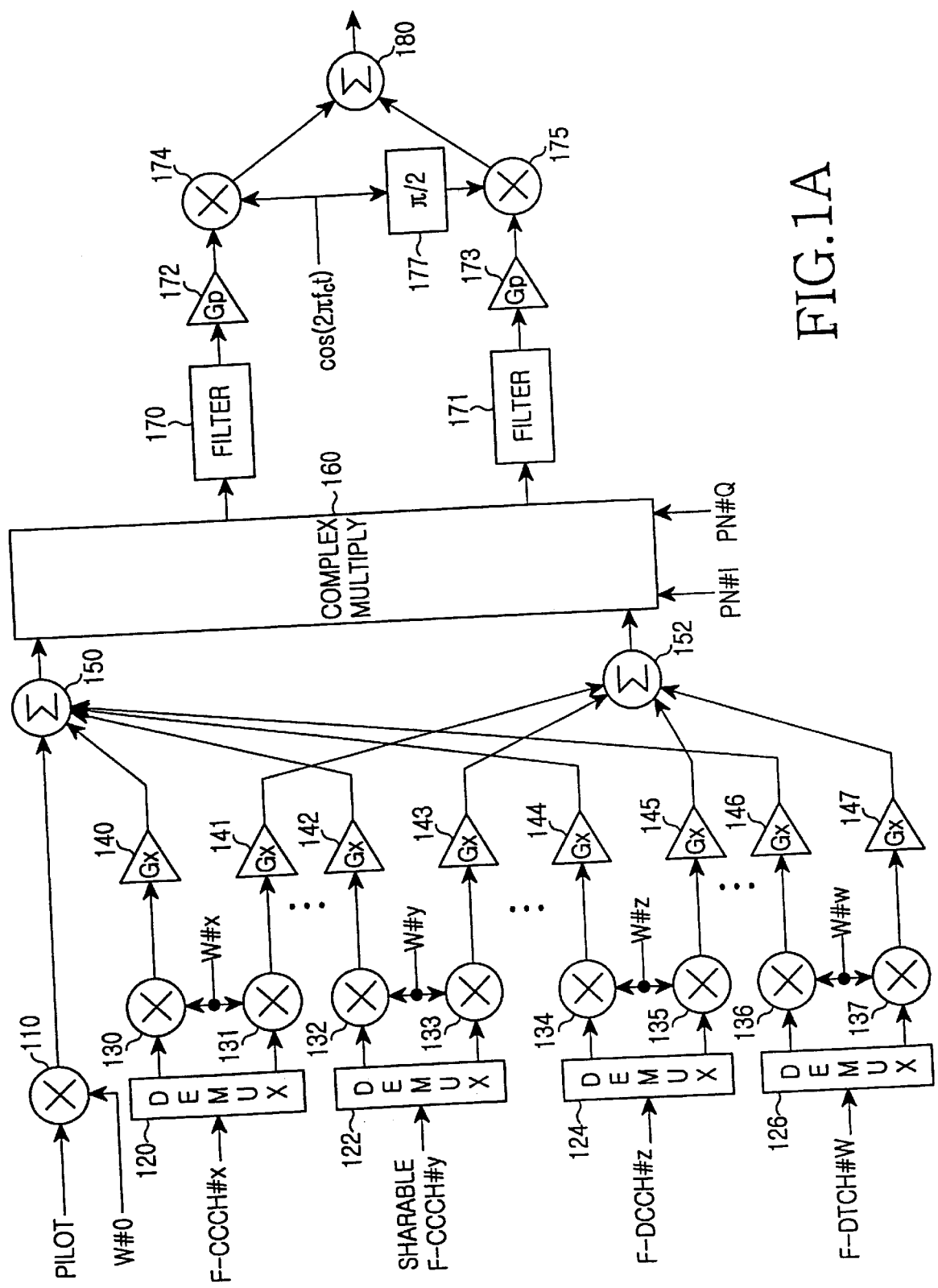
FIG. 1A is a diagram illustrating a base station transmitter for a conventional CDMA communication system.

Referring to FIG. 2A, the pilot channel, F-CCCH and F-DTCH have the same structure as those of FIG. 1A. A gated transmission (or intermittent transmission) controller 190 generates a gating (or intermitting) control signal for gating (or intermitting) transmission of a dedicated control channel in a control hold state. The gated transmission controller 190 having a gating rate (i.e., duty cycle) and a gating pattern for gated transmission in the control hold state, generates a control signal for intermittently transmitting a transmission signal on the dedicated control channel at a time previously scheduled with a mobile station. Here, the dedicated control channel includes an F-DCCH and a sharable F-DCCH.

A demultiplexer 122 demultiplexes a channel-coded interleaved control signal on the F-DCCH channel to I and Q channels. Here, a serial-to-parallel converter can be used for the demultiplexer 122. It is assumed herein that the demultiplexer 122 has a signal mapping function or receives a signal-mapped signal. Mixers 132 and 133 multiply signals output from the demultiplexer 122 by an orthogonal code W#y for the F-DCCH to orthogonally spread the signals. The mixers 132 and 133 serve as orthogonal modulators. The spread signals output from the mixers 132 and 133 are gain controlled by amplifiers 142 and 143, respectively. Switches 192 and 193 connected between output nodes of the amplifiers 142 and 143 and input nodes of summers 150 and 152, is switched in response to the gating control signal output from the gated transmission controller 190. Therefore, switches 192 and 193 intermittently transmit transmission signals on the dedicated control channel in response to the gating control signal output from the gated transmission controller 190. Instead of using the switches 192 and 193, it is also possible to control gains of the amplifiers 142 and 143 to obtain the result of gated transmission. That is, by setting a gain control signal applied to the amplifiers 142 and 143 to zero, it is possible to discontinue transmission of the dedicated control channel.

The sharable F-DCCH has the same structure as that of the F-DCCH. The other structure of the dedicated control channel transmitter is the same as that shown in FIG. 1A.

The base station transmitter of FIG. 2A gates the outputs of amplifiers 142, 143, 144 and 145 for the forward dedicated control channel F-DCCH#y and the sharable forward dedicated control channel F-DCCH#z using the gated transmission controller 190 and gates (or switches) 192, 193, 194 and 195. That is, the gated transmission controller 190 allows a reverse power control bit to be transmitted at a power control group (i.e., time slot schedule) with the mobile station when the forward and reverse dedicated control channels are not activated in the control hold state where there is no user data to exchange. When the reverse dedicated control channel is not activated (at a non-signaling transmission duration) in the control hold state, only a reverse power control bit within a forward power control group is transmitted, which is selected according to a gating pattern for the reverse pilot/PCB channel. The forward and reverse gating patterns are the same, but there exists an offset therebetween for effective power control. The offset can be given as a system parameter.

Figure 2B:
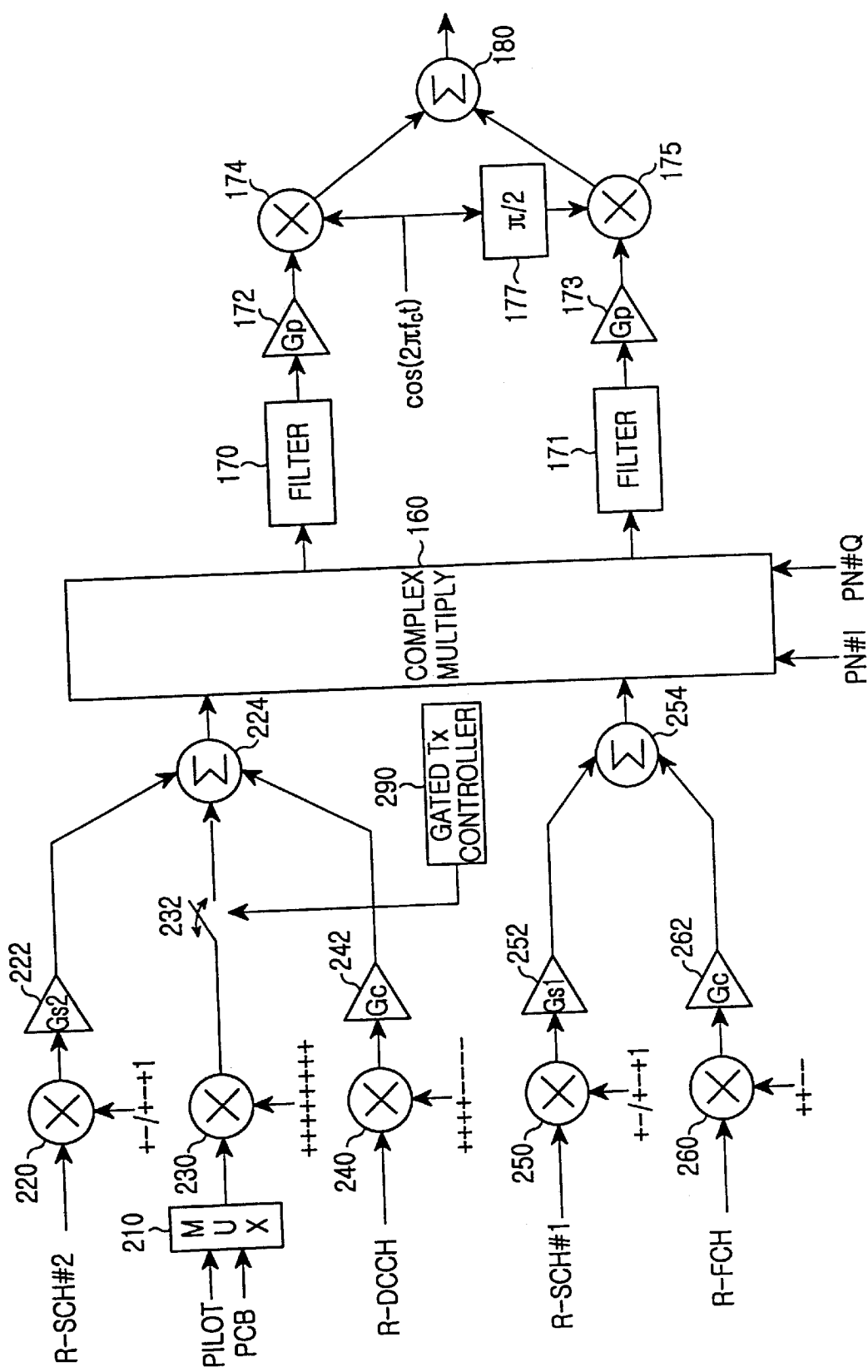
FIG. 2B is a diagram illustrating a mobile station transmitter for a CDMA communication system according to an embodiment of the present invention.

FIG. 2B illustrates a mobile station transmitter according to an embodiment of the present invention. For simplicity, FIG. 2 does not illustrate channel coding and interleaving stages of respective channel transmitters for R-SCH, R-DCCH and R-FCH. Therefore, the respective channel transmitters receive channel-coded interleaved signals.

A gated transmission controller 290 generates a gating control signal for gating transmission of a reverse pilot/PCB channel in a control hold state. The gated transmission controller 290 having a gating rate and a gating pattern for performing gated transmission in the control hold state, generates a control signal for intermittently transmitting a transmission signal on the reverse pilot/PCB channel at a time scheduled with the base station.

A multiplexer 210 multiplexes a signal on a reverse pilot channel and a power control bit for controlling power of a forward link. A mixer 230 multiplies the signal on the reverse pilot/PCB channel by an orthogonal code assigned to the pilot/PCB channel to generate an orthogonally spread signal. A switch 232 connected between an output node of the mixer 230 and an input node of a summer 224, is switched in response to the gating control signal output from the gated transmission controller 290. Therefore, the switch 232 is switched according to the gating control signal from the gated transmission controller 290 to intermittently transmit a transmission signal on the pilot/PCB channel. Instead of using the switch 232, it is also possible to provide an amplifier at an output state of the reverse pilot/PCB channel and control a gain of the amplifier to obtain the result of gated transmission. That is, by setting a gain control signal applied to the amplifier to zero, it is possible to discontinue transmission of the reverse pilot/PCB channel.

Figure 1B:
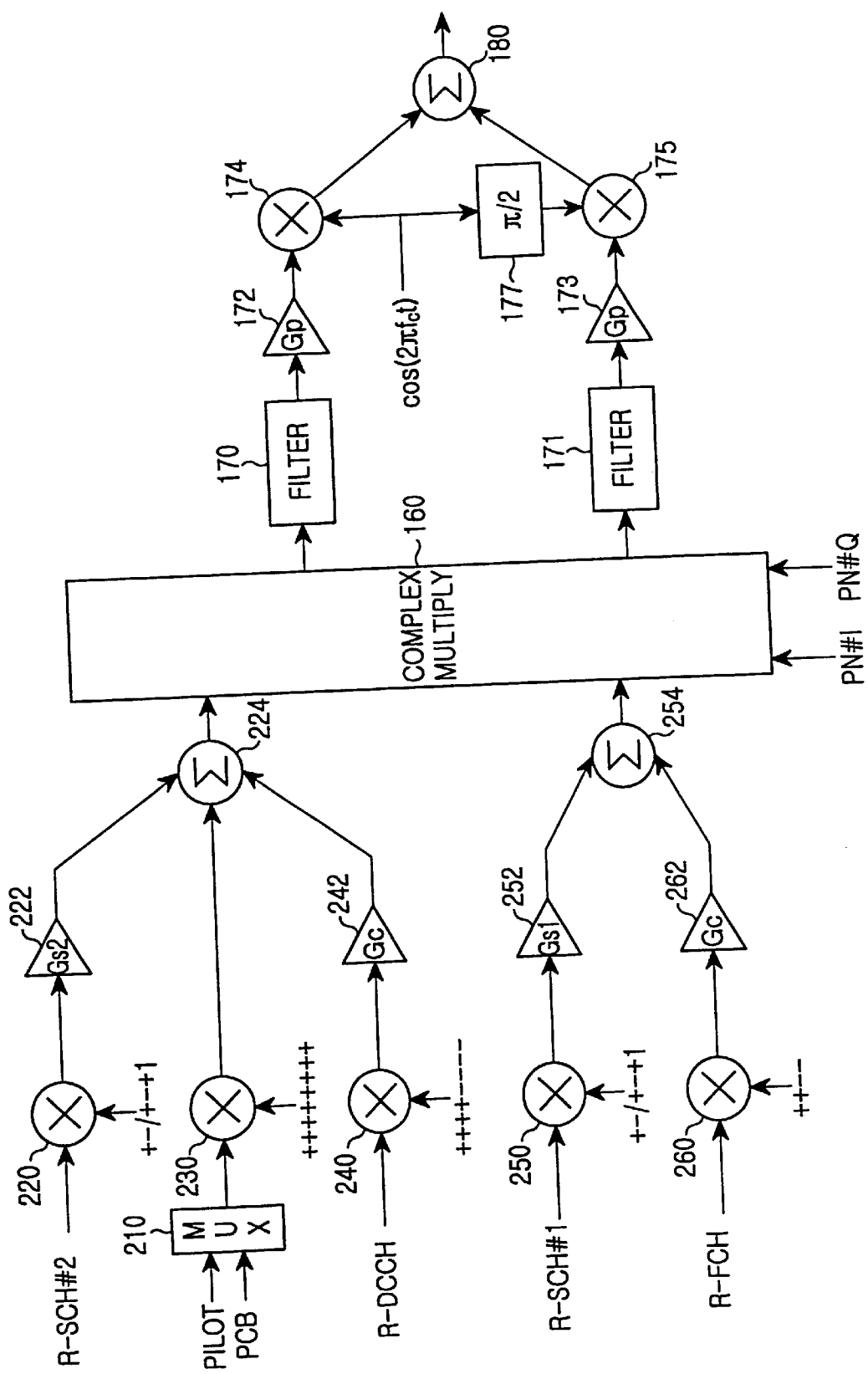
FIG. 1B is a diagram illustrating a mobile station transmitter for a conventional CDMA communication system.

The other channel transmitters have the same structure as that of FIG. 1B.

The mobile station trasnmitter of FOG. 2B includes the gated transmission controller 290 which controls the switch 232 for gating transmission of the reverse pilot/PCB channel. Since transmission of the reverse pilot/PCB channel is necessary for sync detection, it is not possible to transmit other reverse channels at a location which precludes (i.e., discontinues) the transmission of the pilot/PCB channel.

Reference will now be made to structures of signals that the base station transmitters and the mobile station transmitters of FIGS. 2A and 2B intermittently transmit in the control hold state. Herein, a description will be made with reference to a reverse pilot/PCB channel, for convenience of explanation.

Figure 3:
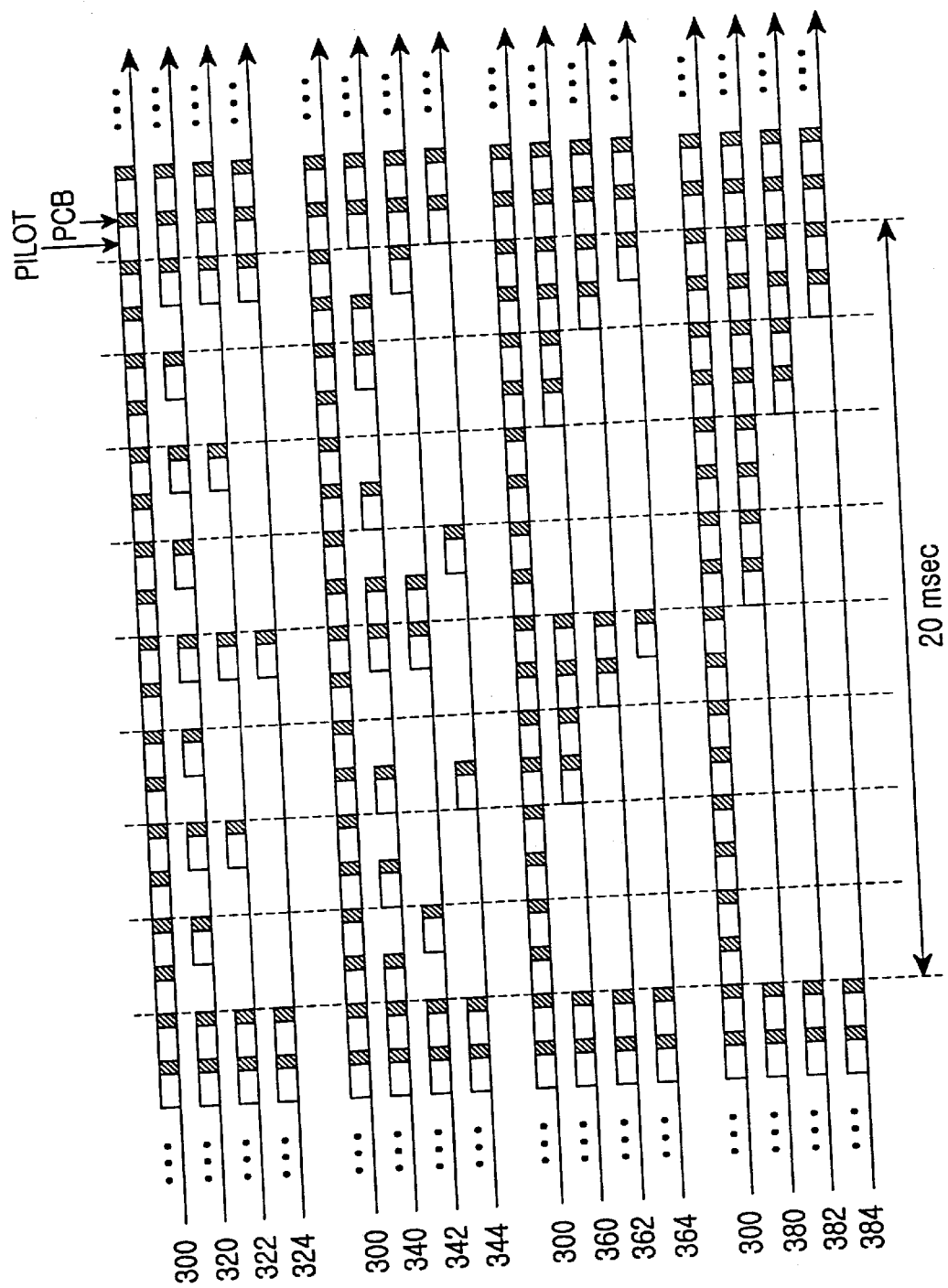
FIG. 3 is a diagram illustrating various methods for transmitting a reverse pilot/PCB channel in a control hold state in a CDMA communication system according to an embodiment of the present invention.

FIG. 3 is a diagram describing how a mobile station intermittently transmits a signal on a reverse pilot/PCB channel in a control hold state in a CDMA communication system according to an embodiment of the present invention. FIG. 3 shows various methods for intermittently transmitting the signal on the reverse pilot/PCB channel according to a gating control signal from the gated transmission controller 290, wherein the gating control signal defines regular gated transmission.

In FIG. 3, reference numeral 300 shows a method for continuously transmitting a signal on the reverse pilot/PCB channel with a gating rate 1 (i.e., duty cycle=1), when a reverse dedicated control channel (R-DCCH) is not activated in the control hold state. Shown is a case where a mobile station continuously transmits the reverse pilot/PCB channel in the control hold state, to avoid resync acquisition at a base station. In this case, an increase in interference of the reverse link inevitably decreases a capacity of the reverse link.

Reference numeral 320 shows a method for intermittently transmitting the signal on the reverse pilot/PCB channel every other power control group at regular intervals when DC=½ in the control hold state, wherein the signal is transmitted only for ½ of the total power control groups within one frame. Reference numeral 322 shows a method for intermittently transmitting the signal on the reverse pilot/PCB channel every four power control groups at regular intervals when DC=¼ in the control hold state, wherein the signal is transmitted only for ¼ of the total power control groups within one frame. Reference numeral 324 shows a method for intermittently transmitting the signal on the reverse pilot/PCB channel every eight power control groups at regular intervals when control hold state, wherein the signal is transmitted only for ⅛ of the total power control groups within one frame.

Reference numerals 340, 342 and 344 show methods for intermittently transmitting the signal on the reverse pilot/PCB channel according to an irregular gating pattern in the control hold state.

More specifically, reference numeral 340 shows a method for intermittently transmitting the signal on the reverse pilot/PCB channel every two power control groups at irregular intervals when DC=½ in the control hold state, wherein the signal is transmitted only for ½ of the total power control groups within one frame. Reference numeral 342 shows a method for intermittently transmitting the signal on the reverse pilot/PCB channel every four power control groups at irregular intervals when DC=¼ in the control hold state, wherein the signal is transmitted only for ¼ of the total power control groups within one frame. Reference numeral 344 shows a method for intermittently transmitting the signal on the reverse pilot/PCB channel every eight power control groups at irregular intervals when DC=⅛ in the control hold state, wherein the signal is transmitted only for ⅛ of the total power control groups within one frame.

Reference numerals 360, 362 and 364 show methods for intermittently transmitting the signal on the reverse pilot/PCB channel according to a regular gating pattern in the control hold state.

More specifically, reference numeral 360 shows a method for intermittently transmitting the signal on the reverse pilot/PCB channel at four consecutive power control groups at regular intervals when DC=½ in the control hold state, wherein the signal is transmitted only for ½ of the total power control groups within one frame. Reference numeral 362 shows a method for intermittently transmitting the signal on the reverse pilot/PCB channel at two consecutive power control groups at regular intervals when DC=¼ in the control hold state, wherein the signal is transmitted only for ¼ of the total power control groups within one frame. Reference numeral 364 shows a method for intermittently transmitting the signal on the reverse pilot/PCB channel at a single power control group at regular intervals when DC=⅛ in the control hold state, wherein the signal is transmitted only for ⅛ of the total power control groups within one frame. It is noted that each time the gating rate decreases by ½, ¼ and ⅛, the number of the consecutive power control groups is halved.

Reference numerals 380, 382 and 384 show methods for intermittently transmitting the signal on the reverse pilot/ PCB channel according to a regular gating pattern in the control hold state according to another embodiment of the present invention.

More specifically, reference numeral 380 shows a method for consecutively transmitting half of the total power control groups within one frame at the latter half of the frame when DC=½ in a control hold state, wherein the signal is transmitted only for ½ of the total power control groups within one frame. Reference numeral 382 shows a method for consecutively transmitting ¼ of the total power control groups within one frame beginning at a ¾ position of the frame when DC=¼ in the control hold state, wherein the signal is transmitted only for ¼ of the total power control groups within one frame. Reference numeral 384 shows a method for consecutive transmitting ⅛ of the total power control groups within one frame beginning at a ⅞ position of the frame when DC=⅛ in the control hold state, wherein the signal is transmitted only for ⅛ of the total power control groups within one frame. It is noted that for each decrease in the gating rate (i.e., ½, ¼ and ⅛), the number of the consecutive power control groups is halved.

Gated transmission of the reverse pilot/PCB channel shown in FIG. 3 is performed by the gated transmission controller 290, and the gating rate and the gating pattern should be previously scheduled with the gated transmission controller 190 in the base station. FIG. 3 shows a case where one frame is comprised of 16 power control groups or slots. In this case, the gated transmission controller 290 can perform gated transmission at four different gating rate of DC=1/1, ½, ¼ and ⅛. Further, the gated transmission controller 290 can perform gated transmission according to the regular or irregular gating pattern. It is noted that the signal transmission methods 320, 340, 360 and 380 each having the gating rate ½ show various regular and irregular gating patterns.

FIGS. 4A to 4K are diagrams for explaining how a mobile station transmits a message on a reverse dedicated control channel (R-DCCH), which is generated while performing gated transmission according to the gating rates and gating patterns shown in FIG. 3.

Figure 4A:
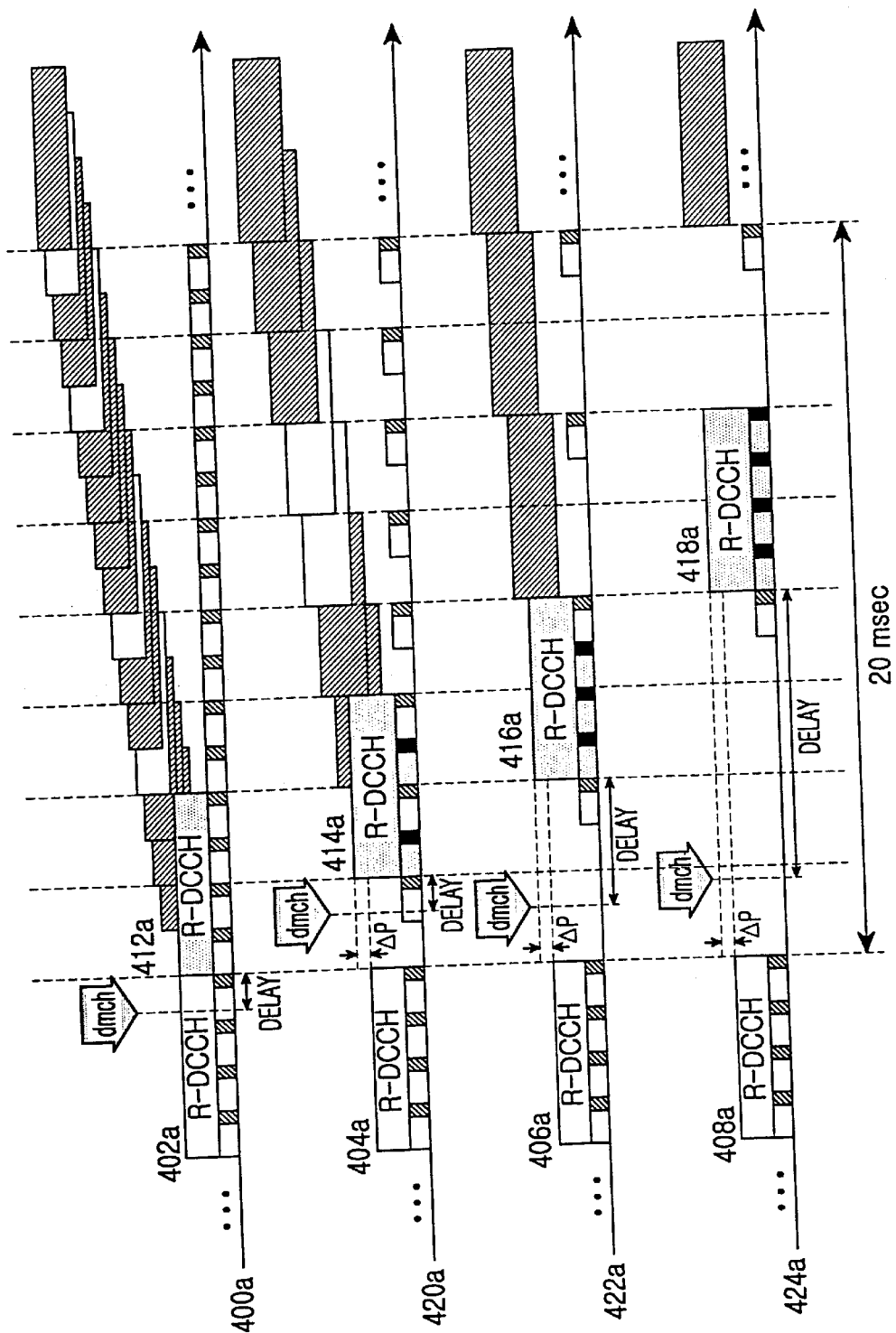
FIG. 4A is a diagram illustrating a method for transmitting a reverse pilot/PCB channel upon activation of a reverse dedicated control channel in a control hold state according to an embodiment of the present invention, wherein the reverse dedicated control channel can be comprised of power control groups and the pilot/PCB channel is intermittently transmitted at regular intervals.

Referring to FIG. 4A, reference numerals 400a, 420a, 422a and 424a represent positions where an R-DCCH can be transmitted when a mobile station performs gated transmission in the control hold state using the gating rates and gating patterns for the signal transmission methods 300, 320, 322 and 324 of FIG. 3. That is, when a dedicated MAC channel (dmch), being a logical channel, is generated while performing gated transmission as represented by reference numerals 300, 320, 322 and 324, the mobile station transmits the dmch to the R-DCCH, being a physical channel, at specific locations of the reverse pilot/TCB channels 400a, 420a, 422a and 424a.

More specifically, first, reference numeral 400a shows a method for transmitting a message on the R-DCCH in the case where a dmch message is generated during non-gated transmission (i.e., during DC=1 gated transmission). During non-gated transmission, the R-DCCH is activated within at least one power control group as represented by reference numeral 412a to transmit the dmch message. Therefore, the R-DCCH message can be transmitted at all of the 16 power control groups. Second, reference numeral 420a shows a method for transmitting the R-DCCH message in the case where a dmch message is generated during DC=½ gated transmission. In this case, the R-DCCH is activated within at least one power control group as represented by reference numeral 414a to transmit the dmch message. Third, reference numeral 422a shows a method for transmitting the R-DCCH message in the case where a dmch message is generated during DC=¼ gated transmission. In this case, the R-DCCH is activated within at least four power control groups as represented by reference numeral 416a to transmit the dmch message. Third, reference numeral 422a shows a method for transmitting the R-DCCH message in the case where a dmch message is generated during DC=⅛ gated transmission. In this case, the R-DCCH is activated within at least seven power control groups as represented by reference numeral 418a to transmit the dmch message.

In the embodiment of FIG. 4A, when a dmch message is generated during gated transmission, the power control groups are activated at the corresponding duration, even though the dmch message was generated at a location where the power control groups are not to be transmitted. That is, as shown by 400a, 420a, 422a and 424a, even the power control groups which are not to be transmitted during gated transmission are activated, to transmit the R-DCCH at the corresponding power control group duration. When it is required to transmit the R-DCCH during gated transmission, the R-DCCH is transmitted after one power control group is transmitted as a preamble signal utilizing the power control groups 414a, 416a and 418a scheduled to be transmitted according to the gating pattern, so as to enable the base station to accurately receive the R-DCCH. In addition, the R-DCCH is transmitted with transmission power which is higher by ΔP than transmission power for continuous transmission, which can be given as a system parameter.

Figure 4B:
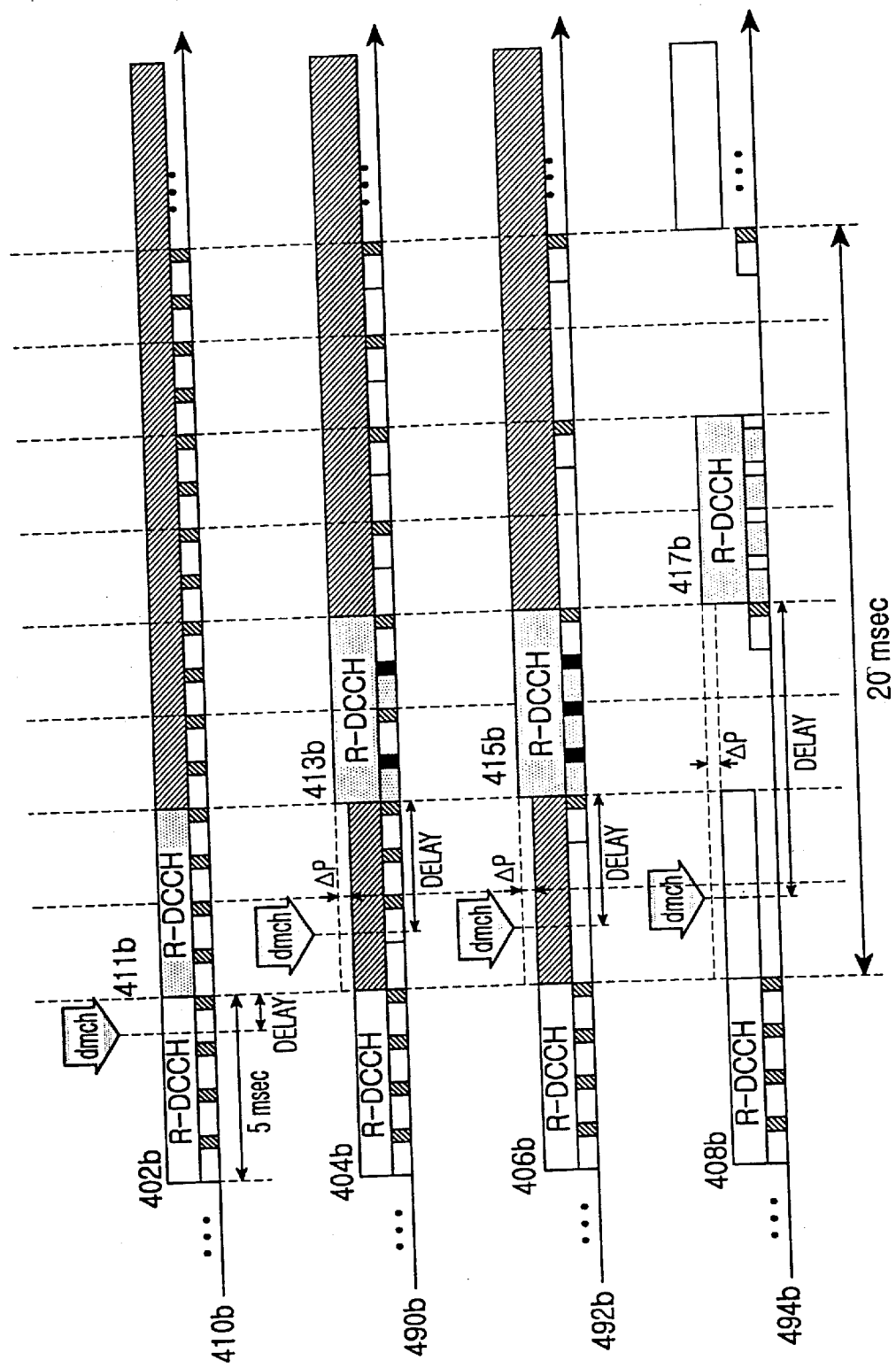
FIG. 4B is a diagram illustrating a method for transmitting a reverse pilot/PCB channel upon activation of a reverse dedicated control channel in a control hold state according to an embodiment of the present invention, wherein the reverse dedicated control channel can be comprised of dedicated control channel frames and the pilot/PCB channel is intermittently transmitted at regular intervals.

Referring to FIG. 4B, reference numerals 410b, 490b, 492b and 494b represent positions where an R-DCCH can be transmitted, in the case where a dedicated MAC channel (dmch), being a logical channel, is generated in the control hold state for the signal transmission methods 300, 320, 322 and 324 of FIG. 3 and transmitted to the R-DCCH, being a physical channel.

First, when the dmch message is generated at a non-gated transmission duration (DC=1) as shown by reference numeral 410b, the R-DCCH is activated within at least one power control group as shown by reference numeral 411b to transmit the dmch message. Therefore, the R-DCCH message can be transmitted at all of the 16 power control groups. Second, when a dmch message is generated at a location where gated transmission is performed at DC=½ as shown by reference numeral 490b, the R-DCCH is activated within at least three power control groups as shown by reference numeral 413b to transmit the dmch message. Third, when a dmch message is generated at a location where gated transmission is performed at DC=¼ as shown by reference numeral 492b, the R-DCCH is activated within at least four power control groups as shown by reference numeral 415b to transmit the dmch message. Fourth, when a dmch message is generated at a location where gated transmission is performed at DC=⅛ as shown by reference numeral 494b, the R-DCCH is activated within at least seven power control groups as shown by reference numeral 417b to transmit the dmch message.

In the embodiment illustrated in FIG. 4B, even the power control groups which are not to be transmitted during gated transmission are activated, to enable transmission of the R-DCCH at the corresponding power control group duration. When it is required to transmit the R-DCCH during gated transmission, the R-DCCH is transmitted after one power control group is transmitted as a preamble signal utilizing the power control groups 413b, 415b and 417b, so as to enable the base station to accurately receive the R-DCCH. In addition, the R-DCCH is transmitted with transmission power which is higher by $\Delta P$ than transmission power for continuous transmission. The higher transmission power can be provided as a system parameter.

Figure 4C:
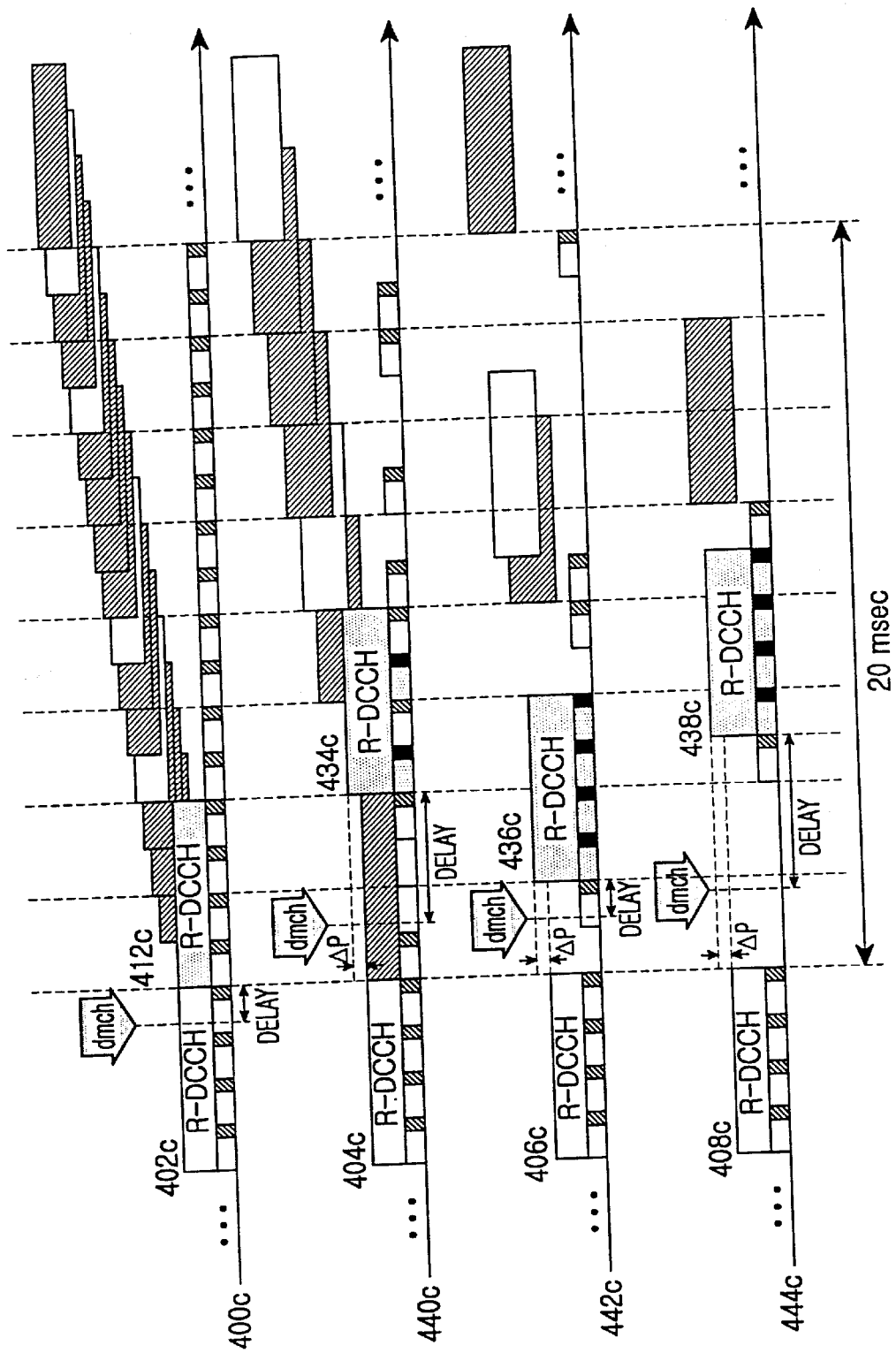
FIG. 4C is a diagram illustrating a method for transmitting a reverse pilot/PCB channel upon activation of a reverse dedicated control channel in a control hold state according to an embodiment of the present invention, wherein the reverse dedicated control channel can be comprised of power control groups and the pilot/PCB channel is intermittently transmitted at irregular intervals.

Referring to FIG. 4C, reference numerals 400c, 440c, 442c and 444c represent positions where an R-DCCH can be transmitted, in the case where a dedicated MAC channel (dmch), being a logical channel, is generated in the control hold state for the signal transmission methods 300, 340, 342 and 344 and transmitted to the R-DCCH, being a physical channel.

First, when the dmch message is generated at a non-gated transmission duration (DC=1) as shown by reference numeral 400c, the R-DCCH is activated within at least one power control group as shown by reference numeral 412c to transmit the dmch message. Therefore, the R-DCCH message can be transmitted at all of the 16 power control groups. Second, when a dmch message is generated at a location where gated transmission is performed at DC=½ as shown by reference numeral 440c, the R-DCCH is activated within at least three power control groups as shown by reference numeral 434c to transmit the dmch message. Third, when a dmch message is generated at a location where gated transmission is performed at DC=¼ as shown by reference numeral 442c, the R-DCCH is activated within at least two power control groups as shown by reference numeral 436c to transmit the dmch message. Fourth, when a dmch message is generated at a location where gated transmission is performed at DC=⅛ as shown by reference numeral 444c, the R-DCCH is activated within at least four power control groups as shown by reference numeral 438c to transmit the dmch message.

In the embodiment of FIG. 4C, as shown by 440c, 442c and 444c, even the power control groups which are not to be transmitted during gated transmission are activated, to transmit the R-DCCH at the corresponding power control group duration. When it is required to transmit the R-DCCH during gated transmission, the R-DCCH is transmitted after one power control group is transmitted as a preamble signal utilizing the power control groups 434c, 436c and 438c scheduled to be transmitted according to the gating pattern, so as to enable the base station to accurately receive the R-DCCH. In addition, the R-DCCH is transmitted with transmission power which is higher by $\Delta P$ than transmission power for continuous transmission, which can be given as a system parameter.

Figure 4D:
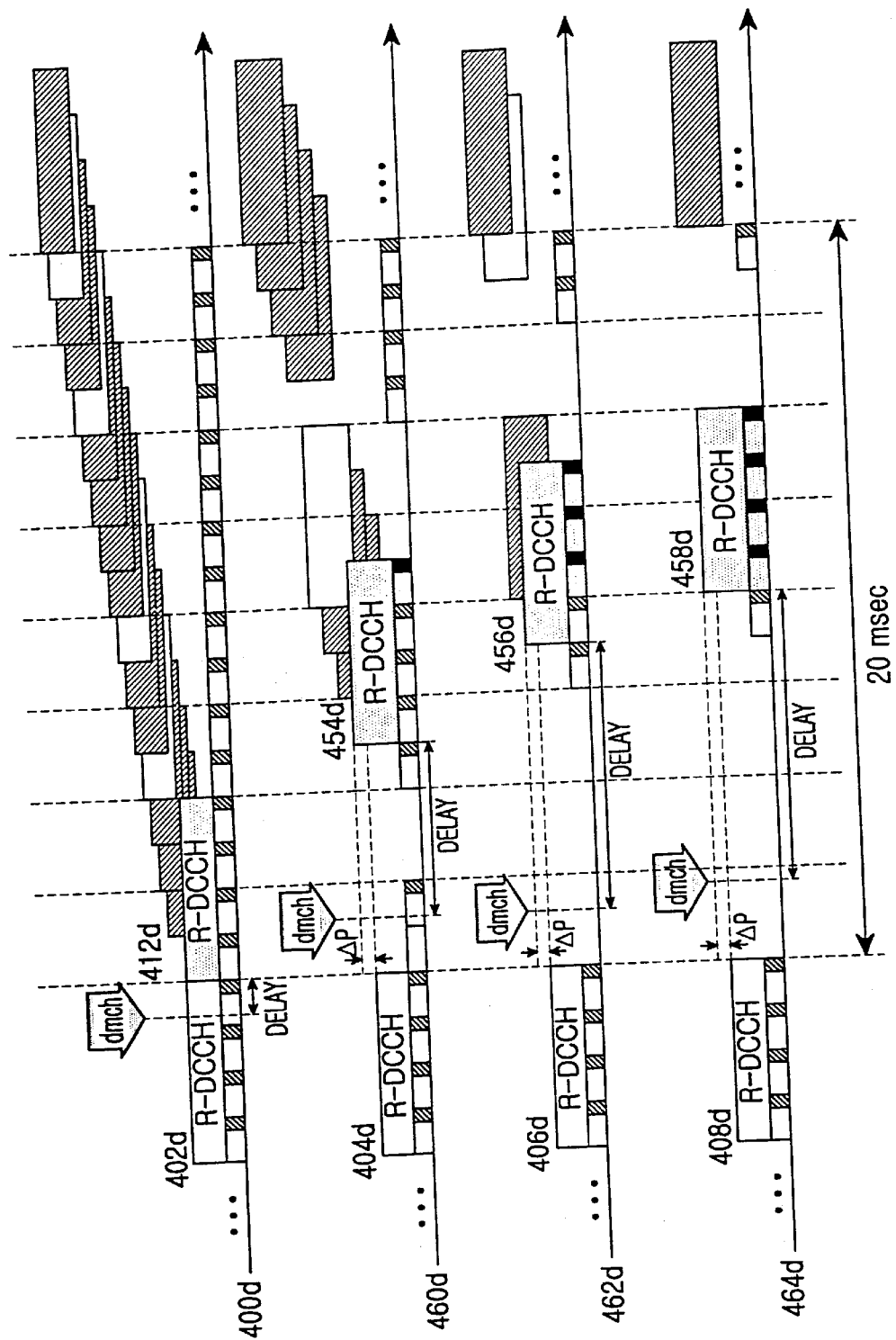
FIG. 4D is a diagram illustrating a method for transmitting a reverse pilot/PCB channel upon activation of a reverse dedicated control channel in a control hold state according to an embodiment of the present invention, wherein the reverse dedicated control channel can be comprised of power control groups and the pilot/PCB channel is intermittently transmitted at regular intervals at multiple locations within one frame in a unit of multiple times the power control group.

Referring to FIG. 4D, reference numerals 400d, 460d, 462d and 464d represent positions where an R-DCCH can be transmitted, in the case where a dedicated MAC channel dmch, being a logical channel, is generated in the control hold state for the signal transmission methods 300, 360, 362 and 364 and transmitted to the R-DCCH, being a physical channel.

First, when the dmch message is generated at a non-gated transmission duration (DC=1) as shown by reference numeral 400d, the R-DCCH is activated within at least one power control group as shown by reference numeral 412d to transmit the dmch message. Therefore, the R-DCCH can be transmitted at all of the 16 power control groups. Second, when a dmch message is generated at a location where gated transmission is performed at DC=½ as shown by reference numeral 460d, the R-DCCH is activated within at least four power control groups as shown by reference numeral 464d to transmit the dmch message. Third, when a dmch message is generated at a location where gated transmission is performed at DC=¼ as shown by reference numeral 462d, the R-DCCH is activated within at least seven power control groups as shown by reference numeral 456d to transmit the dmch message. Fourth, when a dmch message is generated at a location where gated transmission is performed at DC=⅛ as shown by reference numeral 464d, the R-DCCH is activated within at least seven power control groups as shown by reference numeral 458d to transmit the dmch message.

In the embodiment of FIG. 4D, as shown by 460d, 462d and 464d, even the power control groups which are not to be transmitted during gated transmission are activated, to transmit the R-DCCH at the corresponding power control group duration. When it is required to transmit the R-DCCH during gated transmission, the R-DCCH is transmitted after one power control group is transmitted as a preamble signal utilizing the power control groups 454d, 456d and 458d scheduled to be transmitted according to the gating pattern, so as to enable the base station to accurately receive the R-DCCH. In addition, the R-DCCH is transmitted with transmission power which is higher by $\Delta P$ than transmission power for continuous transmission, which can be given as a system parameter.

Figure 4E:
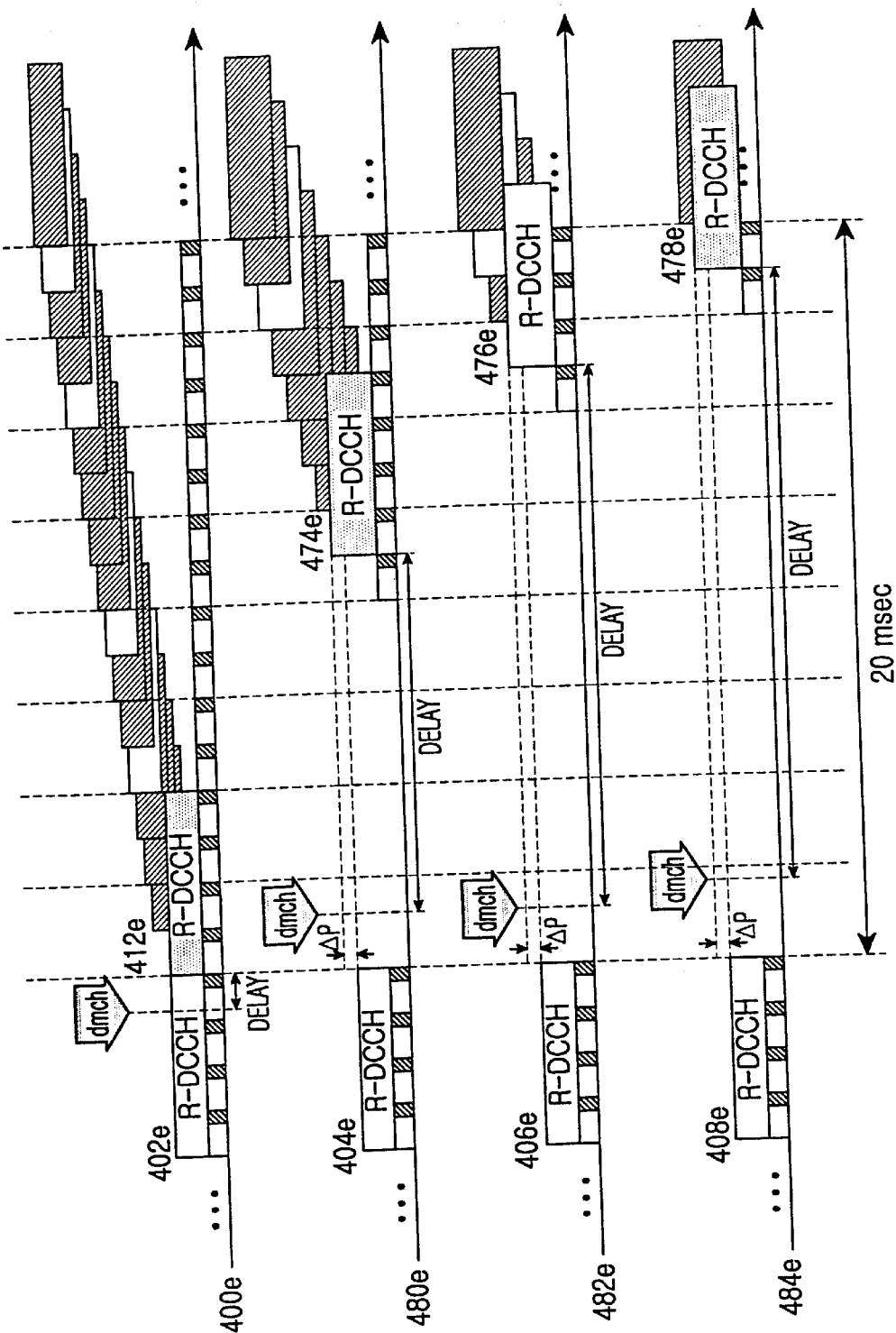
FIG. 4E is a diagram illustrating a method for transmitting a reverse pilot/PCB channel upon activation of a reverse dedicated control channel in a control hold state according to an embodiment of the present invention, wherein the reverse dedicated control channel can be comprised of power control groups and the pilot/PCB channel is intermittently transmitted at regular intervals at a single location within one frame in a unit of multiple times the power control group.

Referring to FIG. 4E, reference numerals 400e, 480e, 482e and 484e represent positions where an R-DCCH can be transmitted, in the case where a dedicated MAC channel (dmch), being a logical channel, is generated in the control hold state for the signal transmission methods 300, 380, 382 and 384 and transmitted to the R-DCCH, being a physical channel.

First, when the dmch message is generated at a non-gated transmission duration (DC=1) as shown by reference numeral 400e, the R-DCCH is activated within at least one power control group as shown by reference numeral 412e to transmit the dmch message. Therefore, the R-DCCH can be transmitted at all of the 16 power control groups. Second, when a dmch message is generated at a location where gated transmission is performed at DC=½ as shown by reference numeral 480e, the R-DCCH is activated within at least eight power control groups as shown by reference numeral 474e to transmit the dmch message. Third, when a dmch message is generated at a location where gated transmission is performed at DC=¼ as shown by reference numeral 482e, the R-DCCH is activated within at least thirteen power control groups as shown by reference numeral 476e to transmit the dmch message. Fourth, when a dmch message is generated at a location where gated transmission is performed at DC=⅛ as shown by reference numeral 484e, the R-DCCH is activated within at least fourteen power control groups as shown by reference numeral 478e to transmit the dmch message.

In the embodiment of FIG. 4E, as shown by 480e, 482e and 484e, even the power control groups which are not to be transmitted during gated transmission are activated, to transmit the R-DCCH at the corresponding power control group duration. When it is required to transmit the R-DCCH during gated transmission, the R-DCCH is transmitted after one power control group is transmitted as a preamble signal utilizing the power control groups 474e, 476e and 478e scheduled to be transmitted according to the gating pattern, so as to enable the base station to accurately receive the R-DCCH. In addition, the R-DCCH is transmitted with transmission power which is higher by ΔP than transmission power for continuous transmission, which can be given as a system parameter.

Figure 4F:
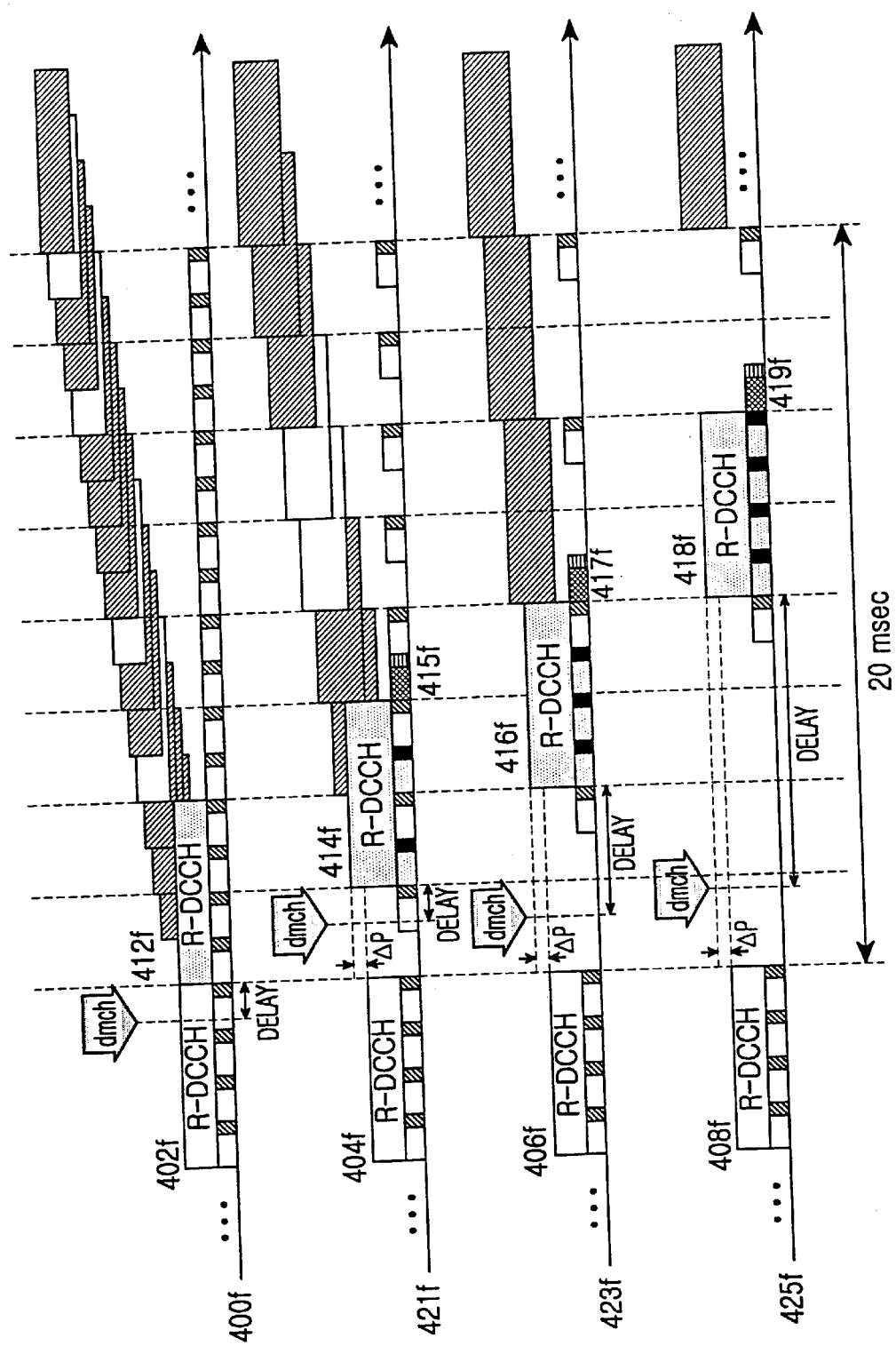
FIG. 4F is a diagram illustrating a method for transmitting a reverse pilot/PCB channel upon activation of a reverse dedicated control channel in a control hold state according to an embodiment of the present invention, wherein the reverse dedicated control channel can be comprised of power control groups, the pilot/PCB channel is intermittently transmitted at regular intervals, and only one time slot of the pilot/PCB channel is additionally transmitted after transmission of the reverse dedicated control channel.

Referring to FIG. 4F, reference numerals 400f, 421f, 423f and 425f represent positions where an R-DCCH can be transmitted, in the case where a dedicated MAC channel dmch, being a logical channel, is generated in the control hold state for the signal transmission methods 300, 320, 322 and 324 and transmitted to the R-DCCH, being a physical channel.

First, when the dmch message is generated at a non-gated transmission duration (DC=1) as shown by reference numeral 400f, the R-DCCH is activated within at least one power control group as shown by reference numeral 412f to transmit the dmch message.

Therefore, the R-DCCH can be transmitted at all of the 16 power control groups. Second, when a dmch message is generated at a location where gated transmission is performed at DC=½ as shown by reference numeral 421f, the R-DCCH is activated within at least two power control groups as shown by reference numeral 414f to transmit the dmch message. Further, as shown by reference numeral 415f, a reverse pilot/PCB channel is transmitted at a power control group (hereinafter, referred to as an additional transmission power control group) following the power control groups where the R-DCCH has been transmitted, to ensure accurate channel estimation at a base station. Third, when a dmch message is generated at a location where gated transmission is performed at DC=¼ as shown by reference numeral 423f, the R-DCCH is activated within at least four power control groups as shown by reference numeral 416f to transmit the dmch message. Further, as shown by reference numeral 416f, a reverse pilot/PCB channel is transmitted at a power control group following the power control groups where the R-DCCH has been transmitted, to ensure accurate channel estimation at the base station. Fourth, when a dmch message is generated at a location where gated transmission is performed at DC=⅛ as shown by reference numeral 425f, the R-DCCH is activated within at least seven power control groups as shown by reference numeral 418f to transmit the dmch message. Further, as shown by reference numeral 417f, a reverse pilot/PCB channel is transmitted at a power control group following the power control groups where the R-DCCH has been transmitted, to ensure accurate channel estimation at the base station.

In the embodiment of FIG. 4F, as shown by 421f, 423f and 425f, even the power control groups which are not to be transmitted during gated transmission are activated, to transmit the R-DCCH at the corresponding power control group duration. When it is required to transmit the R-DCCH during gated transmission, the R-DCCH is transmitted after one power control group is transmitted utilizing the power control groups 414f, 416f and 418f scheduled to be transmitted as a preamble signal according to the gating pattern, so as to enable the base station to accurately receive the R-DCCH. In addition, the R-DCCH is transmitted with transmission power which is higher by ΔP than transmission power for continuous transmission, which can be given as a system parameter.

Figure 4G:
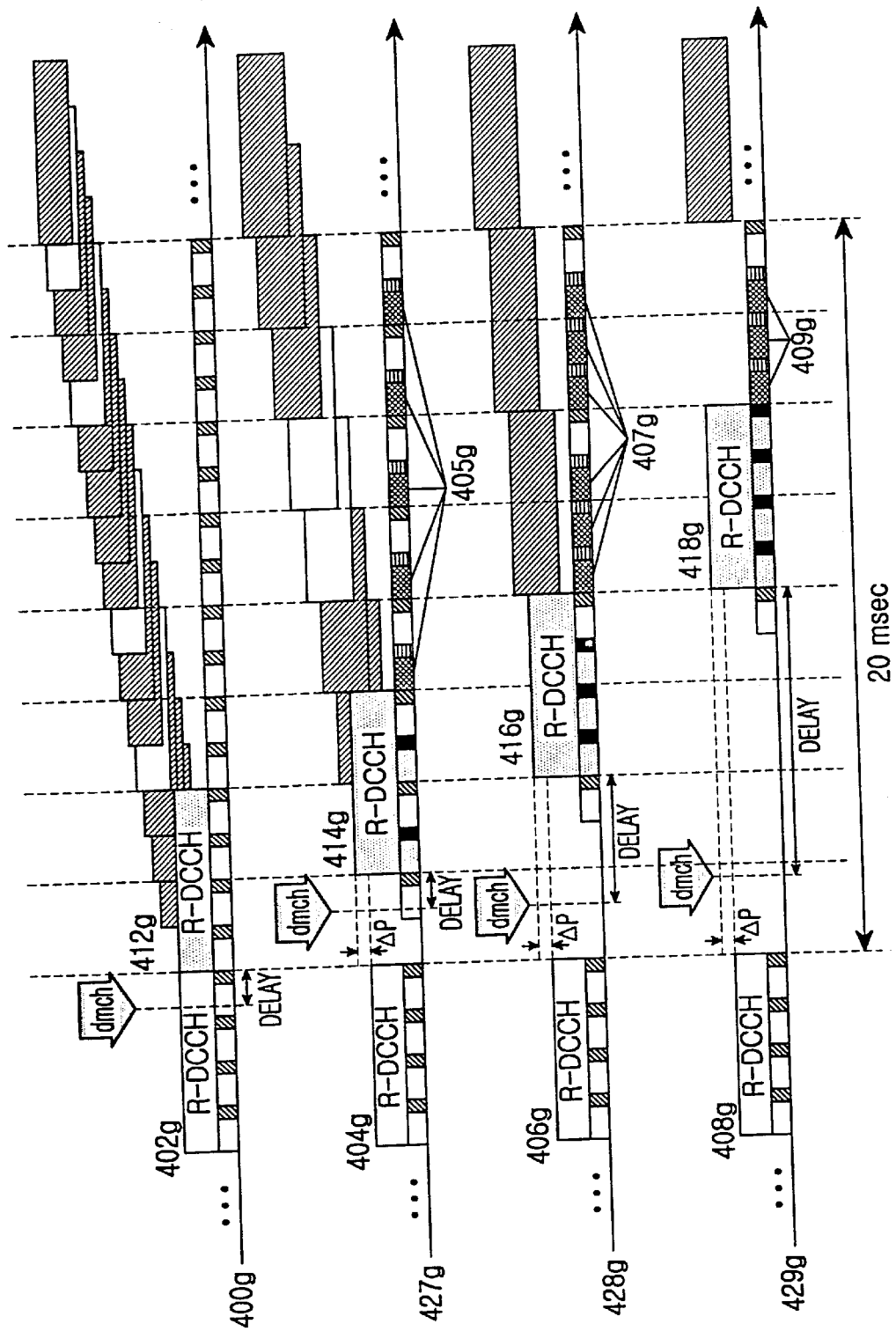
FIG. 4G is a diagram illustrating a method for transmitting a reverse pilot/PCB channel upon activation of a reverse dedicated control channel in a control hold state according to an embodiment of the present invention, wherein the reverse dedicated control channel can be comprised of power control groups, the pilot/PCB channel is intermittently transmitted at regular intervals, and the pilot/PCB channel is continuously transmitted for a remaining frame duration after transmission of the reverse dedicated control channel.

Referring to FIG. 4G, reference numerals 400g, 427g, 428g and 429g represent positions where an R-DCCH can be transmitted, in the case where a dedicated MAC channel dmch, being a logical channel, is generated in the control hold state for the signal transmission methods 300, 320, 322 and 324 and transmitted to the R-DCCH, being a physical channel.

First, when the dmch message is generated at a non-gated transmission duration (DC=1) as shown by reference numeral 400g, the R-DCCH is activated within at least one power control group as shown by reference numeral 412g to transmit the dmch message. Therefore, the R-DCCH can be transmitted at all of the 16 power control groups. Second, when a dmch message is generated at a location where gated transmission is performed at DC=½ as shown by reference numeral 427g, the R-DCCH is activated within at least one power control group as shown by reference numeral 414g to transmit the dmch message. Further, as shown by reference numeral 405g, a reverse pilot/PCB channel is transmitted at the remaining power control groups following the power control groups where the R-DCCH has been transmitted, to ensure accurate channel estimation at a base station. Third, when a dmch message is generated at a location where gated transmission is performed at DC=¼ as shown by reference numeral 428g, the R-DCCH is activated within at least four power control groups as shown by reference numeral 416g to transmit the dmch message. Further, as shown by reference numeral 407g, a reverse pilot/PCB channel is transmitted at the remaining power control groups following the power control groups where the R-DCCH has been transmitted, to ensure accurate channel estimation at the base station. Fourth, when a dmch message is generated at a location where gated transmission is performed at DC=⅛ as shown by reference numeral 429g, the R-DCCH is activated within at least seven power control groups as shown by reference numeral 418g to transmit the dmch message. Further, as shown by reference numeral 409g, a reverse pilot/PCB channel is transmitted at the remaining power control groups following the power control groups where the R-DCCH has been transmitted, to ensure accurate channel estimation at the base station.

In the embodiment of FIG. 4G, as shown by 427g, 428g and 429g, even the power control groups which are not to be transmitted during gated transmission are activated, to transmit the R-DCCH at the corresponding power control group duration. When it is required to transmit the R-DCCH during gated transmission, the R-DCCH is transmitted after one power control group is transmitted utilizing the power control groups 414g, 416g and 418g scheduled to be transmitted as a preamble signal according to the gating pattern, so as to enable the base station to accurately receive the R-DCCH. In addition, the R-DCCH is transmitted with transmission power which is higher by ΔP than transmission power for continuous transmission, which can be given as a system parameter.

With reference to FIG. 2B, a description will now be made regarding gated transmission of FIGS. 4A to 4G. The gated transmission controller 290 has the gating patterns shown in FIGS. 4A to 4G, and the switch 232 is switched according to the gating patterns output from the gated transmission controller 290. The multiplexer 210 multiplexes a pilot signal and a PCB on a power control group unit basis, and the mixer 230 multiplies a signal output from the multiplexer 210 by an orthogonal code assigned to the reverse pilot/PCB channel to generate an orthogonally spread signal. As a result, the pilot/PCB channel signals are multiplexed according to the gating patterns and the gating rates of FIG. 3, under the control of the switch 232.

When a dmch message is generated at a location where the reverse pilot/PCB channel signal is intermittently output, an R-DCCH for transmitting the dmch is activated. The dmch message is then applied to the R-DCCH to be signal converted after channel coding and interleaving. The mixer 240 then multiplies the dmch message by an orthogonal code assigned to the R-DCCH to orthogonally spread the dmch message. At this point, when it is necessary to transmit a message on a dedicated control channel through the R-DCCH during gated transmission, a undepicted controller controls the amplifier 242 to increase its transmission power by ΔP as compared with the transmission power for continuous transmission of the R-DCCH.

If the R-DCCH message is generated during gated transmission, the gated transmission controller 290 controls the signal on the reverse pilot/PCB channel in any one of the methods shown in FIGS. 4A to 4G.

The methods of FIGS. 4F and 4G for transmitting the additional power control groups can be applied not only to the regular gated transmission of FIG. 4A but also to the other gated transmissions of FIG. 4B to 4G.

A reverse dedicated control channel shown in FIGS. 4H to 4K and FIGS. 6E to 6H can be transmitted at four places of 0, 5, 10 and 15 ms within a 20 ms basic frame in a unit of a 5 ms reverse dedicated control channel frame, as in the conventional method.

Figure 4H:
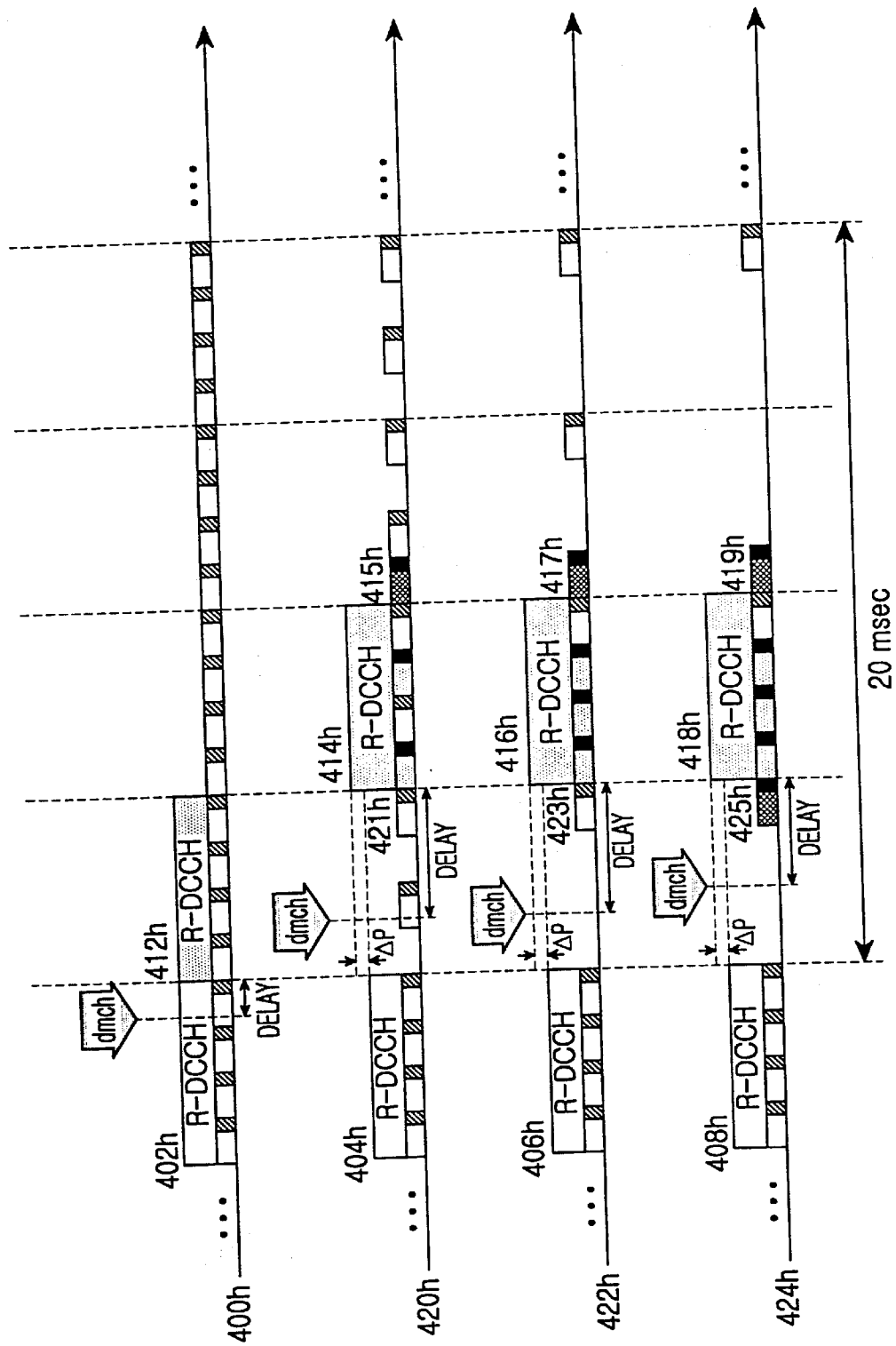
FIG. 4H is a diagram illustrating a method for transmitting a reverse pilot/PCB channel upon activation of a reverse dedicated control channel in a control hold state according to an embodiment of the present invention, wherein the pilot/PCB channel is intermittently transmitted at regular intervals.

Referring to FIG. 4H, reference numerals 400*h*, 420*h*, 422*h* and 424*h* represent locations where an R-DCCH can be transmitted, in the case where a dedicated MAC channel dmch, being a logical channel, is generated in the control hold state for the signal transmission methods 300, 320, 322 and 324 and transmitted to the R-DCCH, being a physical channel.

More specifically, reference numeral 400*h* shows a case where an R-DCCH is activated within at least 5 ms which corresponds to one R-DCCH frame length to transmit a dmch message after generation of the dmch message during non-gated transmission (DC=1), as shown by reference numeral 412*h*. Reference numeral 420*h* shows a case where an R-DCCH is activated within at least 5 ms to transmit a dmch message after generation of the dmch message during DC=½ gated transmission, as shown by reference numeral 414*h*. Reference numeral 422*h* shows a case where an R-DCCH is activated within at least 5 ms to transmit a dmch message after generation of the dmch message during DC=¼ gated transmission, as shown by reference numeral 416*h*. Reference numeral 424*h* shows a case where an R-DCCH is activated within at least 5 ms to transmit a dmch message after generation of the dmch message during DC=⅛ gated transmission, as shown by reference numeral 418*h*.

In the embodiment of FIG. 4H, as shown by 420*h*, 422*h* and 424*h*, even the power control groups which are not to be transmitted during gated transmission are activated, to transmit the R-DCCH at the corresponding power control group duration. Further, for each activated power control group, it is possible to remove a PCB duration to extend a pilot signal duration over the entire power control group. When it is required to transmit the R-DCCH during gated transmission, a preamble signal and a postamble signal are transmitted before and after the R-DCCH by activating the pilot/PCB channel. At the preamble and postamble durations, it is possible to remove the forward PCB to extend the pilot signal duration over the power control group. The number, F (≧0), of the preamble signals and the number, B(≧0), of the postamble signals are given as system parameters.

In all the embodiments, the description is made with reference to a case wherein F=1 and B=1. When a power control group scheduled to be transmitted according to the gating pattern is included in the preamble and postamble signal durations, it is not possible to remove the forward PCB. Reference numerals 420*h* and 422*h* show the cases where scheduled power control groups 421*h* and 423*h* are used for transmission of preamble signals. Reference numeral 424*h* shows a case where a power control group 425*h* is activated to transmit a preamble signal, since there is no scheduled power control group. Further, for all the cases 420*h*, 422*h* and 424*h*, there is no scheduled power control group at the postamble signal duration, so that power control groups 415*h*, 417*h* and 419*h* are activated for transmission of the postamble signals. The R-DCCH is transmitted with transmission power higher by ΔP than transmission power for continuous transmission (DC=⅛), which can be given as a system parameter. Although channel estimation is performed using the added preamble and postamble signals, a search procedure for synchronization in the control hold state is performed using a power control group scheduled to be activated.

Figure 4I:
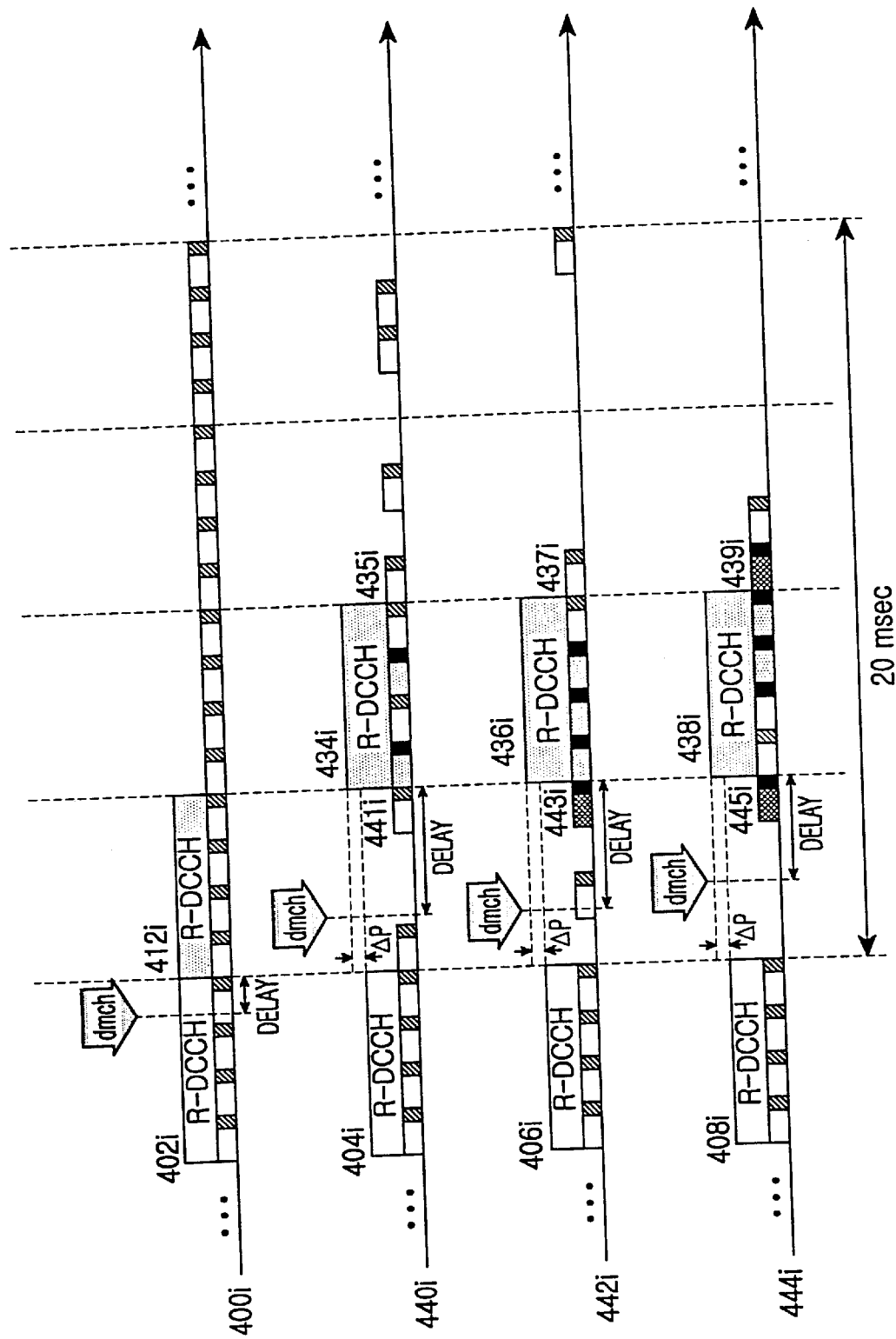
FIG. 4I is a diagram illustrating a method for transmitting a reverse pilot/PCB channel upon activation of a reverse dedicated control channel in a control hold state according to an embodiment of the present invention, wherein the pilot/PCB channel is intermittently transmitted at irregular intervals.

Referring to FIG. 4I, reference numerals 400*i*, 440*i*, 442*i* and 444*i* represent locations where an R-DCCH can be transmitted, in the case where a dedicated MAC channel dmch, being a logical channel, is generated in the control hold state for the signal transmission methods 300, 340, 342 and 344 and transmitted to the R-DCCH, being a physical channel.

More specifically, reference numeral 400*i* shows a case where an R-DCCH is activated within at least 5 ms which corresponds to one R-DCCH frame length to transmit a dmch message after generation of the dmch message during non-gated transmission (DC=1), as shown by reference numeral 412*i*. Reference numeral 440*i* shows a case where an R-DCCH is activated within at least 5 ms to transmit a dmch message after generation of the dmch message during DC=½ gated transmission, as shown by reference numeral 434*i*. Reference numeral 442*i* shows a case where an R-DCCH is activated within at least 5 ms to transmit a dmch message after generation of the dmch message during DC=¼ gated transmission, as shown by reference numeral 436*i*. Reference numeral 444*i* shows a case where an R-DCCH is activated within at least 5 ms to transmit a dmch message after generation of the dmch message during DC=⅛ gated transmission, as shown by reference numeral 438*i*.

In the embodiment of FIG. 4I, as shown by 440*i*, 442*i* and 444*i*, even the power control groups which are not to be transmitted during gated transmission are activated, to transmit the R-DCCH at the corresponding power control group duration. Further, for each activated power control group, it is possible to remove a PCB duration to extend a pilot signal duration over the entire power control group. When it is required to transmit the R-DCCH during gated transmission, a preamble signal and a postamble signal are transmitted before and after the R-DCCH by activating the pilot/PCB channel. At the preamble and postamble durations, it is possible to remove the forward PCB to extend the pilot signal duration over the power control group. The number, F (≧0), of the preamble signals and the number, B(≧0), of the postamble signals are given as system parameters.

In all the embodiments, the description is made with reference to a case wherein F=1 and B=1. When a power control group scheduled to be transmitted according to the gating pattern is included in the preamble and postamble signal durations, it is not possible to remove the forward PCB. In the case 440*i*, schedule power control groups 441*i* and 435*i* are used for transmission of preamble and postamble, respectively. In the case 442*i*, a scheduled power control group 437*i* is used for transmission of a postamble signal and a scheduled power control group 443*i* is used for transmission of a preamble signal. In the case 444*i*, since there are no scheduled power control groups for transmission of preamble and postamble signals, power control groups 445*i* and 439*i* are activated for transmission of preamble and postamble signals. The R-DCCH is transmitted with transmission power higher by ΔP than transmission power for continuous transmission (DC=1/1), which can be given as a system parameter. Although channel estimation is performed using the added preamble and postamble signals, a search procedure for synchronization in the control hold state is performed using a power control group scheduled to be activated.

Figure 4J:
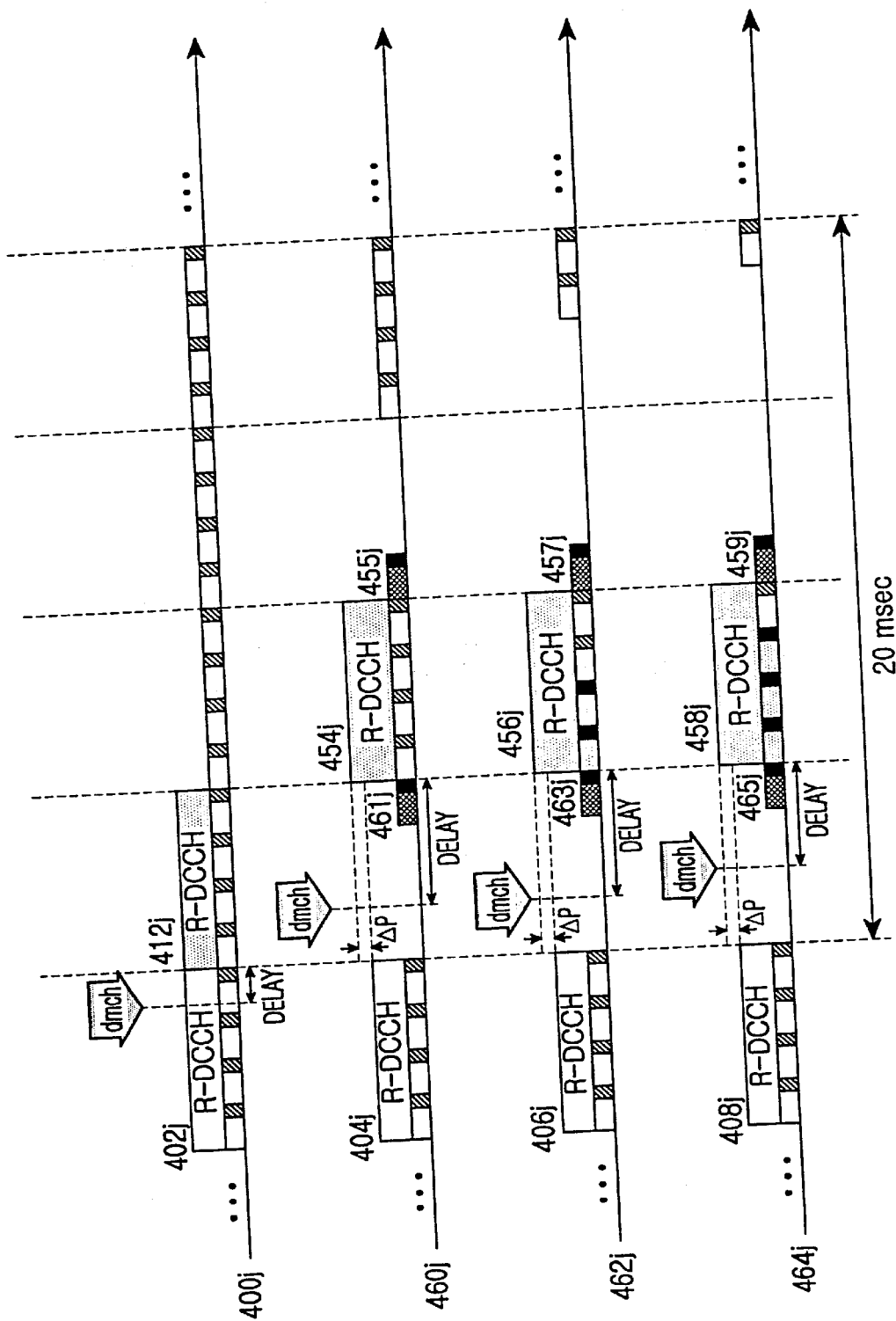
FIG. 4J is a diagram illustrating a method for transmitting a reverse pilot/PCB channel upon activation of a reverse dedicated control channel in a control hold state according to an embodiment of the present invention, wherein the pilot/PCB channel is intermittently transmitted at regular intervals at multiple locations within one frame in a unit of multiple times a time slot.

Referring to FIG. 4J, reference numerals 400*j*, 460*j*, 462*j* and 464*j* represent locations where an R-DCCH can be transmitted, in the case where a dedicated MAC channel dmch, being a logical channel, is generated in the control hold state for the signal transmission methods 300, 360, 362 and 364 and transmitted to the R-DCCH, being a physical channel.

More specifically, reference numeral 400*j* shows a case where an R-DCCH is activated within at least 5 ms which corresponds to one R-DCCH frame length to transmit a dmch message after generation of the dmch message during non-gated transmission (DC=1), as shown by reference numeral 412*j*. Reference numeral 460*j* shows a case where an R-DCCH is activated within at least 5 ms to transmit a dmch message after generation of the dmch message during DC=½ gated transmission, as shown by reference numeral 454*j*. Reference numeral 462*j* shows a case where an R-DCCH is activated within at least 5 ms to transmit a dmch message after generation of the dmch message during DC=¼ gated transmission, as shown by reference numeral 456*j*. Reference numeral 464*j* shows a case where an R-DCCH is activated within at least 5 ms to transmit a dmch message after generation of the dmch message during DC=⅛ gated transmission, as shown by reference numeral 458*j*.

In the embodiment of FIG. 4J, as shown by 460*j*, 462*j* and 464*j*, even the power control groups which are not to be transmitted during gated transmission are activated, to transmit the R-DCCH at the corresponding power control group duration. Further, for each activated power control group, it is possible to remove a PCB duration to extend a pilot signal duration over the entire power control group. When it is required to transmit the R-DCCH during gated transmission, a preamble signal and a postamble signal are transmitted before and after the R-DCCH by activating the pilot/PCB channel. At the preamble and postamble durations, it is possible to remove the forward PCB to extend the pilot signal duration over the power control group. The number, F ($\geq$0), of the preamble signals and the number, B($\geq$0), of the postamble signals are given as system parameters.

In all the embodiments, the description is made with reference to a case wherein F=1 and B=1. When a power control group scheduled to be transmitted according to the gating pattern is included in the preamble and postamble signal durations, it is not possible to remove the forward PCB. In the case 400*j*, scheduled power control groups are used for transmission of preamble and postamble signals. In the case 460*j*, since there are no scheduled power control groups for transmission of preamble and postamble signals, power control groups 461*j* and 455*j* are activated for transmission of the preamble and postamble signals, respectively. In the case 462*j*, since there are no scheduled power control groups for transmission of preamble and postamble signals, power control groups 463*j* and 457*j* are activated for transmission of the preamble and postamble signals, respectively. In the case 464*j*, since there are no scheduled power control groups for transmission of preamble and postamble signals, power control groups 465*j* and 459*j* are activated for transmission of the preamble and postamble signals, respectively. The R-DCCH is transmitted with transmission power higher by ΔP than transmission power for continuous transmission (DC=1/1), which can be given as a system parameter. Although channel estimation is performed using the added preamble and postamble signals, a search procedure for synchronization in the control hold state is performed using a power control group scheduled to be activated.

Figure 4K:
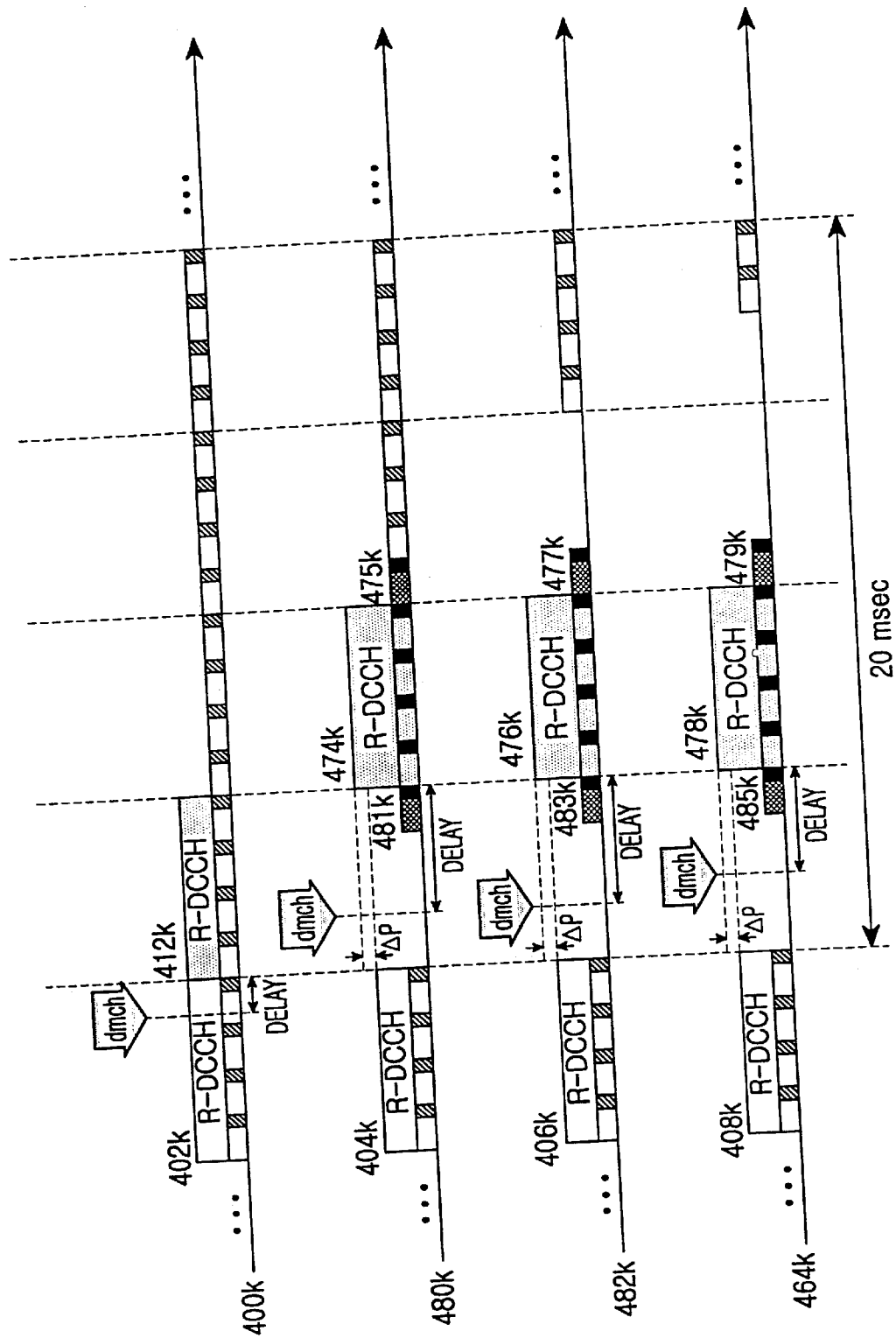
FIG. 4K is a diagram illustrating a method for transmitting a reverse pilot/PCB channel upon activation of a reverse dedicated control channel in a control hold state according to an embodiment of the present invention, wherein the pilot/PCB channel is intermittently transmitted at regular intervals at a single location within one frame in a unit of multiple times a time slot.

Referring to FIG. 4K, reference numerals 400*k*, 480*k*, 482*k* and 484*k* represent locations where an R-DCCH can be transmitted, in the case where a dedicated MAC channel dmch, being a logical channel, is generated in the control hold state for the signal transmission methods 300, 380, 382 and 384 and transmitted to the R-DCCH, being a physical channel.

More specifically, reference numeral 400*k* shows a case where an R-DCCH is activated within at least 5 ms which corresponds to one R-DCCH frame length to transmit a dmch message after generation of the dmch message during non-gated transmission (DC=1), as shown by reference numeral 412*k*. Reference numeral 480*k* shows a case where an R-DCCH is activated within at least 5 ms to transmit a dmch message after generation of the dmch message during DC=½ gated transmission, as shown by reference numeral 474*k*. Reference numeral 482*k* shows a case where an R-DCCH is activated within at least 5 ms to transmit a dmch message after generation of the dmch message during DC=¼ gated transmission, as shown by reference numeral 476*k*. Reference numeral 484*k* shows a case where an R-DCCH is activated within at least 5 ms to transmit a dmch message after generation of the dmch message during DC=⅛ gated transmission, as shown by reference numeral 478*k*.

In the embodiment of FIG. 4K, as shown by 480*k*, 482*k* and 484*k*, even the power control groups which are not to be transmitted during gated transmission are activated, to transmit the R-DCCH at the corresponding power control group duration. Further, for each activated power control group, it is possible to remove a PCB duration to extend a pilot signal duration over the entire power control group. When it is required to transmit the R-DCCH during gated transmission, a preamble signal and a postamble signal are transmitted before and after the R-DCCH by activating the pilot/PCB channel. At the preamble and postamble durations, it is possible to remove the forward PCB to extend the pilot signal duration over the power control group. The number, F ($\geq$0), of the preamble signals and the number, B($\geq$0), of the postamble signals are given as system parameters.

In all the embodiments, the description is made with reference to a case wherein F=1 and B=1. When a power control group scheduled to be transmitted according to the gating pattern is included in the preamble and postamble signal durations, it is not possible to remove the forward PCB. In the case 480*k*, a scheduled power control group 475*k* is used for transmission of a postamble signal, and a power control group 481 is activated for transmission of a preamble signal. In the case 482*k*, since there are no scheduled power control groups for transmission of preamble and postamble signals, power control groups 483*k* and 477*k* are activated for transmission of the preamble and postamble signals, respectively. In the case 484*k*, since there are no scheduled power control groups for transmission of preamble and postamble signals, power control groups 485*k* and 479*k* are activated for transmission of the preamble and postamble signals, respectively. The R-DCCH is transmitted with transmission power higher by ΔP than transmission power for continuous transmission (DC=1/1), which can be given as a system parameter. Although channel estimation is performed using the added preamble and postamble signals, a search procedure for synchronization in the control hold state is performed using a power control group scheduled to be activated.

Prior to describing FIGS. 5A to 6H, a reference will be made to the following power control methods.

Normal Power Control

A base station (or mobile station) commands a mobile station (or base station) to increase transmission power when a signal-to-interference ratio (SIR) is lower than a threshold, and the mobile station (or base station) then increases transmission power thereof according to the command. Further, the base station (or mobile station) commands the mobile station (or base station) to decrease transmission power when the SIR is higher than the threshold, and the mobile station (or base station) then decreases transmission power thereof according to the command. That is, in the normal power control method, a receiving party (or receiver) measures a receiving power of a signal transmitted from a transmitting party and transmits a normal power control bit generated in accordance wiht the measured power. A transmitting party (or transmitter) then controls power of a transmission signal according to the received normal power control bit. The normal power control bit refers to an information bit generated for the normal power control.

Defensive Power Control

A base station (or mobile station) commands a mobile station (or base station) to increase transmission power when an SIR of a received reverse link signal is lower than a threshold. That is, the base station transmits a normal power control bit. When transmission power of the mobile station (or base station), to be increased according to the command, falls within a transmission power range given as a system parameter, the mobile station increases transmission power thereof according to the command. However, when transmission power of the mobile station (or base station), to be increased according to the command, exceeds the transmission power range given as a system parameter, the mobile station maintains the present transmission power thereof. Further, the base station (or mobile station) commands the mobile station (or base station) to decrease transmission power when the SIR of the received reverse link signal is higher than the threshold. That is, the base station (or mobile station) transmits a normal power control bit, and the mobile station (or base station) decreases transmission power thereof according to the command. For the power-down command, the defensive power control method has the same operation as that of the normal power control method. However, for the power-up command, the two power control methods operate differently as described above.

Figure 5A:
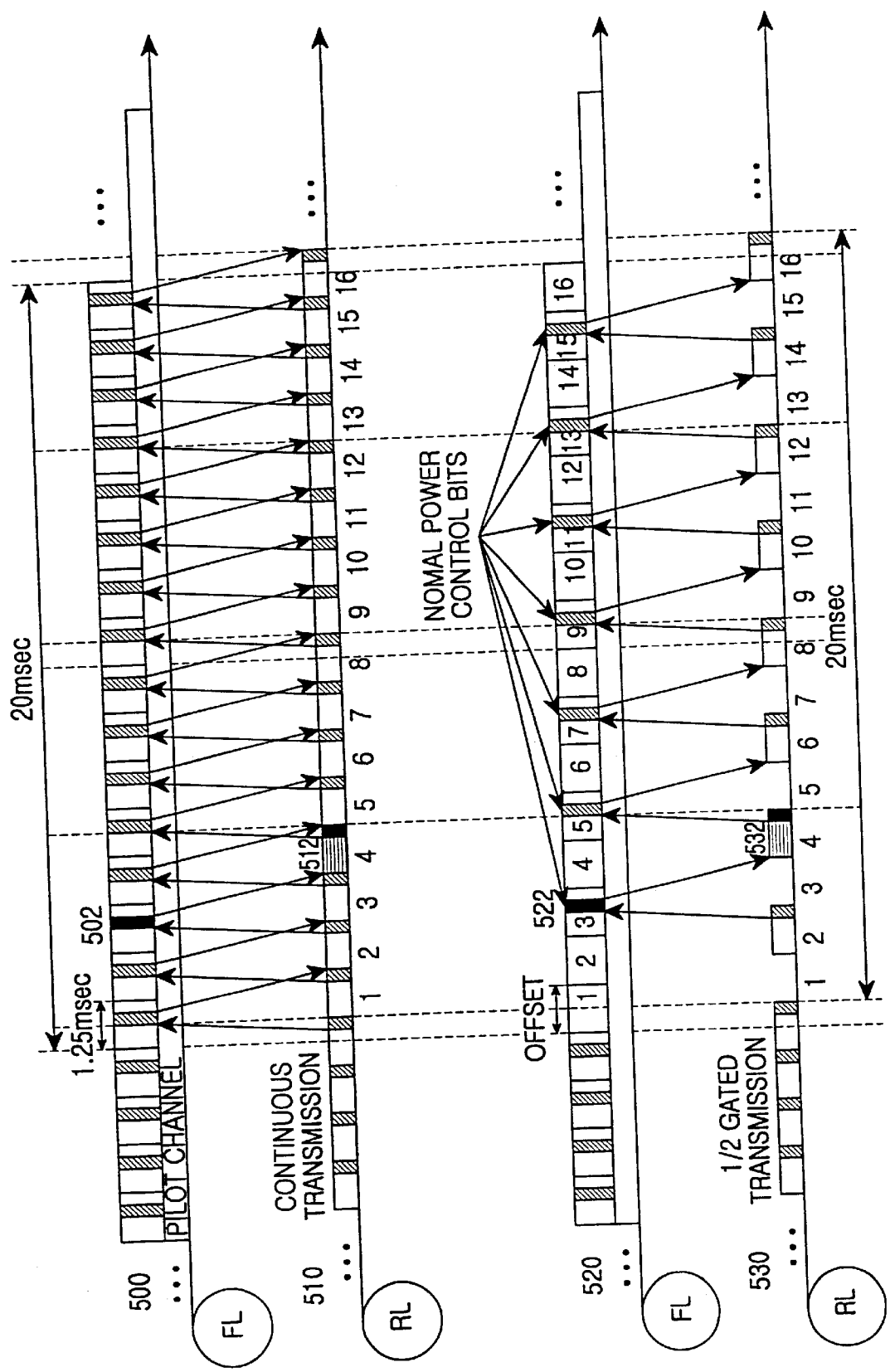
FIG. 5A is a diagram illustrating a power control operation for a reverse pilot/PCB channel in a control hold state according to an embodiment of the present invention, wherein the pilot/PCB channel is intermittently transmitted at regular intervals and a duty cycle is $1/1$ and $1/2$.

First, in FIGS. 5A and 5E, reference numeral 500 represents continuous transmission (DC=1) for a forward dedicated control channel (F-DCCH) and reference numeral 510 represents continuous transmission (DC=1) for a reverse pilot/PCB channel. Second, in FIGS. 5A and 5B, reference numeral 520 represents DC=½ gated transmission for a forward dedicated control channel and reference numeral 530 represents DC=½ gated transmission for a reverse pilot/PCB channel. Third, in FIGS. 5A and 5B, reference numeral 540 represents DC=¼ gated transmission for a forward dedicated control channel and reference numeral 550 represents DC=¼ gated transmission for a reverse pilot/PCB channel. Fourth, in FIGS. 5A and 5B, reference numeral 560 represents DC=⅛ gated transmission for a forward dedicated control channel and reference numeral 570 represents DC=⅛ gated transmission for a reverse pilot/PCB channel.

Figure 5B:
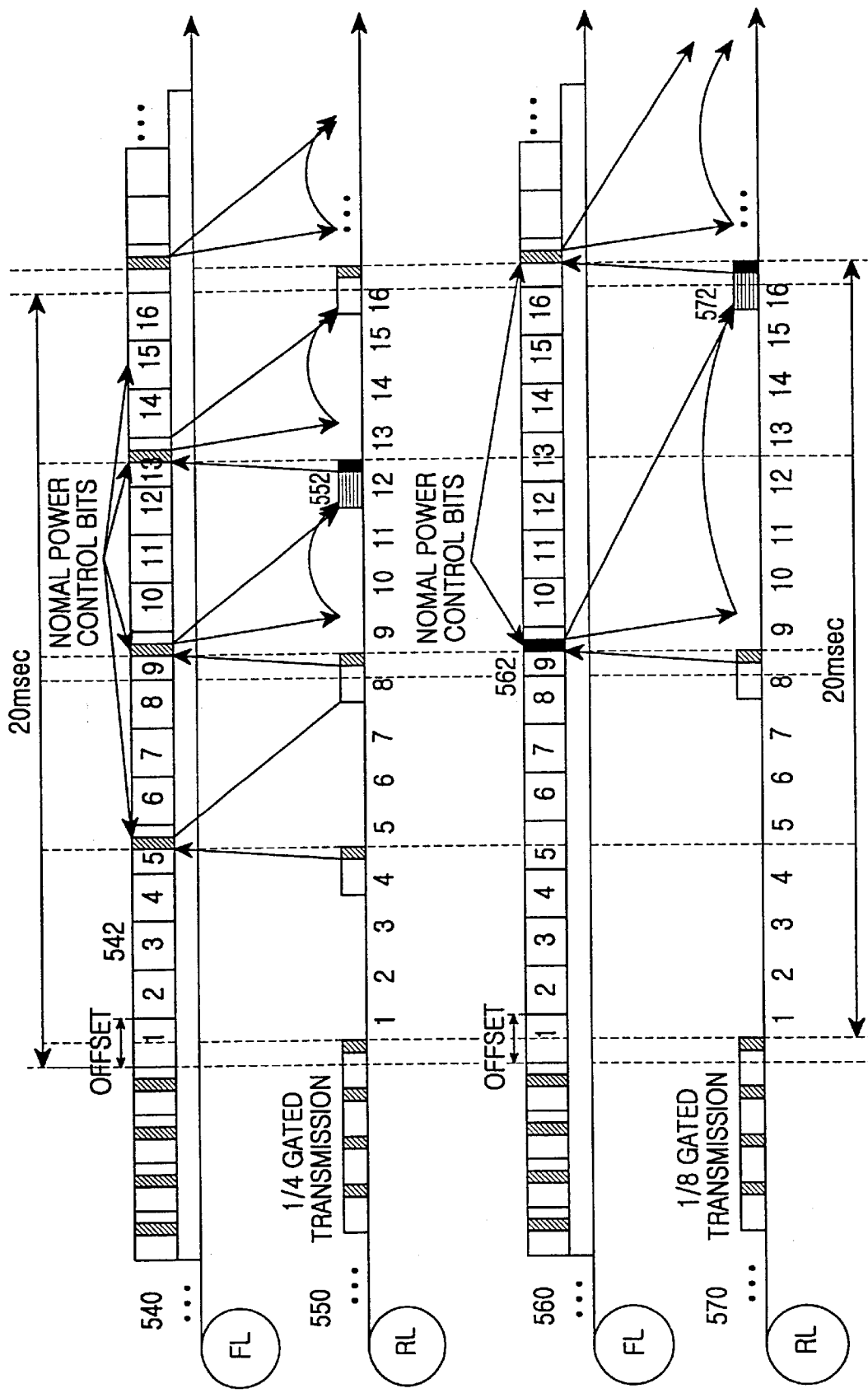
FIG. 5B is a diagram illustrating a power control operation for a reverse pilot/PCB channel in a control hold state according to an embodiment of the present invention, wherein the pilot/PCB channel is intermittently transmitted at regular intervals and a duty cycle is $1/4$ and $1/8$.
Figure 5C:
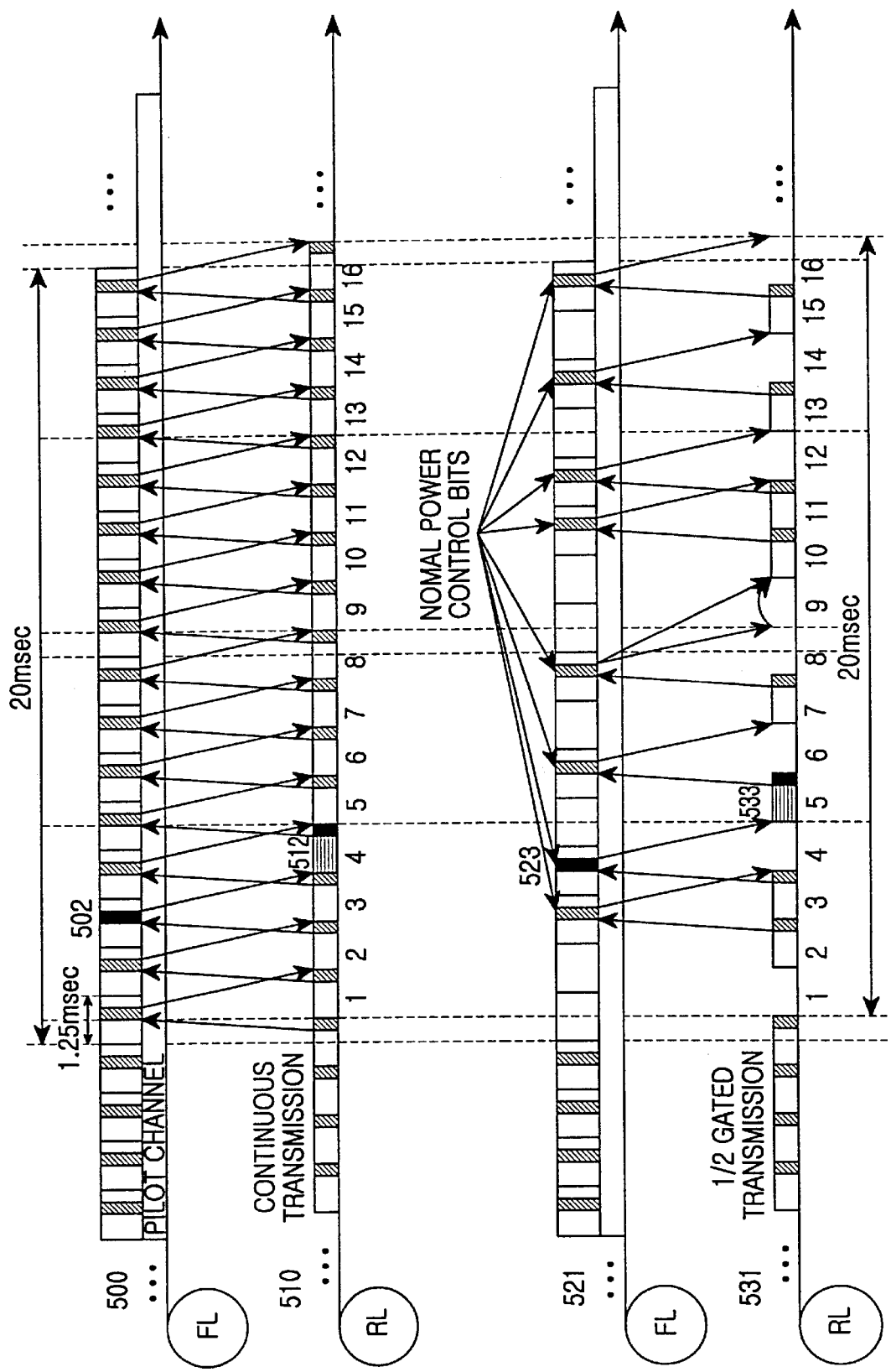
FIG. 5C is a diagram illustrating a power control operation for a reverse pilot/PCB channel in a control hold state according to an embodiment of the present invention, wherein the pilot/PCB channel is intermittently transmitted at irregular intervals and a duty cycle is $1/1$ and $1/2$.

Reference numerals 500 and 510 of FIGS. 5A and 5C represent power control methods for a reverse pilot/PCB channel for continuous transmission (DC=1) when an R-DCCH is not activated in the control hold state. In this case, the forward power control and the reverse power control are performed at the same intervals.

Reference numerals 520 and 530 of FIG. 5A represent power control methods for a reverse pilot/PCB channel for DC=½ regular gated transmission when an R-DCCH is not activated in the control hold state. In this case, the forward power control and the reverse power control are performed at the same intervals. A location of the reverse power control bit in the forward channel is determined according to a gating pattern for the reverse link. The reverse power control bit is generated according to the normal power control method. For effective power control, an offset which may be given as a system parameter is provided between a forward gating pattern and a reverse gating pattern within one frame. In the embodiments of FIGS. 5A to 5D, the offset has a positive value. FIGS. 5A to 5D illustrate normal power control methods for the case where the R-DCCH is not activated in the control hold state. FIGS. 6A to 6D illustrate power control methods for the case where an R-DCCH is activated in the control hold state, wherein the defensive power control is used. Since a location where a reverse power control bit is located in the forward channel is determined according to a gating pattern for a reverse link, there occurs a time delay when transmitting one valid reverse power control command the delay is uniform since the gating pattern is a regular gating pattern. That is, in FIG. 5A, a reverse power control command 522 is applied to a power control group 532 of a reverse pilot/PCB channel.

Reference numerals 540 and 550 of FIG. 5B represent power control methods for DC=¼ regular gated transmission of a reverse pilot/PCB channel when an R-DCCH is not activated in the control hold state. In this case, the forward power control and the reverse power control are performed at the same intervals. A location of the reverse power control bit in the forward channel is determined according to a gating pattern for the reverse link. The reverse power control bit is generated according to the normal power control process. For effective power control, an offset which may be given as a system parameter is provided between a forward gating pattern and a forward gating pattern within one frame. As shown in FIGS. 5A to 5D, when an R-DCCH is not activated in the control hold state, the normal power control is performed. However, as shown in FIGS. 6A to 6H, when the R-DCCH is activated in the control hold state, the defensive power control is performed. Since a location where a reverse power control bit is located in the forward channel is determined according to a gating pattern for a reverse link, there occurs a time delay when transmitting one valid reverse power control command. The delay is uniform since the gating pattern is a regular gating pattern. A reverse power control command 542 is applied to a power control group 552 on a reverse pilot/PCB channel.

Reference numerals 560 and 570 in FIG. 5B represent power control methods for DC=⅛ regular gated transmission when an R-DCCH is not activated in the control hold state. In this case, the forward power control and the reverse power control are performed at the same intervals. A location of the reverse power control bit in the forward channel is determined according to a gating pattern for the reverse link. The reverse power control bit is generated according to the normal power control process. For effective power control, an offset which may be given as a system parameter is provided between a forward gating pattern and a forward gating pattern within one frame. As shown in FIGS. 5A to 5D, when an R-DCCH is not activated in the control hold state, the normal power control is performed. However, as shown in FIGS. 6A–6H, when the R-DCCH is activated in the control hold state, the defensive power control is performed. Since a location where a reverse power control bit is located in the forward channel is determined according to a gating pattern for a reverse link, there occurs a time delay when transmitting one valid reverse power control command. The delay is uniform since the gating pattern is an regular gating pattern. A reverse power control command 562 is applied to a power control group 572 on a reverse pilot/PCB channel.

Reference numerals 521 and 531 in FIG. 5C represent power control methods for DC=½ irregular gated transmission when an R-DCCH is not activated in the control hold state. In this case, the forward power control and the reverse power control are performed at the same intervals. A location of the reverse power control bit in the forward channel is determined according to a gating pattern for the reverse link. The reverse power control bit is generated according to the normal power control process. For effective power control, an offset which may be given as a system parameter is provided between a forward gating pattern and a forward gating pattern within one frame. As shown in FIGS. 5A to 5D, when an R-DCCH is not activated in the control hold state, the normal power control is performed. However, as shown in FIGS. 6A–6H, when the R-DCCH is activated in the control hold state, the defensive power control is performed. Since a location where a reverse power control bit is located in the forward channel is determined according to a gating pattern for a reverse link, there occurs a time delay when transmitting one valid reverse power control command. The delay is not uniform since the gating pattern is an irregular gating pattern. A reverse power control command 523 is applied to a power control group 533 on a reverse pilot/PCB channel.

Figure 5D:
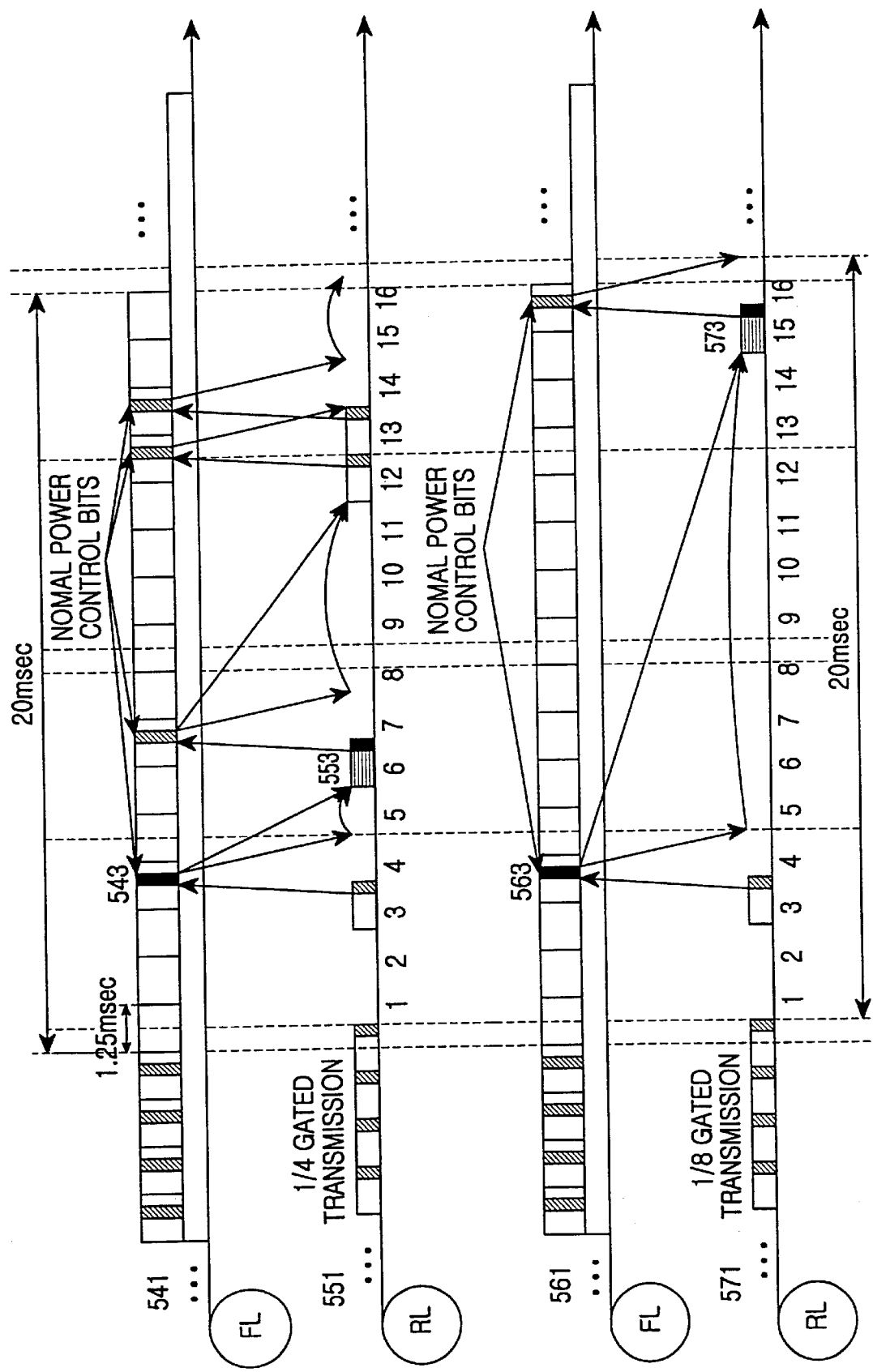
FIG. 5D is a diagram illustrating a power control operation for a reverse pilot/PCB channel in a control hold state according to an embodiment of the present invention, wherein the pilot/PCB channel is intermittently transmitted at irregular intervals and a duty cycle is $1/4$ and $1/8$.

Reference numerals 541 and 551 in FIG. 5D represent power control methods for DC=¼ irregular gated transmission when an R-DCCH is not activated in the control hold state. In this case, the forward power control and the reverse power control are performed at the same intervals. A location of the reverse power control bit in the forward channel is determined according to a gating pattern for the reverse link. The reverse power control bit is generated in the normal power control method. For effective power control, an offset which may be given as a system parameter is provided between a forward gating pattern and a forward gating pattern within one frame. As shown in FIGS. 5A to 5D, when an R-DCCH is not activated in the control hold state, the normal power control is performed. However, as shown in FIGS. 6A–6H, when the R-DCCH is activated in the control hold state, the defensive power control is performed. Further, when the R-DCCH is activated upon generation of a control signal to be transmitted, it is possible to transmit the control signal at the gating rate 1 (DC=1). Since a location where a reverse power control bit is located in the forward channel is determined according to a gating pattern for a reverse link, there occurs a time delay when transmitting one valid reverse power control command. The delay is not uniform since the gating pattern is an irregular gating pattern. A reverse power control command 543 is applied to a power control group 553 on a reverse pilot/PCB channel.

Reference numerals 561d and 571d in FIG. 5D represent power control methods for DC=⅛ irregular gated transmission when an R-DCCH is not activated in the control hold state. In this case, the forward power control and the reverse power control are performed at the same intervals. A location of the reverse power control bit in the forward channel is determined according to a gating pattern for the reverse link. The reverse power control bit is generated in the normal power control method. For effective power control, an offset which may be given as a system parameter is provided between a forward gating pattern and a forward gating pattern within one frame. As shown in FIGS. 5A to 5D, when an R-DCCH is not activated in the control hold state, the normal power control is performed. However, as shown in FIGS. 6A–6H, when the R-DCCH is activated in the control hold state, the defensive power control is performed. Further, when the R-DCCH is activated upon generation of a control signal to be transmitted, it is possible to transmit the control signal at the gating rate 1 (DC=1). Since a location where a reverse power control bit is located in the forward channel is determined according to a gating pattern for a reverse link, there occurs a time delay when transmitting one valid reverse power control command. The delay is not uniform since the gating pattern is an irregular gating pattern. A reverse power control command 563 is applied to a power control group 573 on a reverse pilot/PCB channel.

Figure 6A:
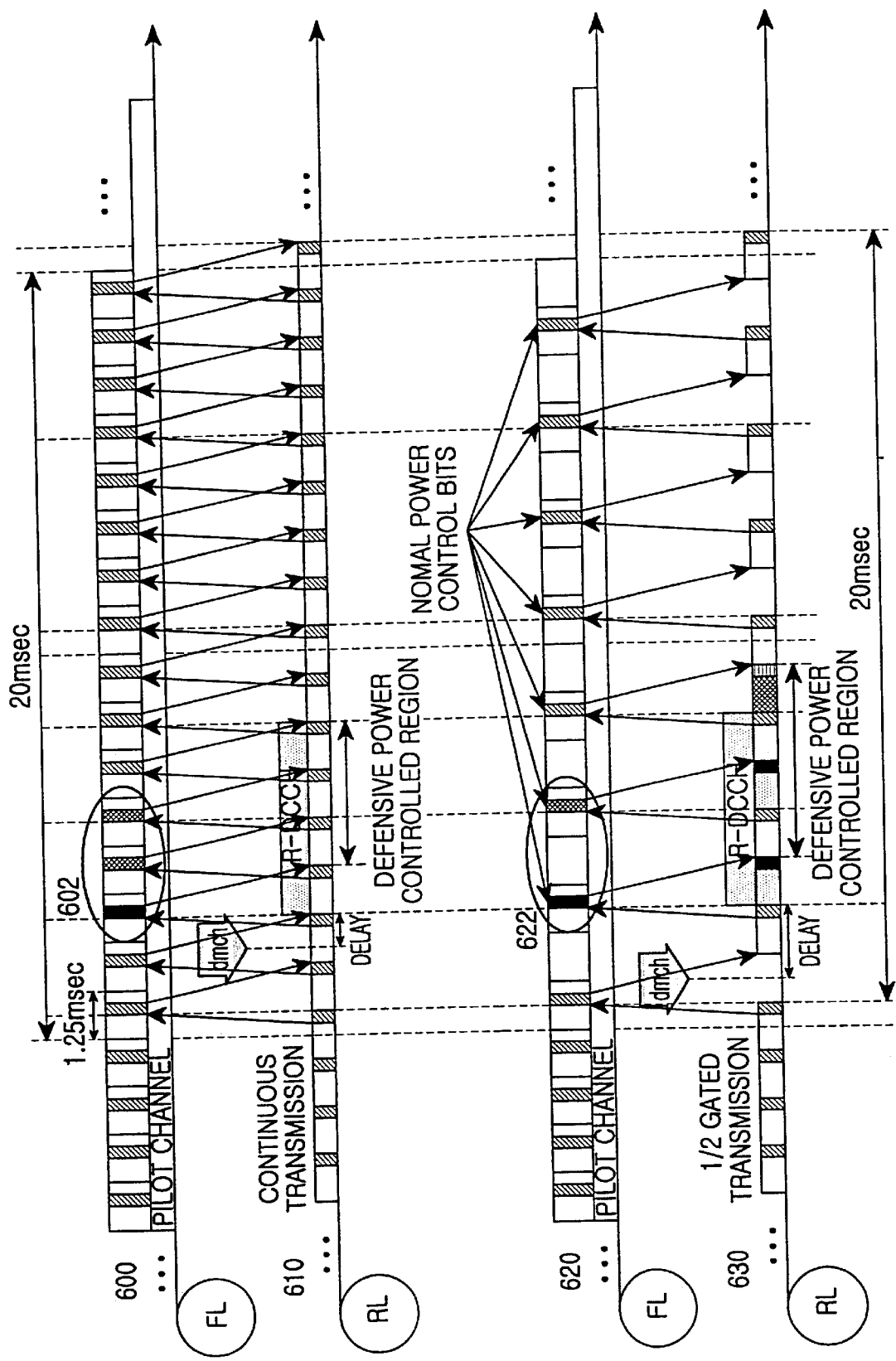
FIG. 6A is a diagram illustrating a power control operation for a reverse pilot/PCB upon activation of a reverse dedicated control channel in a control hold state according to an embodiment of the present invention, wherein the pilot/PCB channel is intermittently transmitted at regular intervals, offset<0, and a duty cycle is $1/1$ and $1/2$.
Figure 6B:
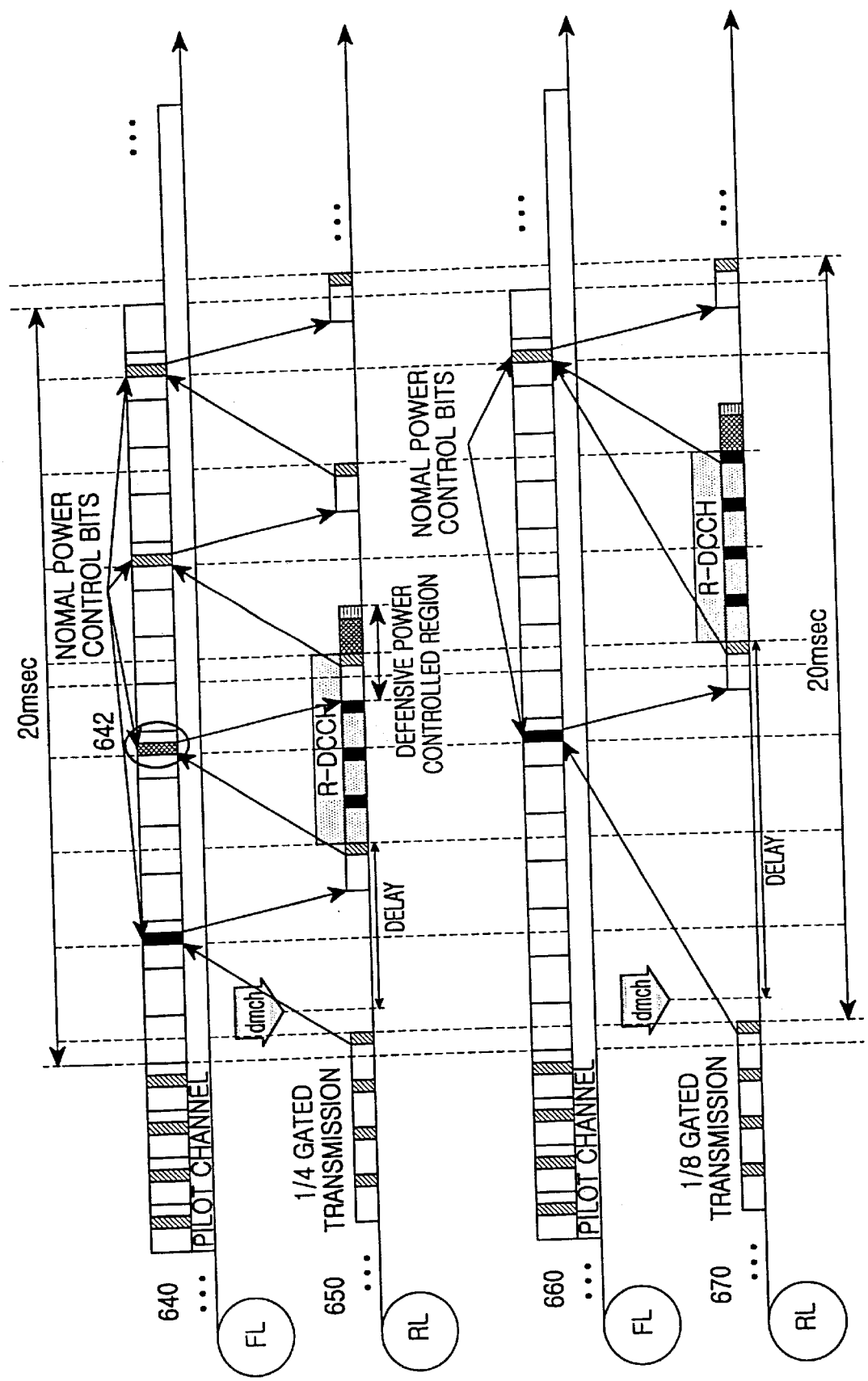
FIG. 6B is a diagram illustrating a power control operation for a reverse pilot/PCB upon activation of a reverse dedicated control channel in a control hold state according to an embodiment of the present invention, wherein the pilot/PCB channel is intermittently transmitted at regular intervals, offset<0, and a duty cycle is $1/1$ and $1/8$.
Figure 6C:
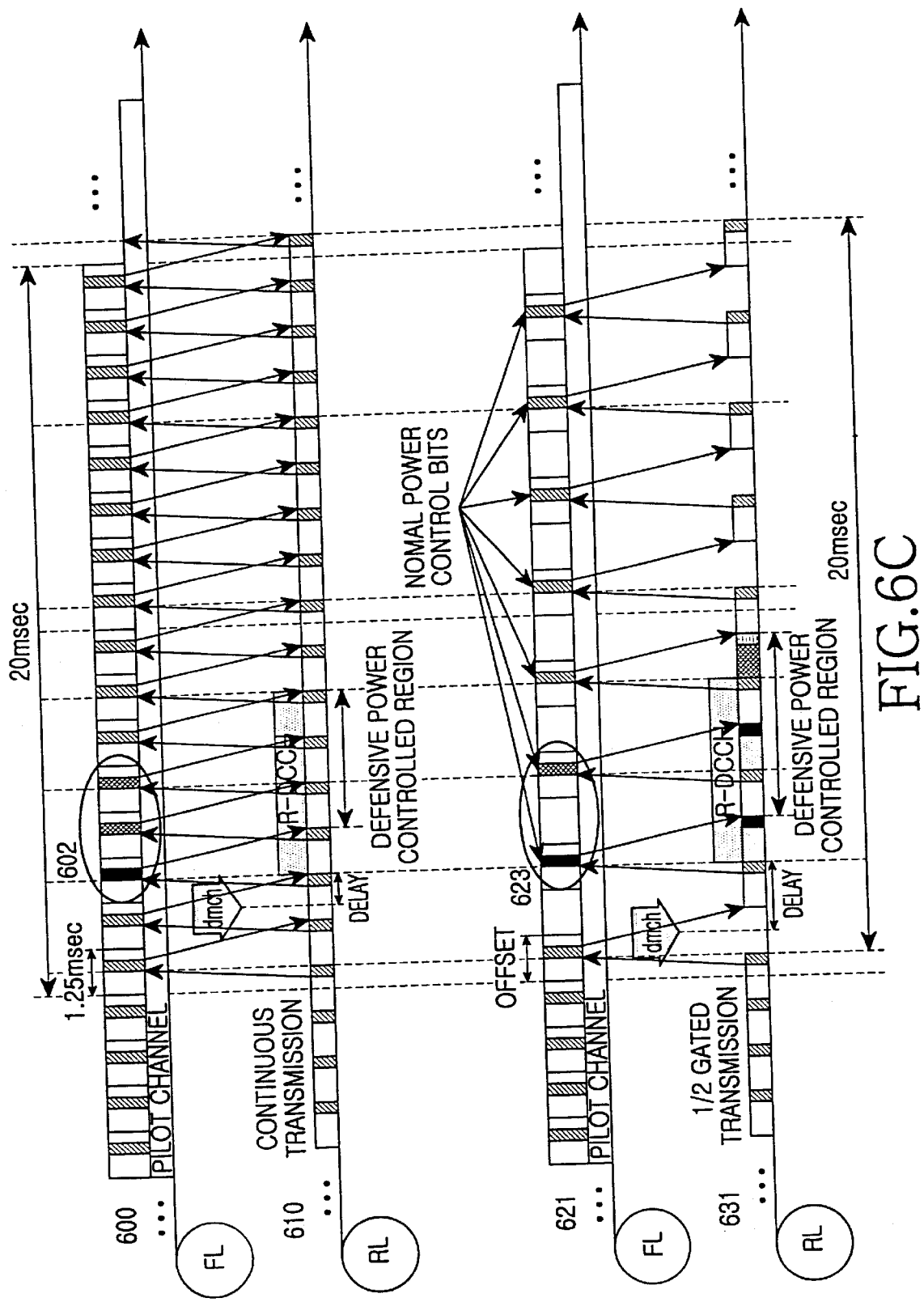
FIG. 6C is a diagram illustrating a power control operation for a reverse pilot/PCB upon activation of a reverse dedicated control channel in a control hold state according to an embodiment of the present invention, wherein the pilot/PCB channel is intermittently transmitted at regular intervals, offset>0, and a duty cycle is $1/1$ and $1/2$.
Figure 6D:
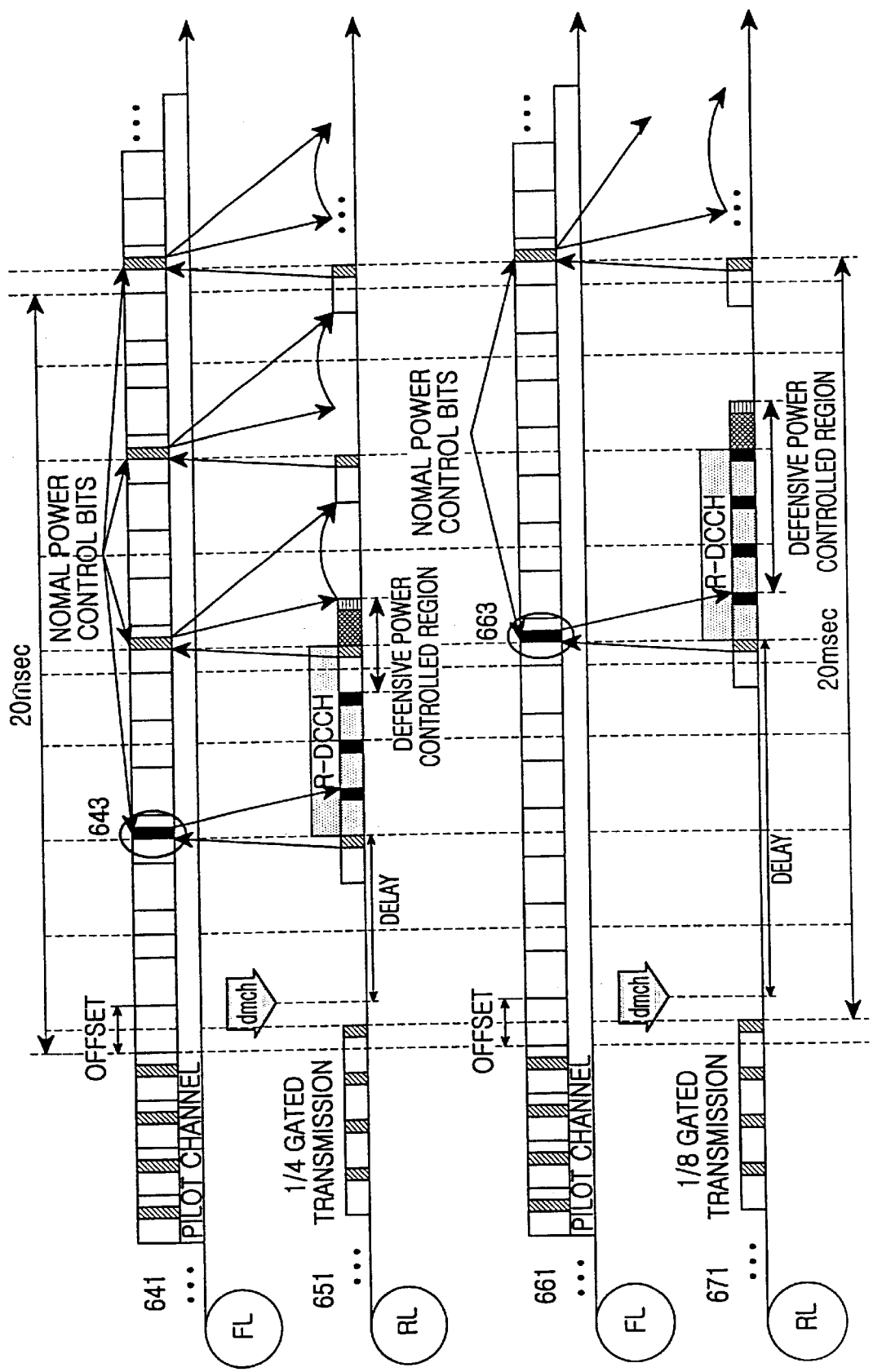
FIG. 6D is a diagram illustrating a power control operation for a reverse pilot/PCB upon activation of a reverse dedicated control channel in a control hold state according to an embodiment of the present invention, wherein the pilot/PCB channel is intermittently transmitted at regular intervals, offset>0, and a duty cycle is $1/4$ and $1/8$.

Reference numerals 600 and 610 in FIGS. 6A and 6C show ping-pong diagrams for reverse power control with respect to the case 300 of FIG. 3, when an R-DCCH is activated in the control hold state. FIGS. 6A and 6B show the cases where an offset between a forward gating pattern and a reverse gating pattern has a negative value. That is, in this case, the number of forward power control groups or time slots, in which a reverse power control command is included, is smaller than the number of reverse power control groups or time slots to which the reverse power control command is applied. On the contrary, FIGS. 6C and 6D show the cases where an offset between a forward gating pattern and a reverse gating pattern has a positive value. That is, in this case, the number of forward power control groups or time slots, in which a reverse power control command is included, is larger than the number of reverse power control groups or time slots to which the reverse power control command is applied.

Reference numerals 620 and 630 in FIG. 6A represent power control methods for DC=½ regular gated transmission when an R-DCCH is activated in the control hold state according to an embodiment of the present invention. In this case, the forward power control and the reverse power control are performed at the same intervals. A location of the reverse power control bit in the forward channel is determined according to a gating pattern for the reverse link. For effective power control, an offset which may be given as a system parameter is provided between a forward gating pattern and a forward gating pattern within one frame (offset<0). Either normal power control or defensive power control is performed at a location where the R-DCCH is activated in the control hold state. For defensive power control, upon receipt of a power-down command generated in the normal power control process, a mobile station decreases transmission power according to the received power control command; however, upon receipt of a power-up command, the mobile station maintains the present transmission power when transmission power to be increased is higher than a threshold which is given as a system parameter. In a system employing the defensive power control, a reference numeral 622 represents a reverse power control command generated in the normal power control process. Upon receipt of the reverse power control command 622, the mobile station performs the defensive power control at a valid power control bit duration (hereinafter, referred to as "defensive power control duration"). To minimize a MAC message processing time, the R-DCCH is transmitted to the other party at a transmittable location of the R-DCCH without an advance notice. A base station processes data in the frame unit of the F-DCCH at the transmittable location of the R-DCCH to determines whether the R-DCCH has been transmitted. When it is determined that the R-DCCH has been transmitted, the base station processes a message transmitted over the R-DCCH. For the determination process, a CRC (Cyclic Redundancy Code) obtained after channel decoding and energy of a received signal can be used. With regard to a time point where the base station determines whether the R-DCCH exists or not, it is not possible to make the determination while the R-DCCH is actually transmitted, unless there is provided a message or indicator for indicating existence of the R-DCCH, since the determination is made after channel coding and CRC checking for the received R-DCCH. Therefore, for the duration where the R-DCCH is transmitted over the forward channel, the base station can transmit the reverse power control command only at a power control group or time slot which is prescribed according to the gating pattern. The mobile station autonomously performs either normal power control or defensive power control according to the reverse power control command received at the prescribed power control group or time slot.

Reference numerals 640 and 650 in FIG. 6B represent power control methods for DC=¼ regular gated transmission when an R-DCCH is activated in the control hold state. In this case, the forward power control and the reverse power control are performed at the same intervals. A location of the reverse power control bit in the forward channel is determined according to a gating pattern for the reverse link. For effective power control, an offset which may be given as a system parameter is provided between a forward gating pattern and a forward gating pattern within one frame (offset<0). Either normal power control or defensive power control is performed at a location where the R-DCCH is activated in the control hold state. A mobile station autonomously performs either normal power control or defensive power control according to the reverse power control command received at a power control group or time slot which was prescribed according to the gating pattern. In a system employing the defensive power control, reference numeral 642 represents a reverse power control command generated in the normal power control process. Upon receipt of the power control command 642, the mobile station performs the defensive power control at a defensive power control duration.

Reference numerals 660 and 670 of FIG. 6B represent power control methods for DC=⅛ regular gated transmission when an R-DCCH is activated in the control hold state. In this case, the forward power control and the reverse power control are performed at the same intervals. A location of the reverse power control bit in the forward channel is determined according to a gating pattern for the reverse link. For effective power control, an offset which may be given as a system parameter is provided between a forward gating pattern and a forward gating pattern within one frame (offset<0). Either normal power control or defensive power control is performed at a location where the R-DCCH is activated in the control hold state. In the cases 660 and 670, a mobile station cannot performs defensive power control, since no reverse power control command is received at the R-DCCH duration.

Reference numerals 621 and 631 of FIG. 6C represent power control methods for DC=½ regular gated transmission when an R-DCCH is activated in the control hold state. In this case, the forward power control and the reverse power control are performed at the same intervals. A location of the reverse power control bit in the forward channel is determined according to a gating pattern for the reverse link. For effective power control, an offset which may be given as a system parameter is provided between a forward gating pattern and a forward gating pattern within one frame (offset>0). Either normal power control or defensive power control is performed at a location where the R-DCCH is activated in the control hold state. A mobile station autonomously performs either normal power control or defensive power control according to the reverse power control command received at a power control group or time slot which was prescribed according to the gating pattern. In a system employing the defensive power control, reference numeral 623 represents a reverse power control command generated in the normal power control process. Upon receipt of the power control command 623, the mobile station performs the defensive power control at a defensive power control duration. To minimize a MAC message processing time, the R-DCCH is transmitted to the other party at a transmittable location of the R-DCCH without an advance notice. A base station processes data in the frame unit of the F-DCCH at the transmittable location of the R-DCCH to determines whether the R-DCCH has been transmitted. When it is determined that the R-DCCH has been transmitted, the base station processes a message transmitted over the R-DCCH. For the determination process, a CRC (Cyclic Redundancy Code) obtained after channel decoding and energy of a received signal can be used. With regard to a time point where the base station determines whether the R-DCCH exists or not, it is not possible to make the determination while the R-DCCH is actually transmitted, unless there is provided a message or indicator for indicating existence of the R-DCCH, since the determination is made after channel coding and CRC checking for the received R-DCCH. Therefore, for the duration where the R-DCCH is transmitted over the forward channel, the base station can transmit the reverse power control command only at a power control group or time slot which is prescribed according to the gating pattern. The mobile station autonomously performs either normal power control or defensive power control according to the reverse power control command received at the prescribed power control group or time slot.

Reference numerals 641 and 651 of FIG. 6D represent power control methods for DC=¼ regular gated transmission when an R-DCCH is activated in the control hold state. In this case, the forward power control and the reverse power control are performed at the same intervals. A location of the reverse power control bit in the forward channel is determined according to a gating pattern for the reverse link. For effective power control, an offset which may be given as a system parameter is provided between a forward gating pattern and a forward gating pattern within one frame (offset>0 ). Either normal power control or defensive power control is performed at a location where the R-DCCH is activated in the control hold state. A mobile station autonomously performs either normal power control or defensive power control according to the reverse power control command received at a power control group or time slot which was prescribed according to the gating pattern. In a system employing the defensive power control, reference numeral

643 represents a reverse power control command generated in the normal power control process. Upon receipt of the power control command 643, the mobile station performs the defensive power control at a defensive power control duration.

Reference numerals 661 and 671 of FIG. 6D represent power control methods for DC=⅛ regular gated transmission when an R-DCCH is activated in the control hold state. In this case, the forward power control and the reverse power control are performed at the same intervals. A location of the reverse power control bit in the forward channel is determined according to a gating pattern for the reverse link. For effective power control, an offset which may be given as a system parameter is provided between a forward gating pattern and a forward gating pattern within one frame (offset>0 ). Either normal power control or defensive power control is performed at a location where the R-DCCH is activated in the control hold state. A mobile station autonomously performs either normal power control or defensive power control according to the reverse power control command received at a power control group or time slot which was prescribed according to the gating pattern. In a system employing the defensive power control, reference numeral 663 represents a reverse power control command generated in the normal power control process. Upon receipt of the power control command 663, the mobile station performs the defensive power control at a defensive power control duration.

Figure 6F:
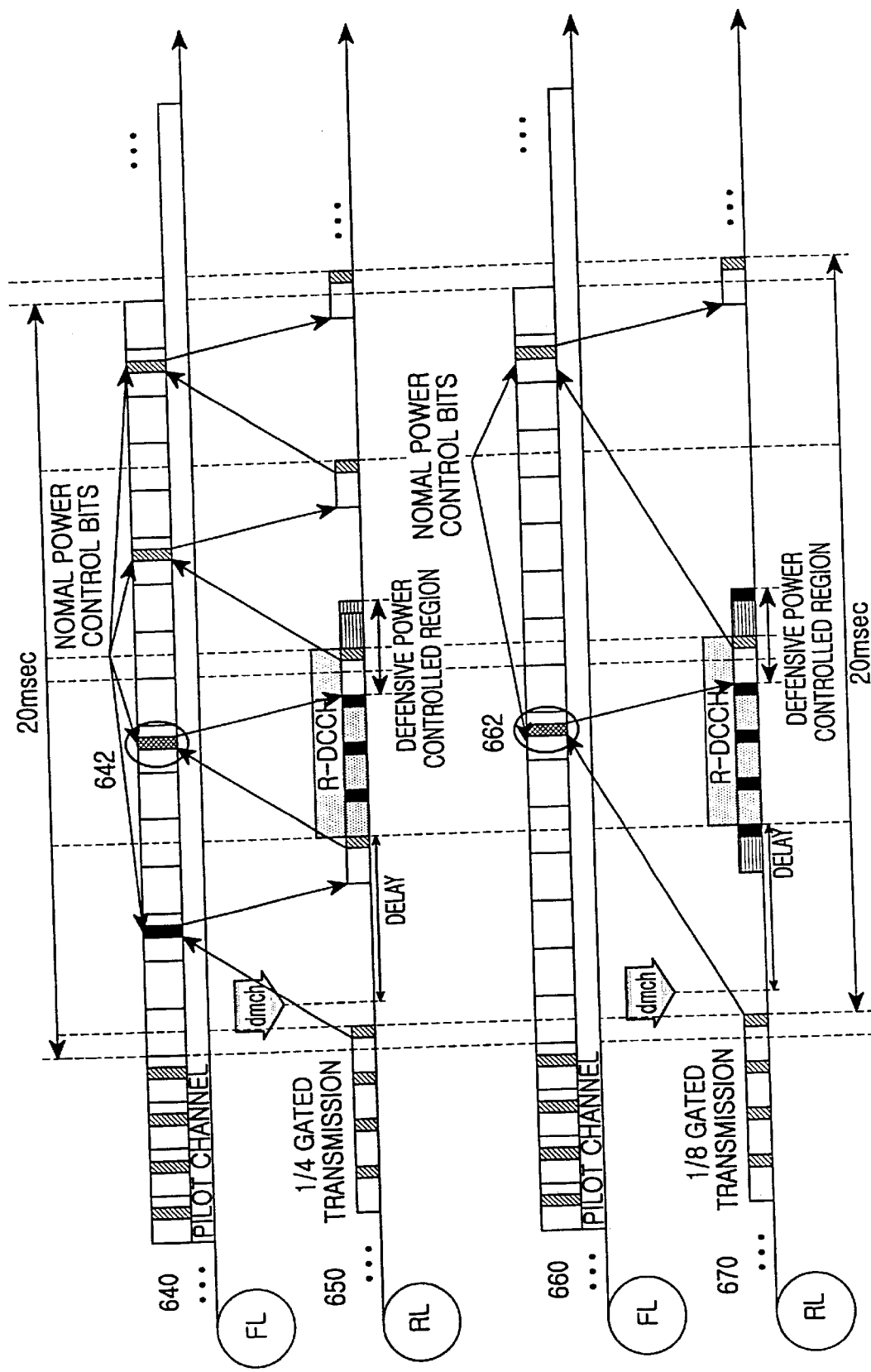
FIG. 6F is a diagram illustrating a power control operation for a reverse pilot/PCB upon activation of a reverse dedicated control channel in a control hold state according to an embodiment of the present invention, wherein the pilot/PCB channel is intermittently transmitted at regular intervals, offset<0, and a duty cycle is $1/4$ and $1/8$.
Figure 6G:
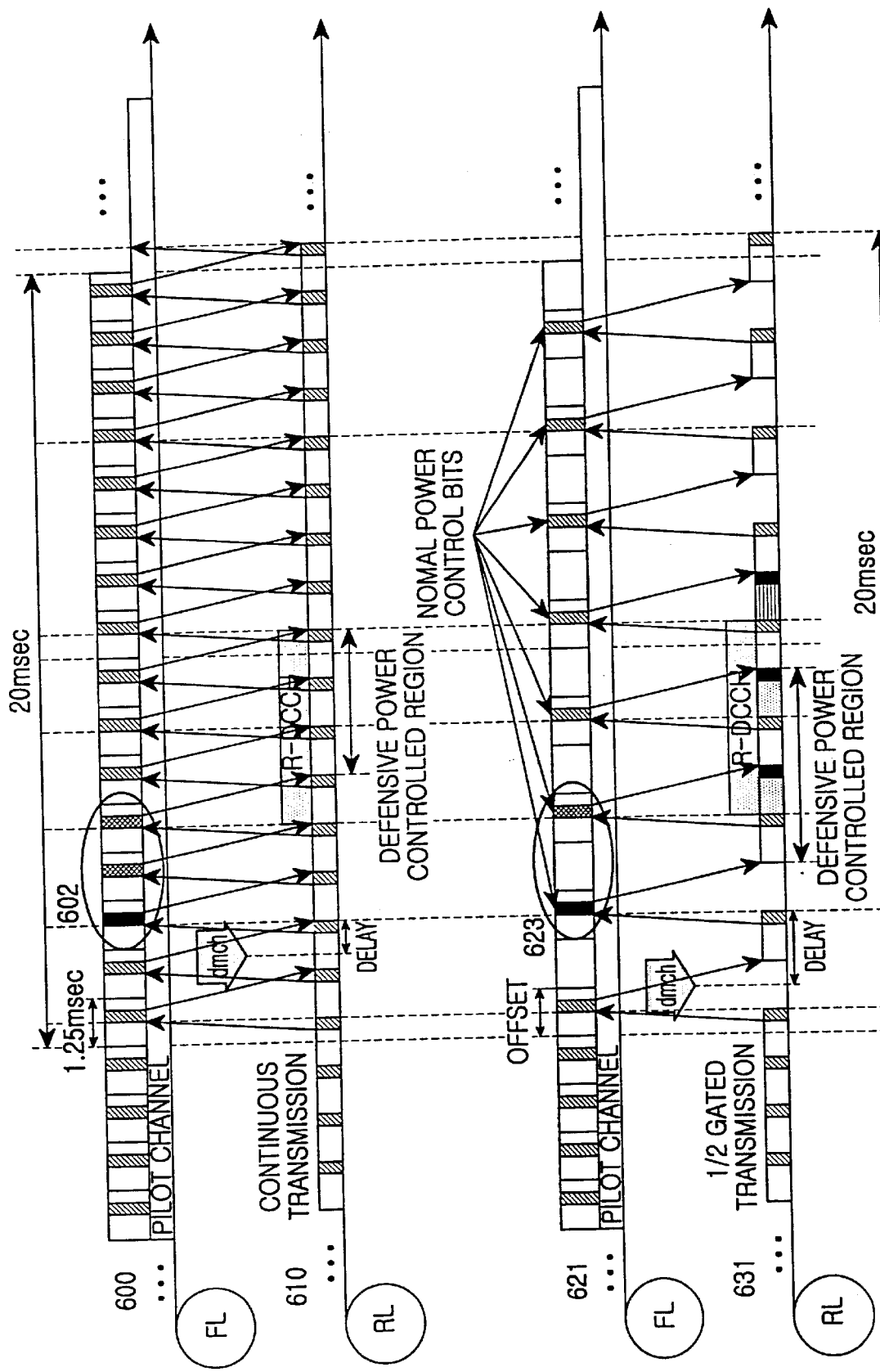
FIG. 6G is a diagram illustrating a power control operation for a reverse pilot/PCB upon activation of a reverse dedicated control channel in a control hold state according to an embodiment of the present invention, wherein the pilot/PCB channel is intermittently transmitted at regular intervals, offset>0, and a duty cycle is $1/1$ and $1/2$.
Figure 6H:
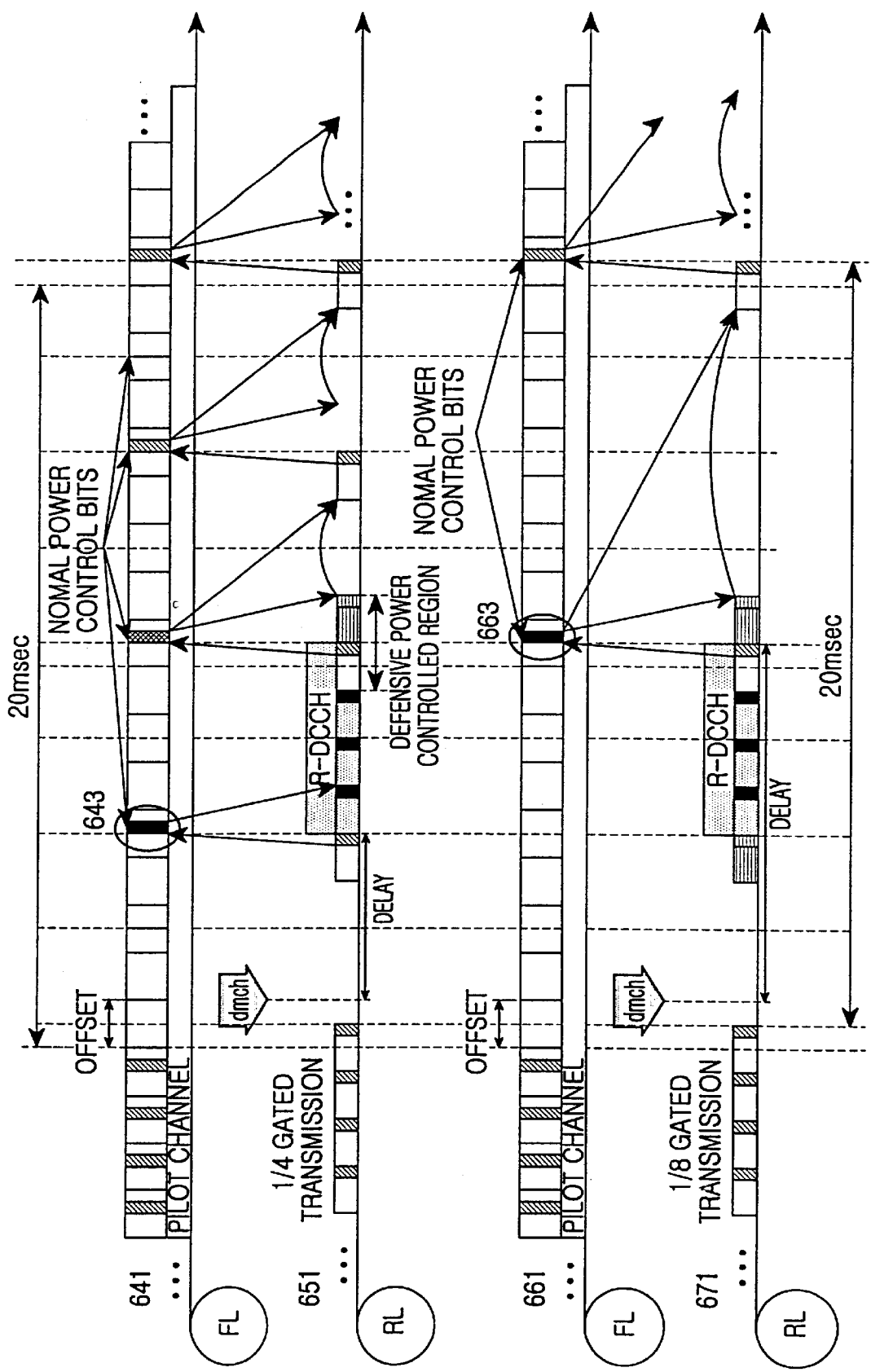
FIG. 6H is a diagram illustrating a power control operation for a reverse pilot/PCB upon activation of a reverse dedicated control channel in a control hold state according to an embodiment of the present invention, wherein the pilot/PCB channel is intermittently transmitted at regular intervals, offset>0, and a duty cycle is $1/4$ and $1/8$.

FIGS. 6E to 6H illustrate power control procedures during activation of a reverse dedicated control channel (R-DCCH) according to an embodiment of the present invention. FIGS. 6E and 6F show the cases where an offset between a forward gating pattern and a reverse gating pattern has a negative value. That is, in this case, the number of forward power control groups or time slots, in which a reverse power control command is included, is smaller than the number of reverse power control groups or time slots to which the reverse power control command is applied. On the contrary, FIGS. 6G and 6H show the cases where an offset between a forward gating pattern and a reverse gating pattern has a positive value. That is, in this case, the number of forward power control groups or time slots, in which a reverse power control command is included, is larger than the number of reverse power control groups or time slots to which the reverse power control command is applied.

Reference numerals 620 and 630 of FIG. 6E represent power control methods for DC=½ regular gated transmission when an R-DCCH is activated in the control hold state according to an embodiment of the present invention. In this case, the forward power control and the reverse power control are performed at the same intervals. A location of the reverse power control bit in the forward channel is determined according to a gating pattern for the reverse link. For effective power control, an offset which may be given as a system parameter is provided between a forward gating pattern and a forward gating pattern within one frame. Either normal power control or defensive power control is performed at a location where the R-DCCH is activated in the control hold state. For defensive power control, upon receipt of a power-down command generated in the normal power control process, a mobile station decreases transmission power according to the received power control command; however, upon receipt of a power-up command, the mobile station maintains the present transmission power when transmission power to be increased is higher than a threshold which is given as a system parameter. In a system employing the defensive power control, a reference numeral 622 represents a reverse power control command generated in the normal power control process. Upon receipt of the reverse power control command 622, the mobile station performs the defensive power control at a valid power control bit duration (hereinafter, referred to as "defensive power control duration"). To minimize a MAC message processing time, the R-DCCH is transmitted to the other party at a transmittable location of the R-DCCH without an advance notice. A base station processes data in the frame unit of the F-DCCH at the transmittable location of the R-DCCH to determines whether the R-DCCH has been transmitted. When it is determined that the R-DCCH has been transmitted, the base station processes a message transmitted over the R-DCCH. For the determination process, a CRC (Cyclic Redundancy Code) obtained after channel decoding and energy of a received signal can be used. With regard to a time point where the base station determines whether the R-DCCH exists or not, it is not possible to make the determination while the R-DCCH is actually transmitted, unless there is provided a message or indicator for indicating existence of the R-DCCH, since the determination is made after channel coding and CRC checking for the received R-DCCH. Therefore, for the duration where the R-DCCH is transmitted over the forward channel, the base station can transmit the reverse power control command only at a power control group or time slot which is prescribed according to the gating pattern. The mobile station autonomously performs either normal power control or defensive power control according to the reverse power control command received at the prescribed power control group or time slot.

Reference numerals 640 and 650 in FIG. 6F represent power control methods for DC=¼ regular gated transmission when an R-DCCH is activated in the control hold state. In this case, the forward power control and the reverse power control are performed at the same intervals. A location of the reverse power control bit in the forward channel is determined according to a gating pattern for the reverse link. For effective power control, an offset which may be given as a system parameter is provided between a forward gating pattern and a forward gating pattern within one frame. Either normal power control or defensive power control is performed at a location where the R-DCCH is activated in the control hold state. A mobile station autonomously performs either normal power control or defensive power control according to the reverse power control command received at a power control group or time slot which was prescribed according to the gating pattern. In a system employing the defensive power control, reference numeral 642 represents a reverse power control command generated in the normal power control process. Upon receipt of the power control command 642, the mobile station performs the defensive power control at a defensive power control duration.

Reference numerals 660 and 670 of FIG. 6F represent power control methods for DC=⅛ regular gated transmission when an R-DCCH is activated in the control hold state. In this case, the forward power control and the reverse power control are performed at the same intervals. A location of the reverse power control bit in the forward channel is determined according to a gating pattern for the reverse link. For effective power control, an offset which may be given as a system parameter is provided between a forward gating pattern and a forward gating pattern within one frame. Either normal power control or defensive power control is performed at a location where the R-DCCH is activated in the control hold state. In a system employing the defensive power control, reference numeral 662 represents a reverse power control command generated in the normal power control process. Upon receipt of the power control command 662, the mobile station performs the defensive power control at a defensive power control duration.

Reference numerals 621 and 631 of FIG. 6G represent power control methods for DC=½ regular gated transmission when an R-DCCH is activated in the control hold state. In this case, the forward power control and the reverse power control are performed at the same intervals. A location of the reverse power control bit in the forward channel is determined according to a gating pattern for the reverse link. For effective power control, an offset which may be given as a system parameter is provided between a forward gating pattern and a forward gating pattern within one frame. Either normal power control or defensive power control is performed at a location where the R-DCCH is activated in the control hold state. For defensive power control, upon receipt of a power-down command generated in the normal power control process, a mobile station decreases transmission power according to the received power control command; however, upon receipt of a power-up command, the mobile station maintains the present transmission power when transmission power to be increased is higher than a threshold which is given as a system parameter. In a system employing the defensive power control, reference numeral 623 represents a reverse power control command generated in the normal power control process. Upon receipt of the power control command 623, the mobile station performs the defensive power control at a defensive power control duration. To minimize a MAC message processing time, the R-DCCH is transmitted to the other party at a transmittable location of the R-DCCH without an advance notice. A base station processes data in the frame unit of the F-DCCH at the transmittable location of the R-DCCH to determines whether the R-DCCH has been transmitted. When it is determined that the R-DCCH has been transmitted, the base station processes a message transmitted over the R-DCCH. For the determination process, a CRC (Cyclic Redundancy Code) obtained after channel decoding and energy of a received signal can be used. With regard to a time point where the base station determines whether the R-DCCH exists or not, it is not possible to make the determination while the R-DCCH is actually transmitted, unless there is provided a message or indicator for indicating existence of the R-DCCH, since the determination is made after channel coding and CRC checking for the received R-DCCH. Therefore, for the duration where the R-DCCH is transmitted over the forward channel, the base station can transmit the reverse power control command only at a power control group or time slot which is prescribed according to the gating pattern. The mobile station autonomously performs either normal power control or defensive power control according to the reverse power control command received at the prescribed power control group or time slot.

Reference numerals 641 and 651 of FIG. 6H represent power control methods for DC=¼ regular gated transmission when an R-DCCH is activated in the control hold state. In this case, the forward power control and the reverse power control are performed at the same intervals. A location of the reverse power control bit in the forward channel is determined according to a gating pattern for the reverse link. For effective power control, an offset which may be given as a system parameter is provided between a forward gating pattern and a forward gating pattern within one frame. Either normal power control or defensive power control is performed at a location where the R-DCCH is activated in the control hold state. A mobile station autonomously performs either normal power control or defensive power control according to the reverse power control command received at a power control group or time slot which was prescribed according to the gating pattern. In a system employing the defensive power control, reference numeral 643 represents a reverse power control command generated in the normal power control process. Upon receipt of the power control command 643, the mobile station performs the defensive power control at a defensive power control duration.

Reference numerals 661 and 671 of FIG. 6H represent power control methods for DC=⅛ regular gated transmission when an R-DCCH is activated in the control hold state. In this case, the forward power control and the reverse power control are performed at the same intervals. A location of the reverse power control bit in the forward channel is determined according to a gating pattern for the reverse link. For effective power control, an offset which may be given as a system parameter is provided between a forward gating pattern and a forward gating pattern within one frame. Either normal power control or defensive power control is performed at a location where the R-DCCH is activated in the control hold state. A mobile station autonomously performs either normal power control or defensive power control according to the reverse power control command received at a power control group or time slot which was prescribed according to the gating pattern. In a system employing the defensive power control, reference numeral 663 represents a reverse power control command generated in the normal power control process. Upon receipt of the power control command 663, the mobile station performs the defensive power control at a defensive power control duration.

Figure 7B:
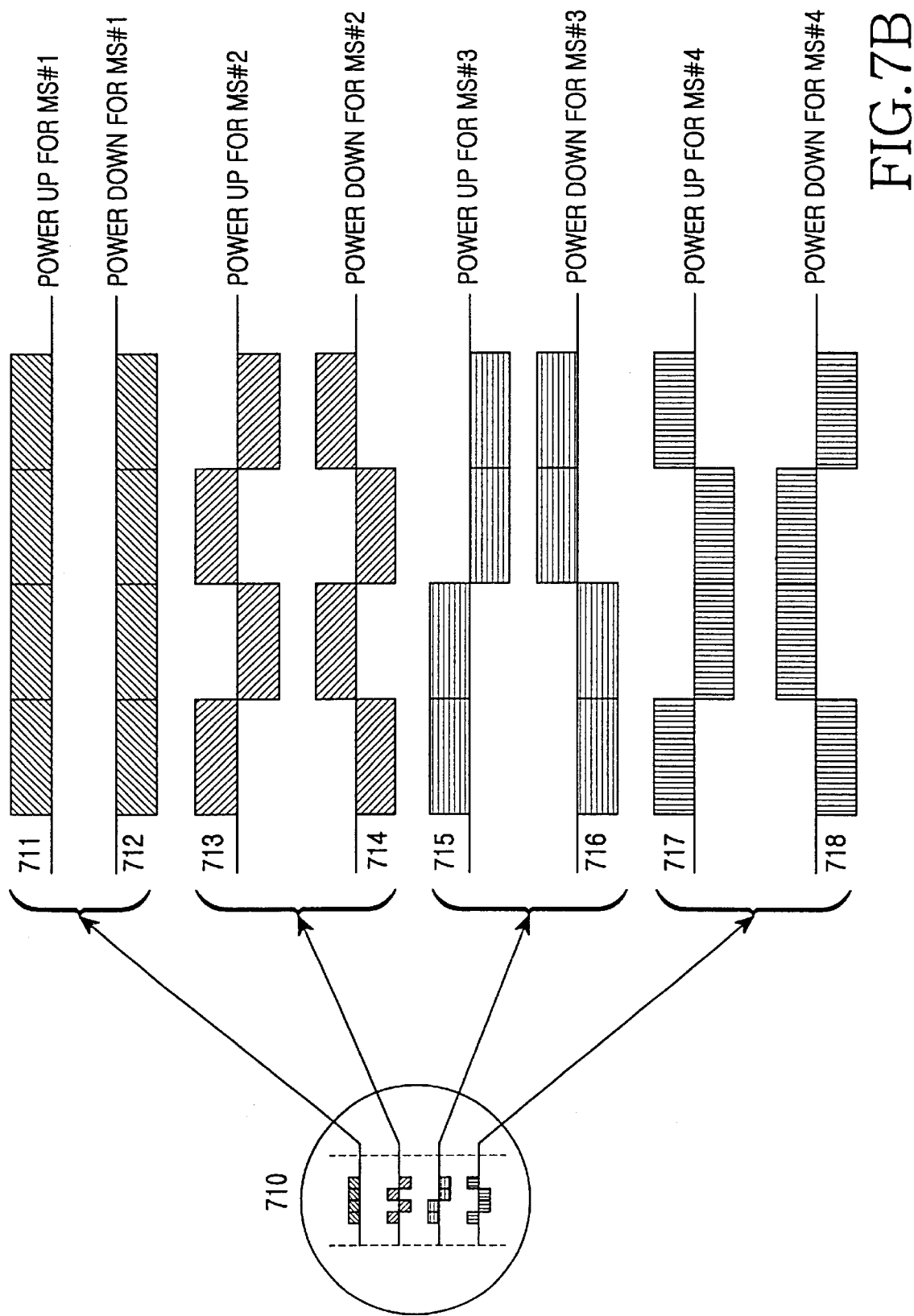
FIG. 7B is a diagram illustrating reverse power control commands for multiple reverse channels of FIG. 7A according to an embodiment of the present invention.
Figure 7C:
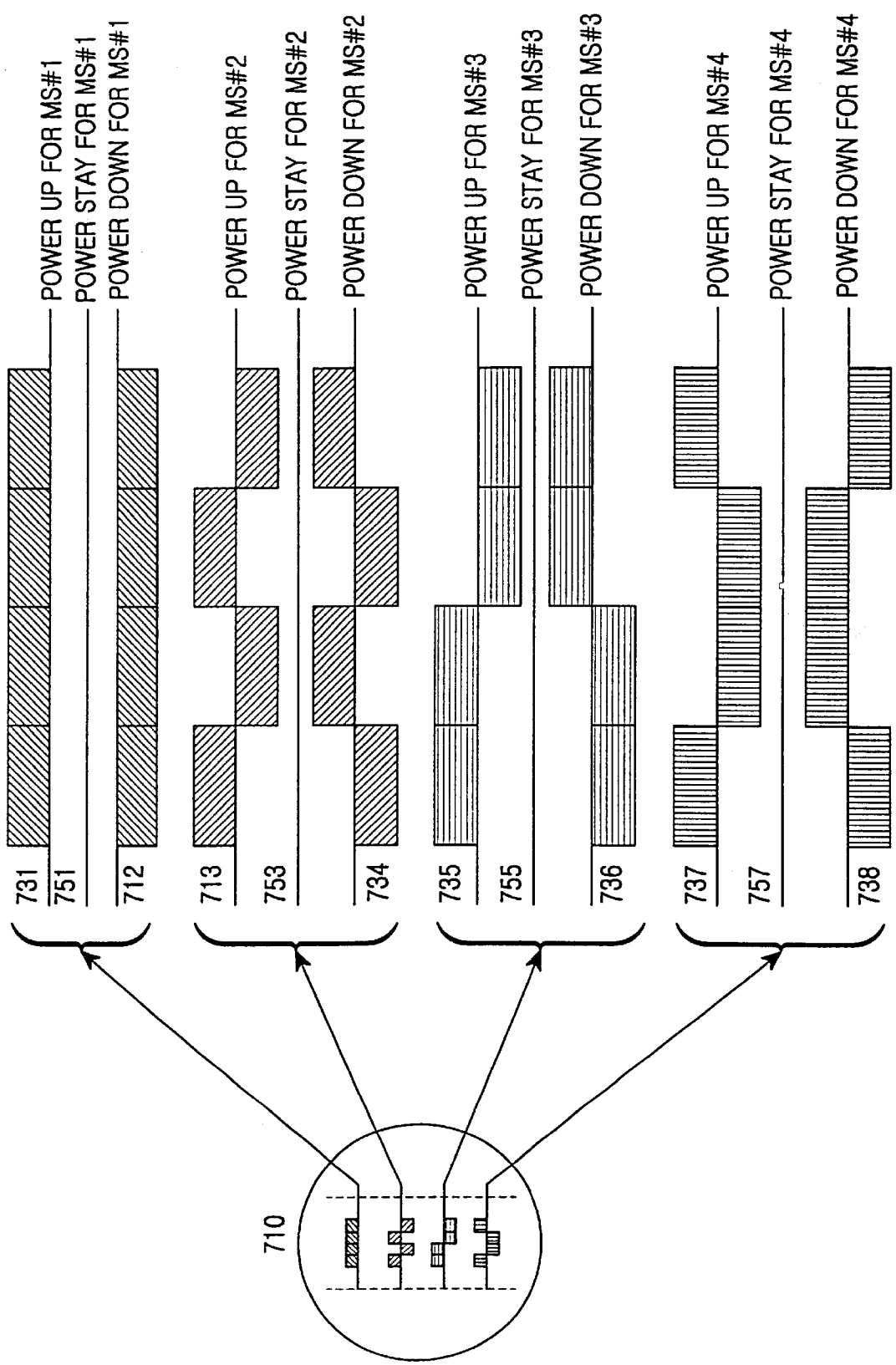
FIG. 7C is a diagram illustrating reverse power control commands for multiple reverse channels of FIG. 7A according to another embodiment of the present invention.

FIG. 7A shows a reverse power control procedure for multiple reverse dedicated control channels (R-DCCHs) using sharable forward dedicated control channel (F-DCCH) in a control hold state according to an embodiment of the present invention. For simultaneous power control for multiple reverse dedicated control channels, power control symbols undergo code division multiplexing at the same location using an orthogonal code. Reference numeral 710 represents a method for transmitting the power control symbols using a Walsh code, which is an orthogonal code. FIG. 7B shows reverse power control commands for the multiple reverse channels of FIG. 7A, according to an embodiment of the present invention. In FIG. 7B, power-up/down commands can be transmitted for four reverse dedicated control channel in maximum. FIG. 7C shows reverse power control commands for the multiple reverse channels of FIG. 7A, according to another embodiment of the present invention. In FIG. 7C, power-up/stay/down commands can be transmitted for four reverse dedicated control channel in maximum. As shown in the case 700 of FIG. 7A, a code division multiplexed-power control symbol for normal power control exists only at a corresponding power control group according to a gating pattern for a reverse channel, and a code division multiplexed-power control symbol for defensive power control exists at a corresponding power control group according to whether the R-DCCH is activated or not.

Figure 8A:
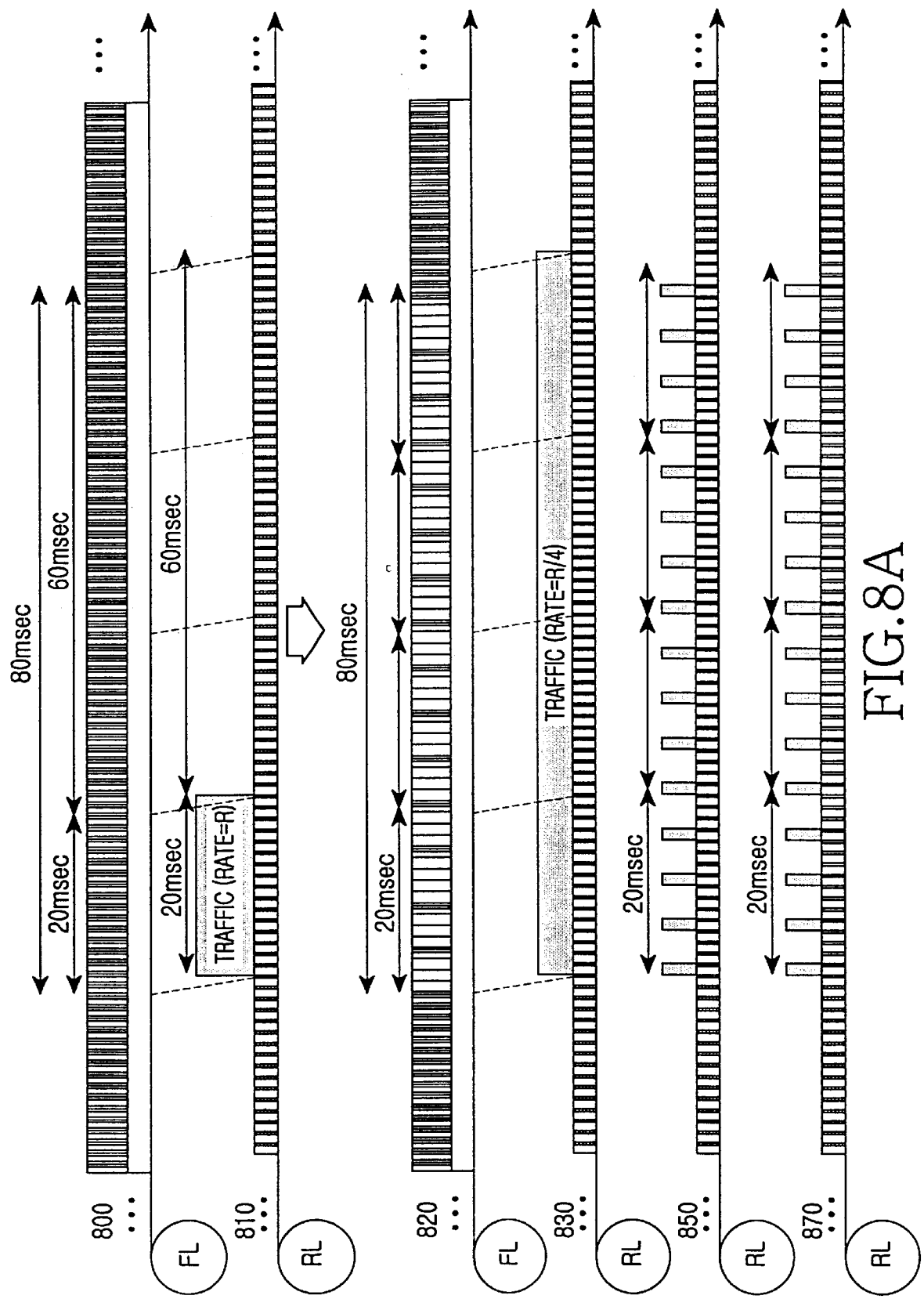
FIG. 8A is a diagram illustrating a reverse transmission signal for implementing a time diversity in transmitting traffic data using a reverse dedicated control channel in a control hold state according to an embodiment of the present invention, wherein reverse power control bits are regularly located.

Reference numerals 830, 850 and 870 of FIG. 8A show methods for providing a time diversity to transmission signal of a mobile station. Referring to FIG. 8A, reference numeral 820 shows a case where a base station receives a signal transmitted from a mobile station and transmits a reverse power control command of a relatively lower rate over a forward channel at predetermined regular locations. Transmitting the transmission signal of the mobile station at a low rate for a long time and transmitting the transmission signal by regular gated transmission at the same rate cause a reduced burden for fast power control shown by reference numeral 800 because of using the time diversity, as compared with a signal having a low time diversity.

Figure 8B:
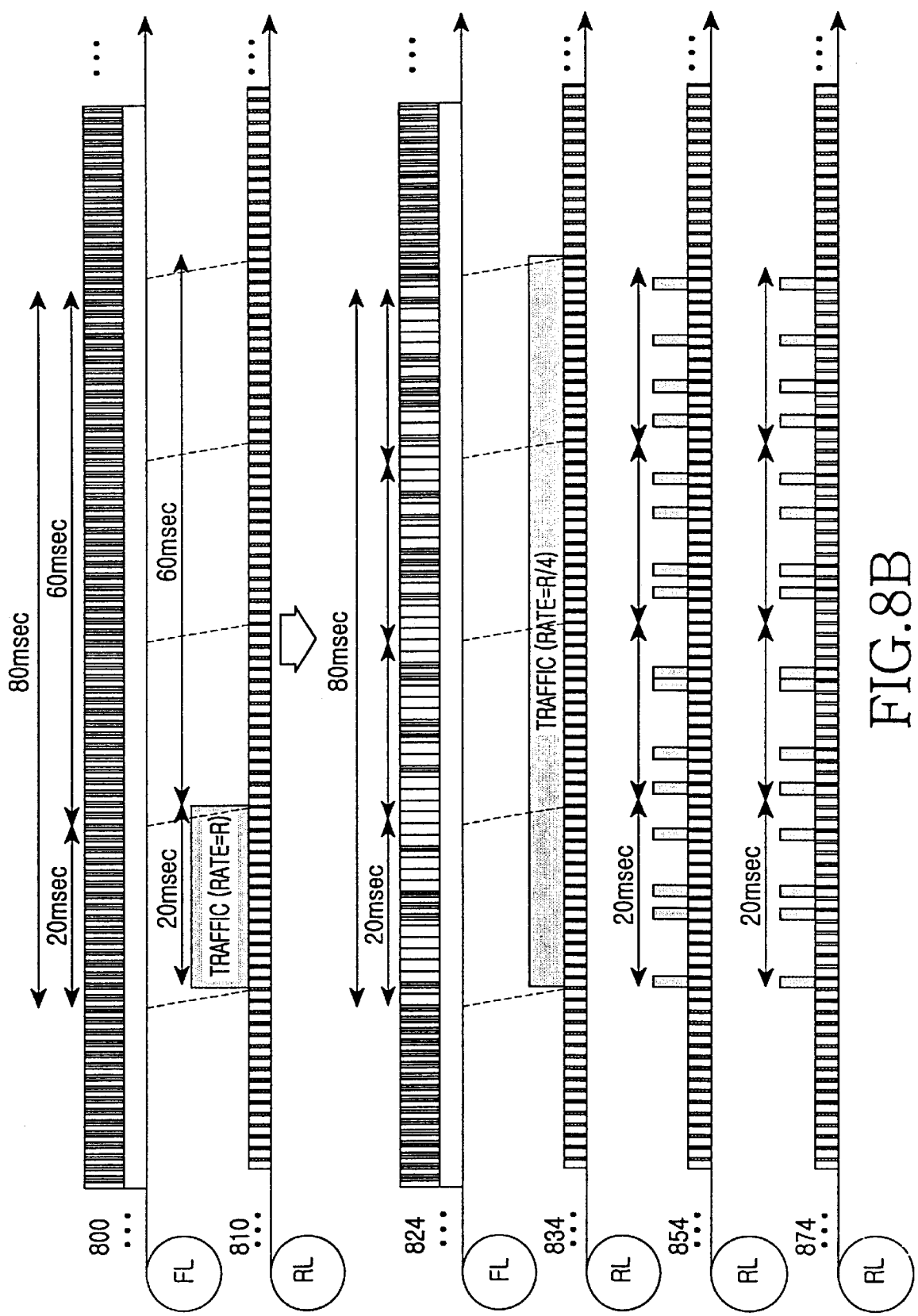
FIG. 8B is a diagram illustrating a reverse transmission signal for implementing a time diversity in transmitting traffic data using a reverse dedicated control channel in a control hold state according to an embodiment of the present invention, wherein reverse power control bits are irregularly located.

Reference numerals 834, 854 and 874 of FIG. 8B show methods for providing a time diversity to transmission signal of a mobile station. Referring to FIG. 8B, reference numeral 820 shows a case where a base station receives a signal transmitted from a mobile station and transmits a reverse power control command of a relatively lower rate over a forward channel according to a gating pattern for a reverse channel. Transmitting the transmission signal of the mobile station at a low rate for a long time and transmitting the transmission signal by gated transmission at the same rate cause a reduced burden for fast power control shown by reference numeral 800 because of using the time diversity, as compared with a signal having a low time diversity.

Figure 9A:
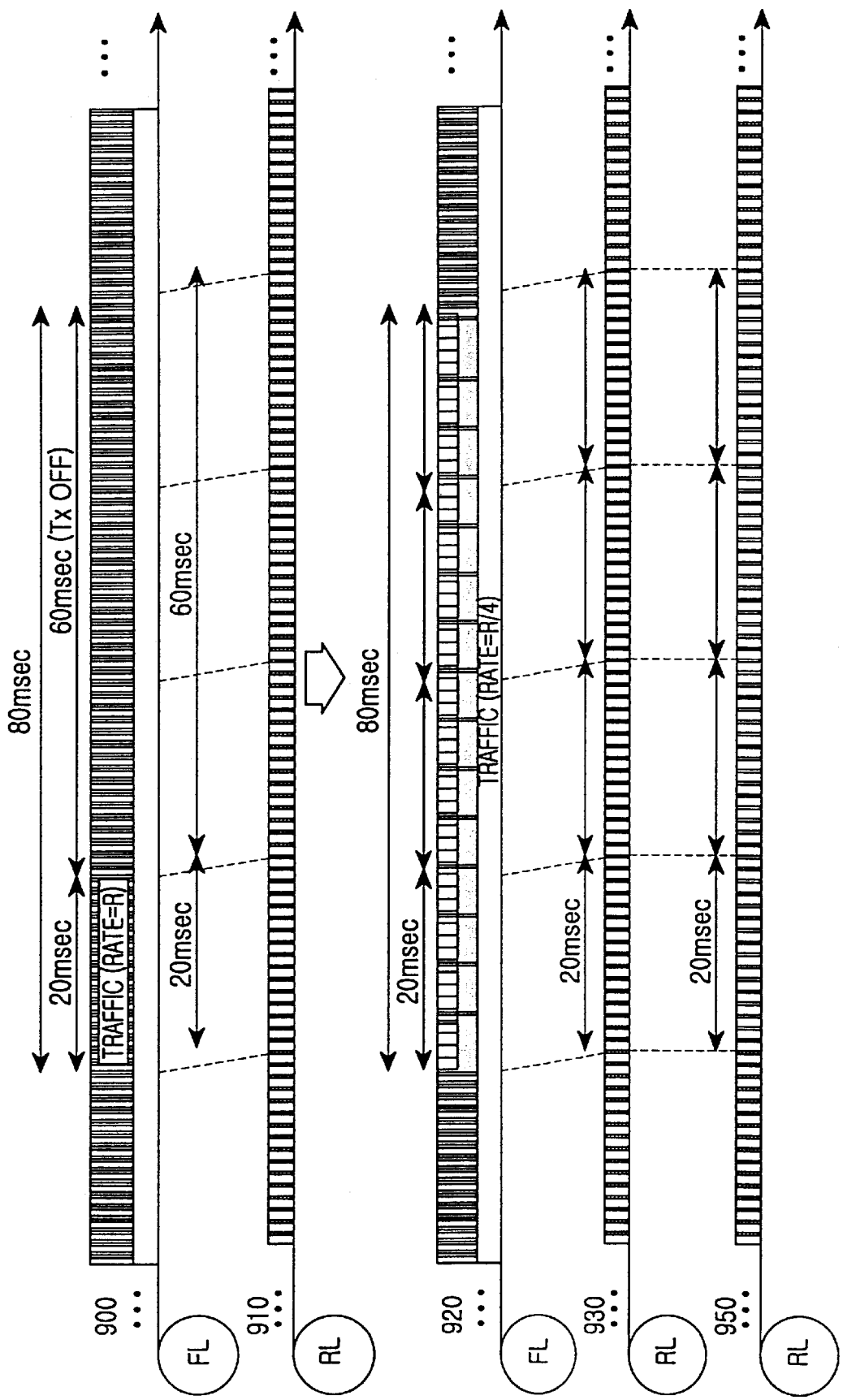
FIG. 9A is a diagram illustrating a continuous transmission signal transmitted at regular intervals, for implementing a time diversity in transmitting traffic data using a forward dedicated control channel in a control hold state according to an embodiment of the present invention.

Reference numerals 920 of FIG. 9A shows a method for providing a time diversity to transmission signal of a base station, wherein the transmission signal is transmitted at a low rate for a long time. Reference numeral 950 shows a case where a mobile station receives a signal 920 transmitted from the base station and transmits a forward power control command of a relatively lower rate over a reverse channel. Transmitting the transmission signal of the mobile station at a low rate for a long time causes a reduced burden for fast power control shown by reference numeral 930 because of using the time diversity, as compared with a signal having a low time diversity.

Figure 9B:
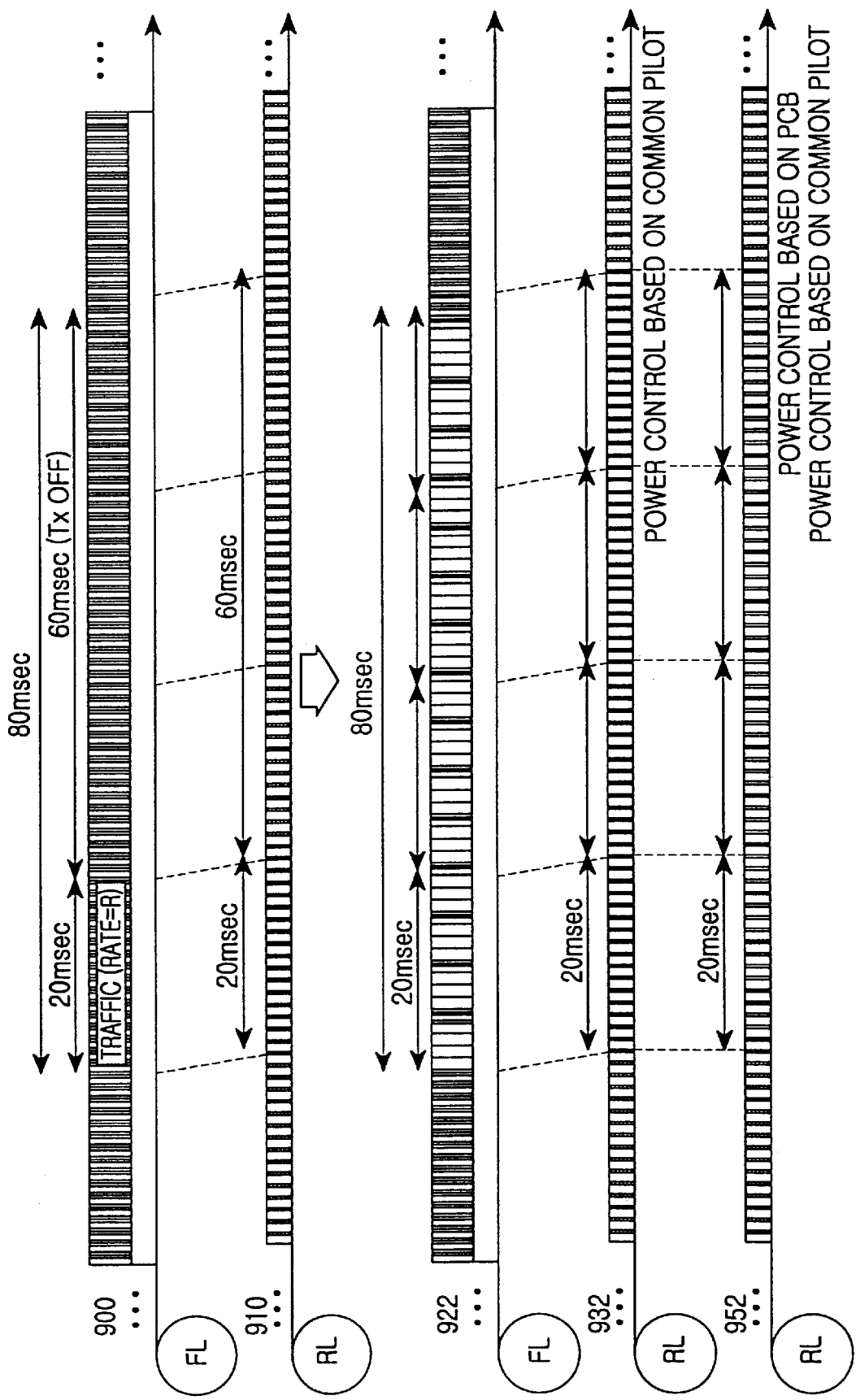
FIG. 9B is a diagram illustrating a discontinuous transmission signal transmitted at regular intervals, for implementing a time diversity in transmitting traffic data using a forward dedicated control channel in a control hold state according to another embodiment of the present invention.

Reference numerals 922 of FIG. 9B shows a method for providing a time diversity to transmission signal of a base station, wherein the transmission signal is intermittently transmitted at regular interval at the same rate for a long time. Reference numeral 952 shows a case where a mobile station receives a signal 922 transmitted from the base station and transmits a forward power control command of a relatively lower rate over a reverse channel. Transmitting the transmission signal of the mobile station at a low rate for a long time causes a reduced burden for fast power control shown by reference numeral 930 because of using the time diversity, as compared with a signal having a low time diversity.

Figure 9C:
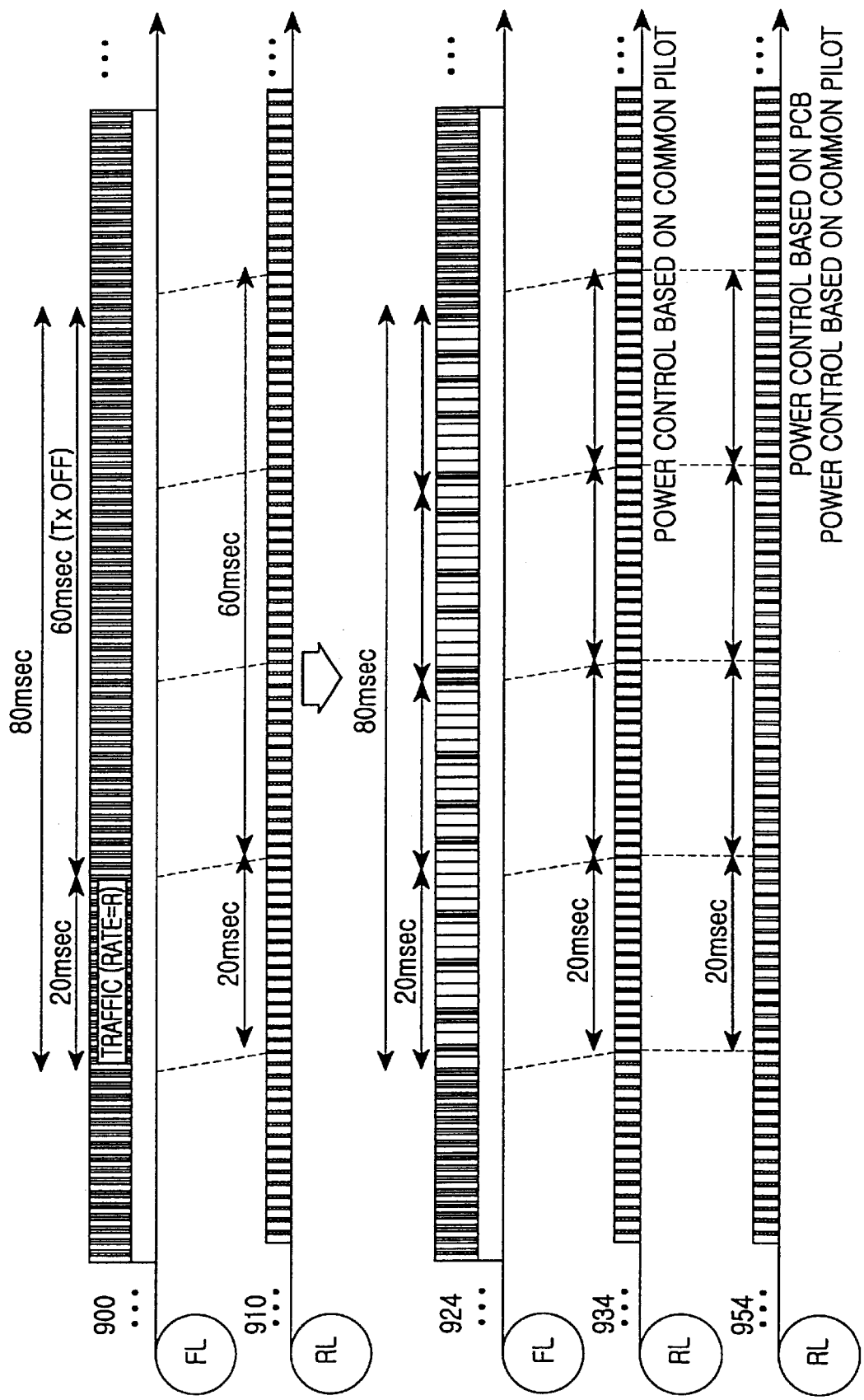
FIG. 9C is a diagram illustrating a discontinuous transmission signal transmitted at irregular intervals, for implementing a time diversity in transmitting traffic data using a forward dedicated control channel in a control hold state according to an embodiment of the present invention.
Figure 10:
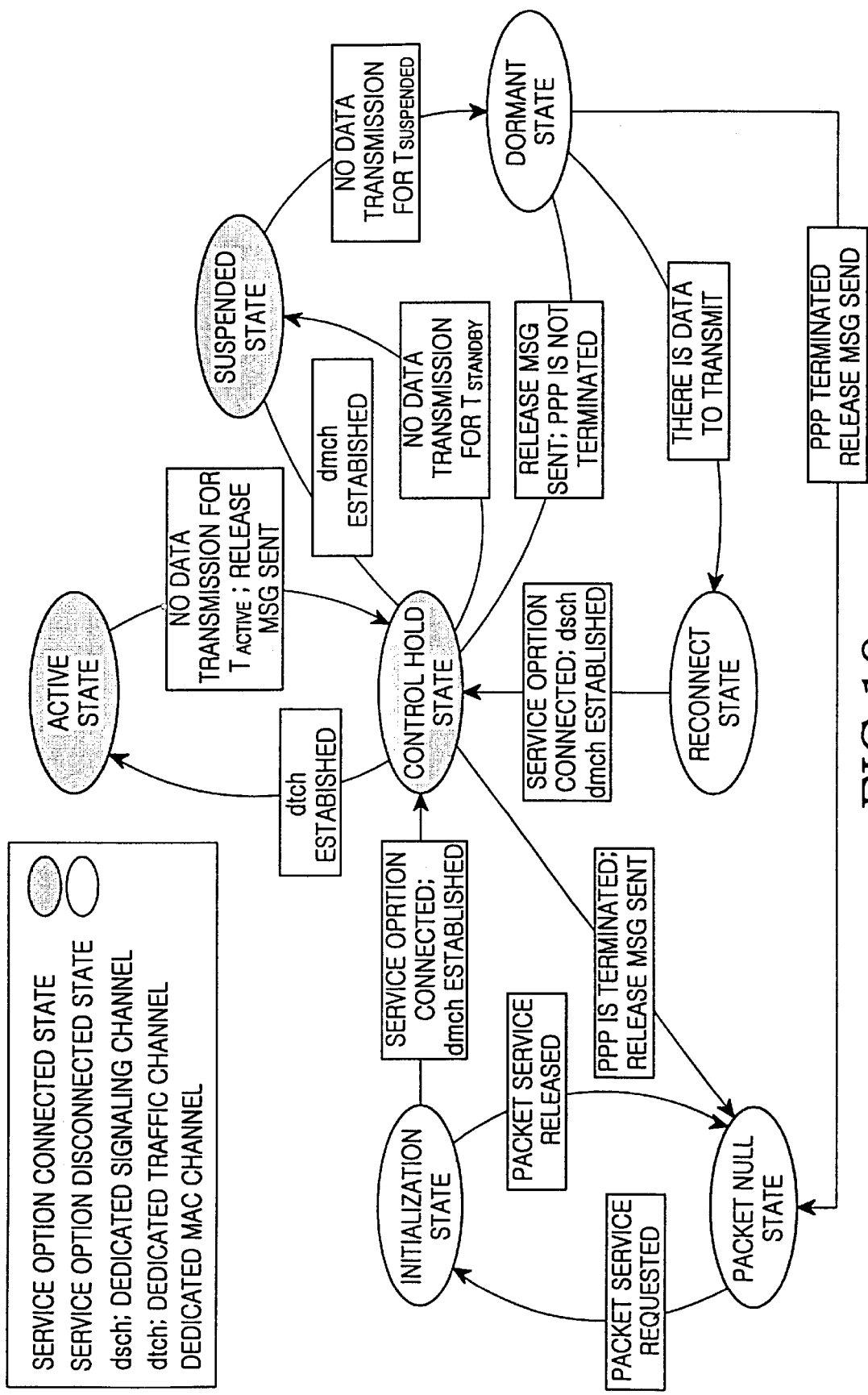
FIG. 10 is a state transition diagram for a packet data service in a CDMA communication system.
Figure 11:
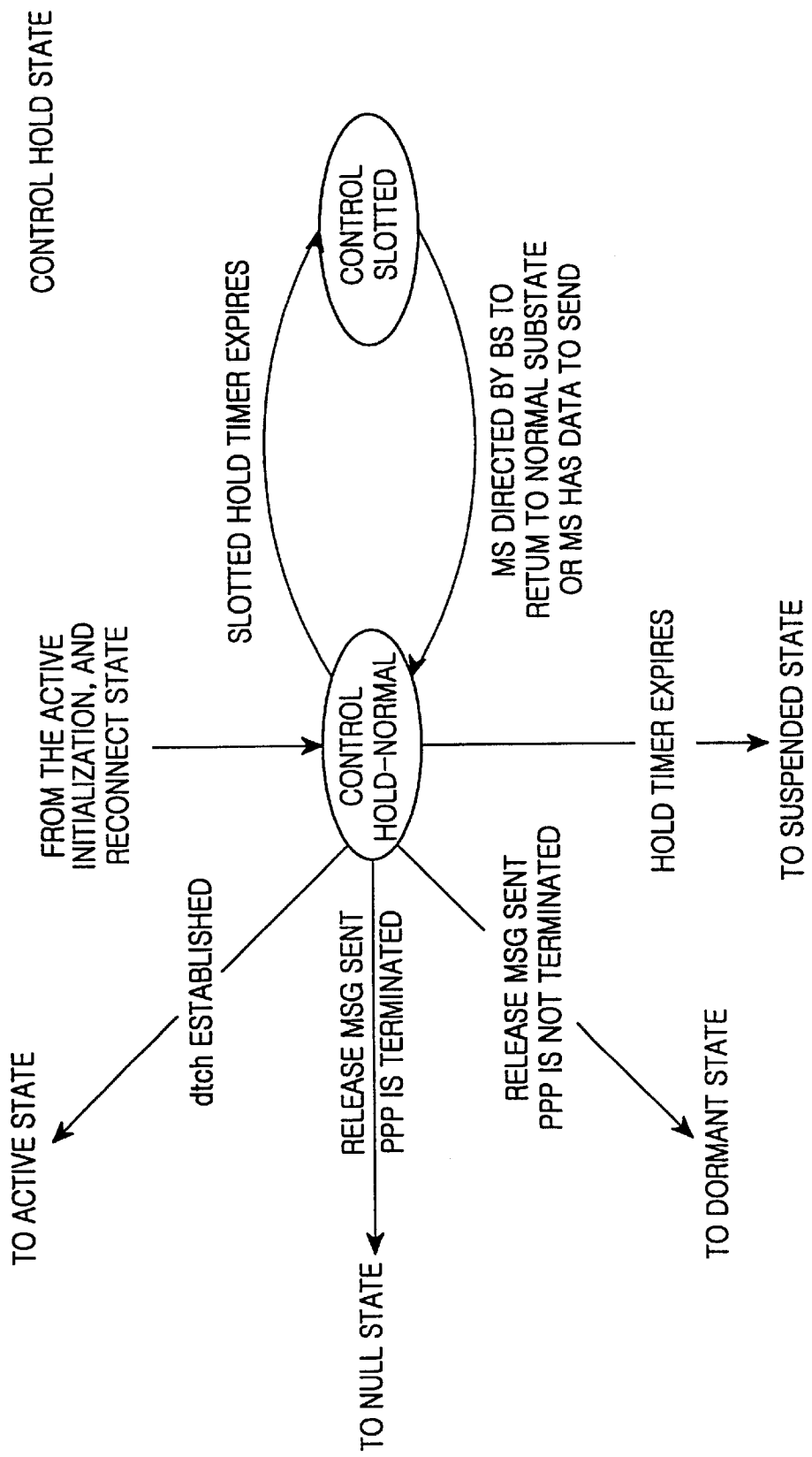
FIG. 11 is a diagram illustrating a state transition occurring between substates of a control hold state in a CDMA communication system.

Reference numerals 924 of FIG. 9C shows a method for providing a time diversity to transmission signal of a base station, wherein the transmission signal is intermittently transmitted at irregular interval at the same rate for a long time. Reference numeral 954 shows a case where a mobile station receives a signal 924 transmitted from the base station and transmits a forward power control command of a relatively lower rate over a reverse channel. Transmitting the transmission signal of the mobile station at a low rate for a long time causes a reduced burden for fast power control shown by reference numeral 930 because of using the time diversity, as compared with a signal having a low time diversity.

It should be noted that the gating rate and the gating time are previously scheduled between a base station and a mobile station. Further, the gating rate is determined according to a channel condition. For example, the gating rate decreases from ½ to ¼ for a good channel condition and increases from ¼ to ½ for a bad channel condition. The gating time depends on a transition method to the control hold state. That is, when a state transition occurs by transmitting a state transition message, it is possible to determine a gating start time. Even in the case where the state transition occurs using a timer, it is possible to synchronize a gating start time of a base station to a gating start time of a mobile station. Although the present invention has been described with reference to an embodiment which performs gated transmission in the case where a transitions to a control hold state occurs because there is no user data to exchange for a predetermined time, the invention can also be applied to a case where a discontinuous transmission period continues for a long time in an active state without transition to the control hold state.

As stated above, the constant transmission of the reverse pilot/PCB channel in the conventional control hold state is advantageous in that the base station can avoid the resync acquisition procedure. However, the constant transmission increases interference to the reverse link, causing a reduction in capacity of the reverse link. Further, constant transmission of the reverse power control bits over the forward link causes an increase in interference to the forward link and a decrease in capacity of the forward link. In addition, the constant transmission of the reverse power control bits may increase power consumption.

A novel method suppresses unnecessary transmission of a control signal in the control hold state so as to minimize resync acquisition time, an increase in interference due to transmission of the reverse pilot/PCB channel and an increase in interference due to transmission of reverse power control bits over the forward link.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A transmission device for a mobile station in a code division multiple access (CDMA) communication system, comprising:

a channel signal generator for generating a reverse pilot channel signal for a reverse link; and a gating controller for intermittently transmitting the reverse pilot channel signal received from the channel signal generator according to a predetermined gating rate in a control hold state, wherein said transmission is intermittent during said control hold state and continuous during a message transmission state.

2. The transmission device as claimed in claim 1, wherein the channel signal generator comprises:

a multiplexer for multiplexing the reverse pilot channel signal and power control information on the reverse link on a power control group unit basis;

an orthogonal modulator for orthogonally spreading an output of the multiplexer with an orthogonal code assigned to the channel; and a gating element for gating the orthogonally spread signal according to an output of the gating controller.

3. The transmission device as claimed in claim 2, wherein the gating controller operates to transmit the reverse pilot channel signal by activating power control groups within a ½ frame duration from among power control groups within a one frame duration.

4. The transmission device as claimed in claim 2, wherein the gating controller operates to transmit the reverse pilot channel signal by activating power control groups for a ¼ frame duration from among power control groups within a one frame duration.

5. The transmission device as claimed in claim 2, wherein the gating controller operates to transmit the reverse pilot channel signal on the reverse pilot/PCB channel by activating power control groups for a ⅛ frame duration out of power control groups within a one frame duration.

6. A transmission device for a base station in a CDMA communication system, comprising:
a dedicated control channel signal generator for puncturing a control message to be transmitted and inserting power control information in the punctured message for controlling transmission power of a reverse link; and
a gating controller for intermittently transmitting the power control information from the dedicated control channel signal generator according to a predetermined gating rate in a control hold state,
wherein said transmission is intermittent during said control hold state and continuous during a message transmission state.

7. The transmission device as claimed in claim 6, wherein the dedicated control channel signal generator comprises:
a control message generator for generating a control message to be transmitted over a dedicated control channel;
a puncturer-inserter for puncturing the control message at a predetermined location and inserting the power control information in the punctured control message to control transmission power of the reverse link;
an orthogonal modulator for orthogonally spreading an output of the puncturer-inserter with an orthogonal code assigned to the dedicated control channel; and
a gating element for gating the orthogonally spread control message on the dedicated control channel according to an output of the gating controller.

8. The transmission device as claimed in claim 7, wherein the gating controller operates to transmit corresponding power control groups for a ½ frame duration out of power control groups within a one frame duration for the dedicated control channel signal.

9. The transmission device as claimed in claim 7, wherein the gating controller operates to transmit power control groups for a ¼ frame duration out of power control groups within a one frame duration for the dedicated control channel signal.

10. The transmission device as claimed in claim 7, wherein the gating controller operates to transmit power control groups for a ⅛ frame duration out of power control groups within a one frame duration for the dedicated control channel signal.

11. A gated transmission method for a mobile station in a CDMA communication system, comprising the steps of:
generating a pilot channel signal for a reverse link; and
intermittently transmitting the pilot channel signal according to a predetermined gating rate in a control hold state,
wherein said transmission is intermittent during said control hold state and continuous during a message transmission state.

12. The transmission method as claimed in claim 11, wherein the step of generating the pilot signal and the power control bit comprises the steps of:
multiplexing the reverse pilot channel signal and power control information on the reverse link on a power control group unit basis; and
multiplying the multiplexed signal with an orthogonal code assigned to the channel.

13. The transmission method as claimed in claim 12, wherein the gating controller operates to transmit the orthogonally spread multiplexed signal by activating power control groups for a ½ frame duration out of power control groups within a one frame duration for the channel signal.

14. The transmission method as claimed in claim 12, wherein the gating controller operates to transmit the orthogonally spread multiplexed signal by activating power control groups for a ¼ frame duration out of power control groups within a one frame duration for the channel signal.

15. The transmission method as claimed in claim 12, wherein the gating controller operates to transmit the orthogonally spread multiplexed signal by activating power control groups for a ⅛ frame duration out of power control groups within a one frame duration for the channel signal.

16. A gated transmission method for a base station in a CDMA communication system, comprising the steps of:
puncturing a control message to be transmitted to insert power control information for controlling transmission power of a reverse link in the punctured message; and
intermittently transmitting the power control information inserted control message over a dedicated control channel according to a predetermined gating rate in a control hold state,
wherein said transmission is intermittent during said control hold state and continuous during a message transmission state.

17. The transmission method as claimed in claim 16, wherein generating a power control information inserted control message comprises the steps of:
generating a control message to be transmitted over the dedicated control channel;
puncturing the control message at a predetermined location and inserting the power control information in the predetermined location to control transmission power of the reverse link; and
orthogonally spreading the power control information inserted-control message with an orthogonal code assigned to the dedicated control channel.

18. The transmission method as claimed in claim 17, wherein the gating controller operates to transmit the orthogonally spread control message by activating power control groups for a ½ frame duration out of power control groups within a one frame duration.

19. The transmission method as claimed in claim 17, wherein the gating controller operates to transmit the orthogonally spread control message by activating power control groups for a ¼ frame duration out of power control groups within a one frame duration.

20. The transmission method as claimed in claim 17, wherein the gating controller operates to transmit the orthogonally spread control message by activating power control groups by activating power control groups for a ⅛ frame duration out of power control groups within a one frame duration.

21. A gated transmission method for a mobile station in a CDMA communication system, comprising the steps of:
a) intermittently transmitting a reverse pilot signal and a power control bit according to a predetermined gating rate in a control hold state;
b) upon generation of a message to be transmitted over a reverse dedicated control channel for the reverse link, continuously transmitting the reverse pilot signal and the power control bit at a transmission duration of the message; and
c) after transmission of the message on the reverse dedicated control channel, re-storing to step a).

22. The gated transmission method as claimed in claim 21, wherein the reverse dedicated control channel is a reverse dedicated MAC (Medium Access Control) channel.

23. The gated transmission method as claimed in claim 21, wherein the message on the dedicated control channel is transmitted at an increased transmission power.

24. The gated transmission method as claimed in claim 21, further comprising the step of increasing transmission power of the reverse pilot signal at a transmission duration of the dedicated control channel to transmit the reverse pilot signal with the increased transmission power.

25. A gated transmission method for a mobile station in a CDMA communication system, comprising the steps of:
   a) intermittently transmitting a reverse pilot signal and a power control bit according to a predetermined gating rate in a control hold state;
   b) upon activation of a message to be transmitted over a reverse dedicated control channel for the reverse link and continuously transmitting the message on the reverse dedicated control channel; and
   c) after transmission of the message on the reverse dedicated control channel, transmitting the reverse pilot signal and the power control bit, within at least one time slot, and returning to step a).

26. A gated transmission method for a mobile station in a CDMA communication system, comprising the steps of:
   a) intermittently transmitting a reverse pilot signal and a power control bit according to a predetermined gating rate in a control hold state;
   b) upon activation of a message to be transmitted over a reverse dedicated control channel for the reverse link and continuously transmitting the message on the reverse dedicated control channel; and
   c) after transmission of the message on the reverse dedicated control channel, transmitting the reverse pilot signal and the power control bit, within one or more time slots associated with a particular frame duration, and returning to step a).

27. A gated transmission method for a mobile station in a CDMA communication system, comprising the steps of:
   a) intermittently transmitting a reverse pilot signal and a power control bit according to a predetermined gating rate in a control hold state;
   b) upon activation of a message to be transmitted over a reverse dedicated control channel for the reverse link, transmitting the reverse pilot signal as a preamble signal and continuously transmitting the message on the reverse dedicated control channel; and
   c) after transmission of the message on the dedicated control channel, transmitting the reverse pilot signal, within at least one time slot, as a postamble signal, and repeating step a) during a next frame duration.

28. A gated transmission method for a mobile station in a CDMA communication system, comprising the steps of:
   examining power control information received intermittently from a forward dedicated control channel; and
   intermittently transmitting a reverse pilot signal and a power control bit according to a predetermined gating rate in a control hold state, and setting a transmission power level for the reverse pilot signal to be transmitted in accordance with the received power control information.

29. The gated transmission method as claimed in claim 28, wherein the received power control information has a same pattern as a gating pattern for the reverse pilot signal and the power control bit.

30. A gated transmission method for a mobile station in a CDMA communication system, comprising the steps of:
   a) intermittently transmitting a reverse pilot signal and a power control bit according to a predetermined gating rate in a control hold state, and setting a transmission power level for the reverse pilot signal to be transmitted according to power control information received over a forward dedicated control channel;
   b) upon activation of a message to be transmitted over a dedicated control channel for the reverse link,
      i) transmitting a reverse pilot signal, which is first generated after activation of the message and the power control bit, continuously transmitting a message on the reverse dedicated control channel,
      ii) continuously transmitting the reverse pilot signal and the power control bit at a location equal to the transmission duration of the message on the dedicated control channel, and
      iii) setting a transmission power level of the reverse pilot signal and the power control bit according to power control information received through the forward dedicated control channel; and
   c) after transmission of the message on the dedicated control channel, repeating step a).

31. A gated transmission method for a mobile station in a CDMA communication system, comprising the steps of:
   a) intermittently transmitting a reverse pilot signal and a power control bit according to a predetermined gating rate in a control hold state, and setting a transmission power level of the reverse pilot signal and the power control bit according to power control information received over a forward dedicated control channel to transmit the signals with the set transmission power;
   b) upon activation of a message to be transmitted over a dedicated control channel for the reverse link,
      i) transmitting a reverse pilot signal, which is first generated after activation of the message and the power control bit,
      ii) continuously transmitting a message on the reverse dedicated control channel,
      iii) continuously transmitting the reverse pilot signal and the power control bit at a location equal to the transmission duration of the message on the dedicated control channel, and
      iv) setting the transmission power level of the reverse pilot signal and the power control bit according to power control information received through the forward dedicated control channel; and
   c) after transmission of the message on the dedicated control channel, transmitting the reverse pilot signal and the power control bit, within at least one time slot, and returning to step a).

32. A gated transmission method for a mobile station in a CDMA communication system, comprising the steps of:
   a) intermittently transmitting a reverse pilot signal and a power control bit according to a predetermined gating rate in a control hold state, and setting a transmission power level of the reverse pilot signal and the power control bit according to power control information received over a forward dedicated control channel to transmit the signal with the set transmission power;
   b) upon activation of a message to be transmitted over a dedicated control channel for the reverse link,
      i) transmitting a reverse pilot signal, which is first generated after activation of the message and the power control bit, ii) continuously transmitting a message on the reverse dedicated control channel, iii) continuously transmitting the reverse pilot signal and the power control bit at a location where the message on the dedicated control channel is transmitted, and iv) setting transmission power of the reverse pilot signal and the power control bit according to power control information received through the forward dedicated control channel; and c) after transmission of the message on the dedicated control channel, transmitting the reverse pilot signal and the power control bit, within one or more time slots within a corresponding frame duration, and returning to step a).

33. A gated transmission method for a mobile station in a CDMA communication system, comprising the steps of:

a) intermittently transmitting a reverse pilot signal and a power control bit according to a predetermined gating rate in a control hold state, and setting a transmission power level of the reverse pilot signal and the power control bit according to power control information received over a forward dedicated control channel to transmit the signal with the set transmission power;

b) upon activation of a message to be transmitted over a dedicated control channel for the reverse link, i) transmitting as a preamble signal a reverse pilot signal, which is first generated after activation of the message, ii) continuously transmitting a message on the reverse dedicated control channel, iii) continuously transmitting the reverse pilot signal and the power control bit channel at a location where the message on the dedicated control channel is transmitted, and iv) setting transmission power of the reverse pilot signal and the power control bit according to power control information received through the forward dedicated control channel; and c) after transmission of the message on the dedicated control channel, transmitting the reverse pilot signal, within a time duration equal to at least one time slot, as a postamble signal, and returning to step a) during a next frame duration.

34. A gated transmission method for a mobile station in a CDMA communication system, comprising the steps of:

examining power control information received intermittently from a forward common power control channel; and intermittently transmitting a reverse pilot signal and a power control bit according to a predetermined gating rate in a control hold state, and setting a transmission power level of the reverse pilot signal and the power control bit according to the received power control information to transmit the signal on the reverse pilot channel with the set transmission power.

35. A transmission device for a base station in a CDMA communication, comprising:

a dedicated control channel signal generator for generating a power control bit for controlling transmission power of a reverse link according to a predetermined gating rate and outputting the generated power control bit as a dedicated control channel signal; and a gating controller for intermittently transmitting the power control bit according to the predetermined gating rate in a control hold state.

36. The transmission device as claimed in claim 35, wherein the dedicated control channel generator comprises:

an orthogonal modulator for orthogonally spreading the power control bit with an orthogonal code assigned to the dedicated control channel; and a gating element for gating the orthogonally spread power control bit according to an output of the gating controller.

37. The transmission device as claimed in claim 36, wherein the gating controller performs gated transmission at a gating rate of ½.

38. The transmission device as claimed in claim 36, wherein the gating controller performs gated transmission at a gating rate of ¼.

39. A method for transmitting a power control bit for a base station in a CDMA communication, comprising the steps of:

generating a power control bit for controlling transmission power of a reverse link according to a predetermined gating rate; and intermittently transmitting the power control bit according to the predetermined gating rate.

40. The method in claim 39, wherein the gating controller performs gated transmission at a gating rate of ½.

41. The method as claimed in claim 39, wherein the gating controller performs gated transmission at a gating rate of ¼.

* * * * *